United States Patent
Hayakawa et al.

(10) Patent No.: US 8,540,855 B2
(45) Date of Patent: Sep. 24, 2013

(54) WATER BATTERY DEVICE

(75) Inventors: Youji Hayakawa, Yamagata (JP);
Akihiro Hayakawa, Yamagata (JP);
Shinji Hayakawa, Gifu (JP)

(73) Assignee: Youji Hayakawa, Yamagata (JP)

( * ) Notice: Subject to any disclaimer, the term of this patent is extended or adjusted under 35 U.S.C. 154(b) by 237 days.

(21) Appl. No.: 13/036,507

(22) Filed: Feb. 28, 2011

(65) Prior Publication Data

US 2011/0180397 A1      Jul. 28, 2011

Related U.S. Application Data

(63) Continuation-in-part of application No. PCT/JP2009/004269, filed on Aug. 31, 2009.

(30) Foreign Application Priority Data

Aug. 29, 2008 (WO) .............. PCT/JP2008/002366
Mar. 12, 2009 (JP) .............. 2009-060336

(51) Int. Cl.
*C02F 1/467* (2006.01)
*C25B 5/00* (2006.01)

(52) U.S. Cl.
USPC ...... 204/248; 204/272; 205/745; 210/748.17; 210/748.18

(58) Field of Classification Search
USPC ............ 204/248; 205/745; 210/748.17, 210/748.18
See application file for complete search history.

(56) References Cited

U.S. PATENT DOCUMENTS 525,303 A * 8/1894 Woods .................. 204/248
4,902,391 A * 2/1990 Ibbott .................. 205/745

(Continued)

FOREIGN PATENT DOCUMENTS

JP          7-75709 A      3/1995
JP       2002-79253 A     3/2002

(Continued)

OTHER PUBLICATIONS

Japanese Office Action dated Jun. 13, 2011, issued in corresponding Japanese Patent Application No. 2010-526575.

(Continued)

*Primary Examiner* — Harry D Wilkins, III
(74) *Attorney, Agent, or Firm* — Westerman, Hattori, Daniels & Adrian, LLP

(57) ABSTRACT

The water battery device has a sterilizing unit composed of a non-noble metal body and a noble metal body that are overlapped coaxially via an interval keeping member. The sterilizing unit is disposed in a passing water or flowing water or immersed in a stored water. Then, a battery action is generated via the water at a uniform clearance space between the non-noble metal body and the noble metal body. Thereby, metal ions are dissolved in a complete ionization state from the non-noble metal body, thereby giving sterilization effect to the water. A container has a container structure that generates an electric current in the water between the non-noble metal body and the noble metal body and that maintains an oxygen concentration in the water required to continually produce the battery action water. Moreover, with the container structure, the concentration of the battery action water produced between the non-noble metal body and the noble metal body becomes not less than a predetermined concentration at which an oxide film or biofilm is formed on a facing surface of the non-noble metal body. Thus, the container structure surrounds the non-noble metal body and the noble metal body to keep the concentration of the battery action water at the concentration not less than the predetermined concentration.

7 Claims, 42 Drawing Sheets

(56) References Cited

U.S. PATENT DOCUMENTS

| | | | |
|---|---|---|---|
| 4,933,080 A * | 6/1990 | Rundzaitis et al. | 210/232 |
| 5,234,555 A * | 8/1993 | Ibbott | 422/22 |
| 5,387,324 A * | 2/1995 | Ibbott | 205/745 |
| 5,460,702 A * | 10/1995 | Birkbeck et al. | 210/748.17 |
| 5,482,629 A * | 1/1996 | Rippetoe et al. | 210/448 |
| 5,753,100 A * | 5/1998 | Lumsden | 205/701 |
| 5,980,727 A * | 11/1999 | Putz et al. | 205/688 |
| 6,106,787 A * | 8/2000 | Rippetoe et al. | 422/186.04 |
| 6,672,382 B2 * | 1/2004 | Schultz et al. | 166/65.1 |
| 7,135,155 B1 * | 11/2006 | Long et al. | 422/224 |
| 7,658,824 B2 * | 2/2010 | Bremauer | 204/275.1 |
| 7,815,779 B2 * | 10/2010 | Flettner | 204/248 |
| 7,867,367 B2 * | 1/2011 | Lee | 204/248 |
| 8,409,434 B2 * | 4/2013 | Andrews et al. | 210/167.11 |
| 2002/0190008 A1 * | 12/2002 | Ashton | 210/748 |
| 2006/0042958 A1 * | 3/2006 | Cole | 205/745 |
| 2008/0257829 A1 * | 10/2008 | Rippetoe | 210/748 |

FOREIGN PATENT DOCUMENTS

| | | |
|---|---|---|
| JP | 2003-071452 A | 3/2003 |
| JP | 2003-230885 A | 8/2003 |
| JP | 2003-314847 A | 11/2003 |
| JP | 2005-058847 A | 3/2005 |
| JP | 2008-188508 A | 8/2008 |
| JP | 3145644 U | 9/2008 |

OTHER PUBLICATIONS

International Search Report of PCT/JP2009/004269, mailing date Nov. 2, 2009.

* cited by examiner

764

774

784

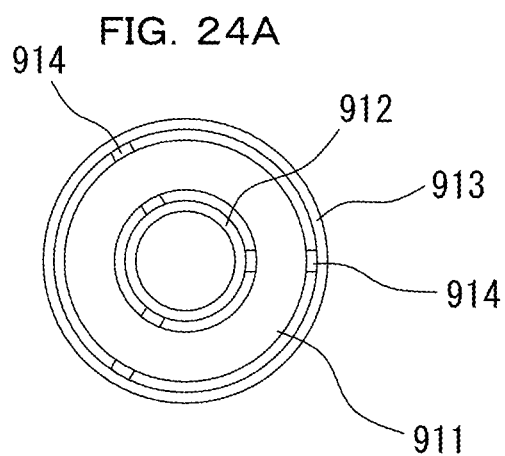
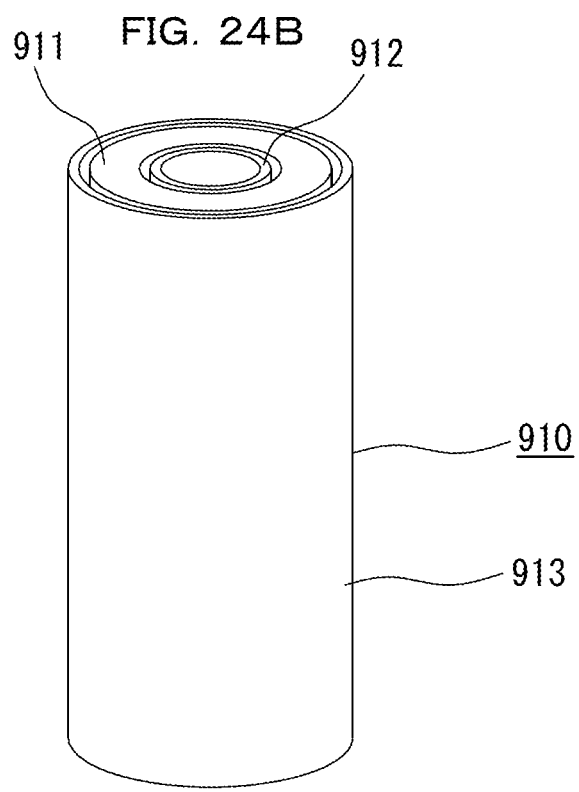

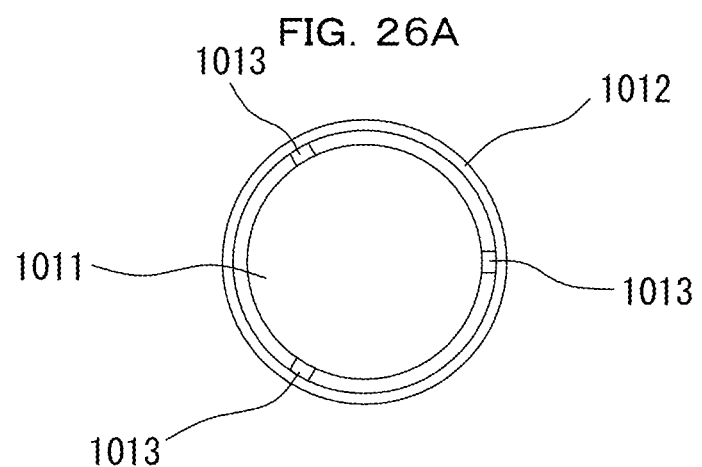
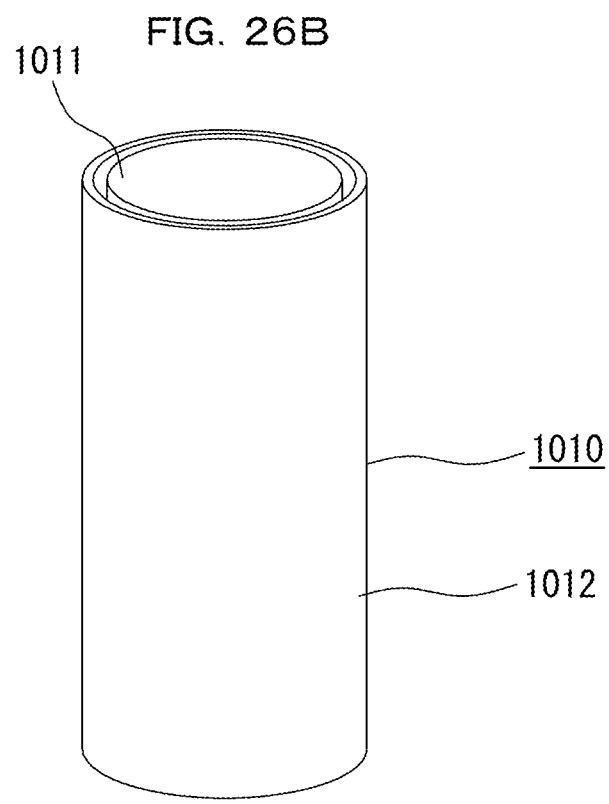

WATER BATTERY DEVICE

BACKGROUND OF THE INVENTION

1. Field of the Invention

The present invention relates to a water battery device or a water environment battery device (hereinafter referred to simply as "water battery device") for providing a battery action utilizing an ionization tendency so as to solve metal ions and active oxygen species into water, thereby generating function water (that hereinafter may be referred to as "battery action water"). The water battery gives a variety of useful functions such as sterilization function, antibacterial function (including preventing and removing effect of microorganisms such as antifungal action), bug-preventing and harmful-insect-repellent function, fresh product preservation function, plant growth promoting function and so on. The water battery device provides such functions to various kinds of waters in a water environment: tap water, well water, purified water of a purification system, stored water such as water in a variety of containers or water tank or water pool, flowing water in natural environment such as river, stored water in water environment such as water moat, lake, pond and sea, etc.

2. Description of the Related Art

Japanese patent laid open patent publications No. 2003-181454 and No. 2005-58847 show sterilization devices, respectively, that use a negative electrode made of a non-noble metal and a positive electrode made of a noble metal.

The sterilization device of No. 2003-181454 disposes "a negative metal made of a non-noble metal in a bimetallic corrosion and a positive electrode made of a noble metal in a bimetallic corrosion" via a spacer so as to face to each other. Thus, it forms "a galvanic battery" that generates "a voltage of 0.7V or more" between the electrodes (paragraph 005).

The structure constituting such "galvanic battery" is an electromotive force generating mechanism by use of a so-called galvanic anode system (that does not use a power source but uses a corrosion cell (macro cell) by direct contact of dissimilar metals). It is apparent from the description of No. 2003-181454 that "a closed circuit is formed each between the negative electrode and the positive electrode and a stirrer is interposed at a middle of the circuit so as to make it operable as shown in a principle drawing of FIG. 7 and a circuit diagram of FIG. 8" (paragraph 015). That is, the negative electrode and the positive electrode form the closed circuit via the spacer so as to have a direct electrical connection with each other and to be put into a direct conduction state.

Next, No. 2005-58847 has a description about a structure of a purifying/sterilizing body 4 that it "generates ions between pipes and purifies and sterilizes an object to be purified by such ion effects" by arranging a titanium pipe 17, a stainless pipe 18, a titanium pipe 19, a stainless pipe 20 and a titanium pipe 21, as pipes of different materials, next to next in series inside a vinyl chloride pipe 16 (paragraph 0015). However, the publication lacks specific description on a mechanism or how the ions are generated by the ion effects. On the other hand, though the titanium pipe 17, stainless pipe 18, titanium pipe 19, stainless pipe 20 and titanium pipe 21 are disposed adjacently to each other even in the purifying/sterilizing body 4, it seems that they are electrically connected with each other at their ends (e.g. board-like member connecting lower ends of each adjacent pipes in FIG. 4), thereby generating ions between the pipes by the similar galvanic anode system as described above.

As mentioned above, it is only the structure using the macro cell of the so-called galvanic anode or direct contact of dissimilar metals that has been conventionally proposed as a structure to generate an electric current or ions or the like that performs sterilization function between dissimilar metals without need of external power source.

The inventors found that the structure of galvanic anode or macro cell eroded the electrically conductive part (spacer or the like) itself between the dissimilar metals. If the corrosive part becomes electrically non-conductive, the electromotive force action becomes instable or disappears, thereby causing such problems as a desired goal cannot be obtained. Then, the inventors devoted themselves to experiments on techniques that enabled metal ions or the like to be produced stably between dissimilar metals by a system or a mechanism other than the galvanic anode system and that made it possible to stably perform a desired sterilization effect or the like over a long period of time. As a result, the inventors have conceived an electromotive force (EMF) structure that is far from the so-called galvanic anode, as a structure that makes it unnecessary to use an external power source. That is, as a result of repetitive studies and developments, the inventors have found that it is possible to five various useful functions such as the sterilization effect and so son to the water by the following system. Specifically, the system uses at least two kinds of reactors made of dissimilar metals having different ion tendency (non-noble metal and noble metal). The reactors are not directly connected electrically with each other by an electrically conductive material. By contrast, an electrically insulating material is interposed between the reactors so as to form a communicating space of a minute interval space (interval space in which the water can communicate inside and outside thereof). Then, the reactors are disposed in the water. Thus, metal ions and active oxygen species are released and dissolved so that the metal ions and active oxygen species give various useful functions to the water.

In view of the above, the inventors have completed a water battery device having an electromotive force structure that makes an external power source unneeded and that is far from the macro cell structure using the so-called galvanic anode or directly contacted dissimilar metal. Specifically, the water battery device constructs a unit forming the communicating space. The unit is arranged along a passing water route or a running water pathway inside a passing water space or a running water space as a passing water environment or a running water environment. The unit may be disposed in a space that is located near a passing water space or a running water space so as to communicate with the water inside the water space. Moreover, the unit may be located inside a stored water space as a stored water environment. Then, the unit elutes or releases the metal ions in a perfect ionized state and the active oxygen species in addition from the non-noble metal into the water, such as the passing water or running water or stored water, by the battery action between the reactors. The battery action between the reactors is generated via only the water as a current carrying medium. Specifically, the current carrying medium may be ions such as chloride ions (chlorine ions) and sodium ions contained in a daily life water such as a well water or a tap water. Thus, the unit produces a battery action water between the reactors so that the battery action water give stably a variety of function or effects over a long period of time, such as the sterilizing effect, anti-bacterial effect, anti-fungal effect, bug proof effect, harmful insect repellent effect, fresh product preserving effect, plan growth promoting effect.

On the other hand, as a result of various experiments and studies, the inventors found that, if the metal such as a magnesium for releasing the metal ions in the water was continuously immersed in the water for a fixed time period or more, a surface of the metal was tarnished. In case of the magnesium, the surface turned black. It is presumed that such discoloration be caused by oxidation of the surface of the metal by dissolved oxygen in the water and that an oxide film be formed on the surface of the metal. In case the oxide film is formed on the surface of the non-noble metal as one of the reactors, it inhibits a function of forming a battery between the non-noble metal and the noble metal. Then, the generation rate of the metal ions and the active oxygen species are largely lowered and, at worst, becomes zero. Moreover, if the discolored film (part of oxide film) at the surface of the metal is peeled off from the surface of the metal and released into the water, the water quality may be degraded or the water may become a water that does not fulfill a water quality criterion, particularly in case the invention is applied to the drinking water such as the tap water.

In addition, as a result of various experiments and studies, the inventors found that, if the metal such as the magnesium was continuously immersed in the water for a fixed time period or more, a biological slime or a microbial membrane (referred to as "biofilm" hereafter) was formed on the surface of the metal, in case of the water where viable bacteria live to a considerable amount or more in the water, particularly in case of the well water or the bathwater or the bathtub water or the like. In case the biofilm is formed on the surface of the reactor (particularly on the surface of the non-noble metal as one of the reactors), it inhibits a function of forming a battery between the non-noble metal and the noble metal, too. Then, the generation rate of the metal ions and the active oxygen species are largely lowered and, at worst, becomes zero. Moreover, if the biofilm at the surface of the metal is peeled off from the surface of the metal and released into the water, the water quality may be degraded or the water may become a water that does not fulfill a water quality criterion, particularly in case the invention is applied to the drinking water such as the tap water.

According to the inventors' further findings, the oxide film or the biofilm is formed on the surface of the metal (particularly on the surface of the non-noble metal) even if the non-noble metal reactor and the noble metal reactor are disposed with the communicating space in the water so as to generate the battery action between them. That is, if the non-noble metal reactor and the noble metal reactor are disposed simply in the water, it is impossible to prevent the oxide film or the biofilm.

It would be perceived as the caused that the water passes freely in and out of the communicating space between the reactors, so that the metal ions and the active oxygen species in the battery action water (water containing the metal ions and the active oxygen species by the battery action) flow out instantaneously from the communicating space between the reactors into the external water environment. Thus, the concentration of the battery action water (ion concentration and active oxygen concentration) in the water is diluted inside the communicating space.

That is, when the concentration of the battery action water (ion concentration and active oxygen concentration) in the water inside the communicating space is kept at a fixed level or more, the oxide film and the biofilm are restrained and prevented from being generated by the metal ions and the active oxygen species with such concentration. Particularly, a battery action water having a certain concentration completely kill the germs responsible for the biofilm to prevent the formation of the biofilm. By contrast, if the concentration becomes short after the battery action water in the water inside the communicating space was instantly released to the outside water environment, the oxide film and the biofilm are easy to be formed on the surface of the metal. Moreover, along with the formation of the oxide film or the biofilm on the surface of the metal, the battery action is blocked as described above, thereby accelerating the formation of the oxide film and the biofilm on the surface of the metal.

Particularly, in case the surface of the non-noble metal reactor is not faced with the noble metal surface, there is no battery action generated. Consequently, even in relatively a short time, the oxide film is produced on the surface of the non-noble metal surface, thereby tarnishing the metal surface, or the biofilm is formed thereon.

BRIEF SUMMARY OF THE INVENTION

Then, it is the object of the invention to provide a water battery device having the above-mentioned characteristics that effectively prevents a formation of an oxide film and a biofilm even in a water environment such as a well water or a bathtub water where germs are easy to propagate or reproduce and that is able to keep performing various functions such as sterilization in a sustainable manner and in the same way as the beginning over a long period of time.

A first aspect of a water battery of the invention has a container and an inner unit that is housed and disposed inside the container. The inner unit has a first reactor, a second reactor and an interval keeping member. The first reactor has a fixed ionization tendency and is a metal body made of a first metal (non-noble metal) that produces metal ions in a water so as to perform a sterilization effect (referred to simply as "non-noble metal" hereinafter). The second reactor is a metal body made of a second metal (non-noble metal) that has an ionization tendency lower than that of the first metal (referred to simply as "noble metal" hereinafter). The second reactor has a facing surface disposed in a facing manner to an entire surface of a main part that constitutes a metal ion producing surface and that is defined as a major part surface on an entire surface of the first reactor.

Moreover, the interval keeping member is made of an electrical insulating material to insulate the first reactor and the second reactor to each other. Specifically, the interval keeping member holds the first reactor and the second reactor in a fixed manner to each other such that they are in a non-contact state to each other over an overall surface thereof and such that they have their surfaces faced in a planar manner to each other with a small gap of interval space (communication space), while the interval space being constant at least along an entire length of the reactors. For example, the interval keeping member holds the first and second reactors in the fixed manner such that they are immovable relative to each other without an intended external force to separate them. Thereby, the interval keeping member prevents the first reactor and the second reactor from having a direct electrical connection or conduction to each other. Typically, the insulating material may be a synthetic resin or a rubber.

The container has a communication opening that allows water to communicate between an outside of the container and the inner unit disposed inside the container.

The inner unit passes the water through the communication opening into an interior of the container that houses the inner unit. Alternatively, the inner unit is immersed in the water. The water runs into the small gap of the interval space that is constant along the full length between the first reactor and the second reactor in the container. The inner unit uses only the water running into the interval space as a medium for eluting metal ions from the first reactor into the water by use of a battery reaction utilizing oxygens in the water between the first reactor and the second reactor. At the same time, the oxygens in the water take in electrons generated in accompany with generation of the metal ions so as to produce electric current in the water between the first reactor and the second reactor.

At this time, it is presumed from test results described later that the oxygens in the water take in the electrons to be excited and activated so as to become a variety of active oxygen species. (It is hard to confirm the active oxygen species themselves in the experiments, since the active oxygen species disappear instantaneously after generation. However, it is hard to suppose other elements than the active oxygen species as the element that performs the advantages such as sterilizing effect by the battery action water, and it is reasonable to think that the active oxygen species are generated in the water.

Thereby, the inner unit adds a function to the water by the battery action water containing the metal ions and the oxygens taking in the electrons, thereby making a function water.

The inner unit arranges the first reactor and the second reactor such that a facing surface of the second reactor faces in a planar way to the entire surface of the main part as the metal ion generating surface of the first reactor, while keeping the interval space by the interval keeping member so as to maintain a predetermined interval required to produce the electric current in the water between the first reactor and the second reactor and to continuously produce the battery action water.

Moreover, the container has a container structure enclosing the first reactor and the second reactor such that the electric current is produced in the water between the first reactor and the second reactor, such that it maintains a concentration of the oxygens in the water at a fixed concentration required to generate continuously the battery action water and such that it maintains a concentration of the battery water generated between the first reactor and the second reactor to be more than a minimal concentration at which an oxygen film and a biofilm is formed on the facing surface of the first reactor, thereby maintaining the concentration of the battery action water at a fixed concentration more than the minimal concentration.

Further objects and advantages of the invention will be apparent from the following description, reference being had to the accompanying drawings, wherein preferred embodiments of the invention are clearly shown.

BRIEF DESCRIPTION OF THE SEVERAL VIEWS OF THE DRAWINGS

FIG. 20A is an exploded perspective view showing a water battery unit as one modified example of a water battery unit having double pipe structure with a non-noble metal body of column shape with star cross-section.

FIG. 20B is an exploded perspective view showing a water battery unit as another modified example of a water battery unit having double pipe structure with a noble metal body of cylinder shape with star cross-section.

FIG. 20C is a perspective view showing a water battery unit as still further modified example of a square-type water battery unit.

FIG. 21A is a perspective view of a first modified example of a non-noble metal body of bullet shape with star cross-section.

FIG. 21B is a perspective view of a second modified example of a non-noble metal body of square column shape.

FIG. 22A is a perspective view of a first modified example of a noble metal body of cylinder shape with multiple small holes.

FIG. 22B is a perspective view of a second modified example of a noble metal body of spiral cylinder shape.

FIG. 22C is a perspective view of a third modified example of a noble metal body of net cylinder shape.

FIG. 22D is a perspective view of a fourth modified example of a noble metal body of ribbed cylinder shape.

FIG. 22E is a perspective view of a fifth modified example of a noble metal body of cylinder shape with star cross-section.

FIG. 22F is a perspective view of a sixth modified example of a noble metal body of hexagonal cylinder shape.

FIG. 23A is a front view showing an assembled state of the inner unit.

FIG. 23B is a plan view showing the assembled state of the inner unit.

FIG. 23C is a cross-sectional view taken along line 23C-23C of FIG. 23A.

FIG. 23D is a cross-sectional view taken along line 23D-23D of FIG. 23B.

FIG. 23E is an exploded perspective view showing how the inner unit is assembled.

FIG. 24A to FIG. 24B show a first modified example of an inner unit having a triple piped structure (inner noble metal body, non-noble metal body, outer noble metal body and interval keeping member) of the water battery devices according to the first to the seventh embodiments, respectively.

FIG. 24A is a plan view of the inner unit.

FIG. 24B is a perspective view of the inner unit.

FIG. 26A to FIG. 26B show a second modified example of an inner unit having a double piped structure (non-noble metal body, noble metal body and interval keeping member) of the water battery devices according to the first to the seventh embodiments, respectively.

FIG. 26A is a plan view of the inner unit.

FIG. 26B is a perspective view of the inner unit.

DETAILED DESCRIPTION OF THE INVENTION

Figure 1A:
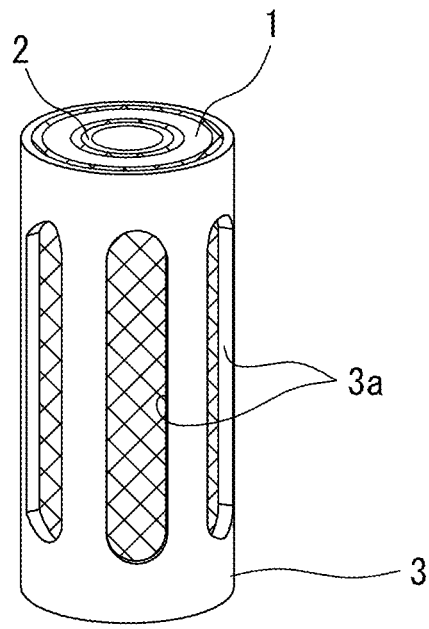
FIG. 1A is a perspective view illustrating an inner unit as a whole that is disposed in a water battery device according to a first embodiment of the invention.

Several embodiments of the invention are described hereunder referring to the attached drawings. The same reference character is used to show the same element throughout the several embodiments.

[Principle of Water Battery Device]

The water battery device of the present invention can be provided at very low price and are easy to use. The water battery device is composed of materials that are safe and secure for human beings, animals and environment. The water battery device is maintenance-free and can sustain its advantageous effects stably and almost permanently. The water battery device is used in the water to contribute to the environment via the water, thus called as "water environment battery device" to this effect.

The present invention has been achieved on the basis of the unique knowledge that, if dissimilar metals having different ionization tendency are disposed in the water so as to face with each other (without direct electrical connection), the battery reaction is generated through the water as a medium at a reaction surface of the non-noble metal body to which the noble metal body faces. Such battery action may be called as a micro cell action that accompanies no corrosion.

Particularly, the inventors have attained the knowledge that, if metals having near ionization tendency are alloyed to form a non-noble metal body, atomic arrangement at the metal surface of the non-noble metal body is disordered. For example, in case the zinc and the magnesium are mixed to form an alloy, the atomic arrangement is disarranged at the surface of the alloy. Then, the battery action is uniformly generated at the surface of the alloy that becomes an anode electrode, so that metal ions are diluted into the water in a perfectly ionized state. That is, no metal or alloy in a powder-particle state without ionization is released into the water. At the same time, the electric current flows uniformly from the metal surface into the water, so that the resultant battery action becomes uniform. Based on such knowledge, the inventors have devised the non-noble metal body (first reactor) as their unique and original technique.

According to the inventor's knowledge, the metal ions and the electrons are produced from the non-noble metal by the direct current generated at the water battery device. Then, the electrons are taken into the oxygen in the water, so that the oxygen is activated to be "active oxygen". The active oxygen acts effectively to oxidize and decompose and extinguish various pathogens. The inventors have been improving the invention expansively in order to utilize the above advantages for removing or curbing antigenic action of every animate beings such as human beings, animals and plants, thereby achieving the present invention.

The non-noble metal elutes metal by the battery action with the noble metal via the water in the water environment such as the passing water environment, running water environment or stored water environment (such battery action may be referred to as "water battery reaction"). On the other hand, the metal ions of the non-noble metal are thought to be eluted from the surface facing to the noble metal and, in addition, also eluted from the surface adjacent to the noble metal (upper end surface or lower end surface in case the non-noble metal is a cylinder).

That is, the water battery device according to the invention is a technique that the non-noble metal body facing the noble metal body in the water environment utilizes an electrochemical reaction (particularly a local cell action) in an opposite manner, while such reaction normally causes rust or corrodes the metal by corrosion cell action. Moreover, the non-noble metal body is held by an interval keeping member in a state facing the noble metal body with a uniform gap space so that metallic corrosion (or eluting off of metal particles) is not generated on the non-noble metal in such case and, to the contrary, so that the metal ions are eluted in a completely ionized state. Thereby, only the metal ions in the completely ionized state are eluted from the non-noble metal body into the water environment so as to give functions to the water environment, thereby preventing the elution or effusion of the metal particles without fail.

The water battery device of the invention prepares a non-noble metal by forming an original zinc-magnesium alloy (Zn/Mg alloy) that contains zinc (Zn) as a base metal (main component) and adds magnesium (Mg), in a larger amount than usual, as an added metal that has an ionization tendency near to that of the zinc. Alternatively, the water battery device of the invention prepares a non-noble metal by forming an original magnesium-zinc alloy (Mg/Zn alloy) that contains magnesium (Mg) as a base metal and adds zinc (Zn), in a larger amount than usual, as an added metal that has an ionization tendency near to that of the zinc. In this case, the atomic array at the surface of the Zn/Mg alloy or the Mg/Zn alloy is disarranged in the water so as to promote the elution of their ions ($Zn^{2+}$ and $Mg^{2+}$) into a liquid (water).

A mechanism of the battery action of the water battery device according to the invention will be describing schematically hereafter. Where the noble metal body made of a stainless steel and the non-noble metal made of the Zn/Mg alloy or Mg/Zn alloy are combined in the water, a battery cell is formed between them via the water as a medium. At this time, Zn and Mg become positive ions ($Zn^{2+}$ and $Mg^{2+}$), respectively, at the electrode (negative electrode) made of the Zn/Mg alloy or Mg/Zn alloy, thereby producing electrons (−) by that amount in accordance with the ionization.

The electrons are forced to react with dissolved oxygen in the water to be ions. Thus, the electrons are taken in the oxygen in the water to be hydroxide ions ($OH^-$) (that may be considered to be a kind of active oxygen). Thereby, $Zn^{2+}$ and $Mg^{2+}$ are produced at the non-noble metal body as the negative electrode (−), while $OH^-$ being produced at the noble metal body as the positive electrode (+), so that an electric current flows in the water.

As described above, the Zn ions and the Mg ions are formed so as to produce the hydroxide ions and/or a variety of active oxygen species at the time when the direct current runs from the metallic reactor into the water by the battery action. As the active oxygen species that are thought to be produced, it is presumed that various known kinds of active oxygen species (in the sense that the active oxygens themselves are known) are produced other than the hydroxide ions.

[Metal to be Used]

The first reactor is able to perform a strong bactericidal activity as the zinc alloy containing the magnesium (Zn/Mg alloy) or as the magnesium alloy containing the zinc (Mg/Zn alloy). Moreover, the stainless steel or the titanium (including titanium alloy) or the like may be used as the second reactor.

In detail, it is preferable to use the Zn/Mg alloy that adds a small amount of simple magnesium metal to the simple zinc metal as the non-noble metal to be the negative electrode. Moreover, it has been found by the inventors that the content rate of the magnesium to the zinc is preferably a range of Zn:Mg=90:10 to 97:3, and more preferably, that the content rate of the magnesium to the zinc is in a range of Zn:Mg=95:5 to 97:3.

It is thought to be desirable to use the Mg/Zn alloy that adds a small amount of simple zinc metal to the simple magnesium metal as the non-noble metal to be the negative electrode. In this case, it is presumed that the content rate of the zinc to the magnesium is preferably a range of Mg:Zn=90:10 to 97:3, and more preferably, that the content rate of the zinc to the magnesium is in a range of Mg:Zn=95:5 to 97:3.

Moreover, it has been found by the inventors that it is desirable to use the stainless pipe or titanium pipe as the metal to be the positive electrode. In addition to those metals, Fe, Ni, Cu, Ag, Pt, An may be used as the positive electrode, as long as it has a ionization tendency smaller than the Zn/Mg alloy or the like as the negative electrode, in accordance with intended end-usages.

It has been comprehended from experimental results using a crucible that the Zn/Mg alloy having a magnesium content rate of 3-5% is optimum as the non-noble metal used for the anode electrode.

Moreover, it has been found out from confirmation tests that the magnesium content rate of 3-5% is an optimal range even in selecting the material based on the range that falls under the reference value of Japan Water Works Association and that is capable of getting the sterilization effects.

If the magnesium content rate is 6% or more, there is generated a problem of brittleness and it is thought that the alloy cannot be molded into a desired shape in a confirmation test using a crucible or the like. Therefore, the upper limit of the magnesium content rate is preferably 5%. On the other hand, if the magnesium content rate is 3% or less, it is highly possible that the sterilization effects are lowered, thereby deteriorating the availability as a product.

An alloy that contains the zinc (Zn), magnesium (Mg) and calcium (Ca) as three metals having close ionization tendencies may be used for the non-noble metal body, in addition to the alloys mentioned above. The ratio of components of the alloy is preferably set at a range of Zn:Mg:Ca=90:6:4 to 97:2:1. The ratio of components of the alloy is most preferably set at a value of Zn:Mg:Ca=95:3:2.

In this case, the atomic array at the surface of the Zn/Mg/Ca alloy constituting the negative electrode (−) as the non-noble metal body is disarranged, thereby forming an infinite number of positive electrodes (+) and negative electrodes (−) at the surface of the alloy in a random manner. Thus formed micro cells repeatedly disappear and appear with time while changing the positions by the dissolved oxygen in the water existing around the non-noble metal body, thereby producing the battery actions one right after the other.

Thereby, the electric current flows uniformly from the surface of the non-noble metal body so as to form the battery actions uniformly, so that the Zn ions, Mg ions and Ca ions as essential minerals run into the water without producing metallic particles or the like as the cause of the pollution of the water.

An alloy that contains the magnesium (Mg), zinc (Zn) and calcium (Ca) as three metals having close ionization tendencies may be used for the non-noble metal body, in addition to the alloys mentioned above. The ratio of components of the alloy is preferably set at a range of Mg:Zn:Ca=86:13:1 to 90:7:3. The ratio of components of the alloy is more preferably set at a range of Mg:Zn:Ca=88:10:2 to 90:8:2. The ratio of components of the alloy is most preferably set at a value of Mg:Zn:Ca=88:10:2.

In this case, the atomic array at the surface of the Mg/Zn/Ca alloy constituting the negative electrode (−) as the non-noble metal body is disarranged in the same way as the Zn/Mg/Ca alloy, thereby forming an infinite number of positive electrodes (+) and negative electrodes (−) at the surface of the alloy in a random manner. Thus formed micro cells repeatedly disappear and appear with time while changing the positions by the dissolved oxygen in the water existing around the non-noble metal body, thereby producing the battery actions one right after the other.

Thereby, the electric current flows uniformly from the surface of the non-noble metal body so as to form the battery actions uniformly, so that the Mg ions, Zn ions and Ca ions as essential minerals run into the water without producing metallic particles or the like as the cause of the pollution of the water.

Particularly, if the component ratio of the Zn is 10% or less, it is possible to prevent disadvantages such as cracks and flaws without fail when molding the non-noble metal body into a fixed shape such as a cylinder.

Moreover, if the component ratio of Zn is 7% or more, it is possible to perform the sterilization function by Zn more effectively.

Furthermore, if Ca is added, even if Mg that is easy to burn at a high temperature is contained in a great amount, it is possible to increase flame resistance so as to conduct a high temperature casting. Moreover, it improves formability at the time of molding the alloy (at the time of casting), while avoiding formation of impurity in a molten casting material in an effective way.

[Pure Magnesium]

A magnesium itself (Mg=100%) of column shape or cylindrical shape may be used as the non-noble metal body other than the above-described alloys.

[Pure Zinc]

A zinc itself (Zn=100%) of column shape or cylindrical shape may be used as the non-noble metal body other than the above-described alloys.

[Non-Noble Metal Made of Different Kinds of Non-Noble Metal Pieces]

The non-noble body may be constituted by coupling a plurality of column bodies and/or cylindrical bodies (non-noble metal pieces as non-noble metal parts) in an axial direction, wherein each piece is made of any of the above-mentioned alloys or simple metals and wherein the couple pieces are electrically insulated with each other.

For example, a non-noble metal may be made of a first non-noble metal piece and a second non-noble metal piece. The first non-noble metal piece is made of the simple Zn metal, Zn/Mg alloy or Zn/Mg/Ca alloy into a circular solid cylinder or a circular hollow cylinder having a fixed diameter. The second non-noble metal piece is made of the simple Mg metal, Mg/Zn alloy or Mg/Zn/Ca alloy into a circular solid cylinder or a circular hollow cylinder having the same diameter as the first non-noble metal piece. The first non-noble metal piece and the second non-noble metal piece are coaxially coupled with each other to make one body with a disk-shaped electric insulator of the same diameter interposed between them.

In the above modification, an axial length of the coupled non-noble metal body composed of plural kinds of different non-noble metal pieces is set similar to an axial length of the non-noble metal body made of a singular body. Therefore, each axial length of the first and the second non-noble metal body pieces is set at a length obtained by dividing the entire axial length of the coupled metal body. The ratio of the axial length of the first and the second non-noble metal body pieces is set at a desired value depending on a function required for the battery.

That is, Zn has a specific gravity larger than Mg. Accordingly, it is preferable to use a non-noble metal body made of Mg itself, Mg/Zn alloy or Mg/Zn/Ca alloy for the purpose of weight saving when building the water battery inside a small device such as a hand-shower device.

On the other hand, Zn has a higher sterilization effect than Mg. Therefore, it is desirable to use a non-noble metal body composed of Zn itself, Zn/Mg alloy or Zn/Mg/Ca alloy in view of the sterilization capability. Moreover, there is an upper limit on the concentration of Zn in the drinking water in accordance with a water quality regulation. If the amount of Zn is too much, it is possible that the concentration of Zn in the water exceeds the regulation value.

Therefore, it is preferable to set the upper limit of the amount of Zn in the coupled non-noble metal body as a whole such that the Zn concentration becomes not more than the regulation value. Then, the proportion of the axial length of the non-noble metal pieces is set on the basis of thus determined upper limit. Particularly, the axial length of the first non-noble metal piece containing Zn as the main component is set on the basis of thus determined upper limit. Specifically, the axial length of the first non-noble metal piece is set relatively smaller, while the axial length of the second non-noble metal piece being set relatively larger.

In this case, the sterilization effect by Zn becomes lower accordingly, however, the used amount of Mg becomes relatively higher. Thus, the sterilization effect by Mg is enlarged by the increased amount of use, thereby maintaining a required sterilization effect as a whole.

[Tarnish Prevention]

In case a first reactor has a column shape (solid cylindrical shape), a second reactor having a (hollow) cylindrical shape corresponding to the column shape is disposed in a facing manner to an outside of the columnar first reactor. In case a first reactor has a (hollow) cylindrical shape, two cylindrical second reactors are disposed in a facing manner to an inside and an outside of the cylindrical first reactor, respectively. In case a first reactor has a plate shape, two cylindrical second reactors are disposed in a facing manner to opposite sides of the plate-shaped first reactor, respectively. Thus, the water battery device has a structure that an entire surface of a main portion of the first reactor completely and invariably faces a facing surface of the second reactor.

Specifically, in case the first reactor is a cylinder, an inner circumferential surface and an outer circumferential surface are main portion surfaces, respectively. In case the first reactor is a disc, opposite surfaces (in a thickness direction) are main portion surfaces, respectively. In case the first reactor is a cube or a rectangular cuboid, six facets (each surface of polyhedron) constitute main portion surfaces, respectively. That is, the surface of the main portion or the main surface means a surface that constitutes a major area of the first reactor or a surface except a small-area surface (such as end surfaces of a cylinder or end surfaces of a column) that is negligibly small. Thus, in the water battery device, the facing surface of the second reactor is disposed in a facing manner to the main portion surface of the first reactor with the clearance space by the interval keeping member.

With such structure, the entire reaction surface of the non-noble metal body faces the facing surface of the noble metal body so as to produce the battery action. Consequently, it is possible to surely prevent any troubles such as tarnish of the metal surface caused by oxidation, etc.

[Clearance Interval Between Non-Noble Metal Body and Noble Metal Body]

The clearance space is a gap of a small interval that allows the battery action to be exercised. An absolute value of the clearance space will become large in order to ensure a flow rate where the water battery device is applied to the water environment such as a river. However, in an application to a normal water environment, the clearance space has generally an interval that is nearly as large as or smaller than a thickness of the first reactor. In order to heighten the battery action between the non-noble metal body and the noble metal body to the fullest, it is preferable to set the clearance space as small as possible so far as the metals are kept from touching each other. On the other hand, if the interval of the clearance space is smaller, a volume or capacity of the clearance space between the non-noble metal body and the noble metal body becomes smaller, if a length and a diameter of the clearance space is the same, thereby lessening the capacity or volume of the battery action water. Therefore, the interval or dimension of the clearance space should be set in consideration the above mentioned factors.

Accordingly, for a general purpose, the clearance space is preferably set at about 0.1 mm or more, that is, the lower limit is preferably about 0.1 mm. For example, in case of the water battery device arranged inside a pipe such as a water pipe, the clearance space is set in a range of about 0.1 mm to 7.0 mm, preferably in a range of about 0.5 mm to 5.0 mm, more preferably in a range of about 0.5 mm to 3.0 mm, still more preferably in a range of about 0.5 mm to 2.0 mm, and still further more preferably, in a range of 0.5 mm to 1.5 mm.

Moreover, the clearance space has the same thickness at least along the length (in the longitudinal direction). However, the thickness of the clearance space may be changed in a width direction or in a circumferential direction. Still, as long as the clearance space has a uniform thickness at least in the longitudinal direction, a complete ionization of the metal of the non-noble metal body is expected.

[Relation Between Container of Water Battery Device and Biofilm/Oxide Film]

A structure of a container that contains an inner unit of the water battery device should be designed in an suitable configuration such that the battery action is normally and stably conducted and sustained at any time between the surface (positive electrode) of the non-noble metal body and the facing surface (negative electrode) of the noble metal body. For such purpose, the container is made into such a structure as to restrict a free communication of the water between the inside space of the container and the outside thereof. That is, the container has such a structure as to prevent the outside water from freely entering into the inside of the container and from freely running out of the container. Specifically, the container has a communication opening or communication hole that has a dimension (and a shape if required) set at an appropriate one in accordance with every condition of the water environment in the intended end-usage or use application.

According to the findings of the inventors, unless the battery action water ensures and maintains such a fixed concentration as to sterilize microorganisms in the container at all times, a lack of primary battery is repeated, thereby producing biofilm on the metal surface. The "lack of primary battery" means a state in which all the metal ions and active oxygen species as active substances inside the water battery device are completely consumed and exhausted and in which the active substances cannot be reproduces in time.

It was also found by the inventors that the following factors relate to the formation of the biofilm, while the biofilm was largely involved in the enduring and persistent performance of the battery action of the water battery device.

1) Water quality, bacteria volume, water temperature
2) Configuration and structure of water battery device as well as dimension of battery action tank (container)
3) Kind or selection and used amount of metal material used for electrodes

[Structure of Water Battery Device Container to Prevent Biofilm/Oxide Film]

The present invention has studied the above-mentioned three conditions as important factors to inhibit the biofilm from being formed on the surface of the metal constituting the electrode without any maintenance and to enable a permanent battery action. Then, the invention has improved the structure of the water battery device as follows.

1) An indirect communication-type (indirect flowing-in-and-out-type) container structure is adopted as a structure (particularly as a container structure) of a water battery device with a dry cell battery configuration ("dry-cell-type water battery device") that will be shown in an embodiment described later. That is, the dry-cell-type water battery device does not use an open container structure that allows used water enter into the container of the water battery device in full amount. By contrast, with the indirect communication-type structure, only part of the used water enters into the container and runs out of the container. Specifically, the water flows in and out of the container in an indirect manner and at a restricted flow rate through a flow rate adjusting means such as a communication hole for restricting the flow rate or a flow rate adjusting plate provided on the container. With such adjusting means, the water communicates or circulates at such restricted flow rate in the clearance space as a battery reaction space or a battery action space between the non-noble metal body and the noble metal body at the inside of the container.

2) As such indirect flowing-in-and-out-type container structure, the water battery device provides the container with an inflow opening that has an opening diameter restricted to a fixed range in relation to an inner diameter of the container such that the diameter of the inflow opening is set within a predetermined range relative to an inner diameter of a pipe member such as a flowing water pipe as an object on which the water battery device is disposed in the water. Specifically, in case of a water environment having a relatively low concentration of microorganism in water (i.e. having a small number of microorganisms per unit volume of water) such as a well water for drinking, the diameter of the inflow opening is restricted within a range of about $1/20$ to $3/10$ of the inner diameter of the container, preferably within a range of about $1/15$ to $1/10$. On the other hand, n case of a water environment having a relatively high concentration of microorganism such as a bathwater, the diameter of the flow-in opening is restricted within a range of about $1/20$ to $1/15$ of the inner diameter of the container.

Thus, the present invention has such a container structure as to prevent a primary battery water, which is produced by the inner unit inside the container of the water battery device, from being consumed in full amount and exhausted by an amount of the water flowing from the outside of the container into the inner unit inside the container (particularly by an amount of the water flowing into the clearance space as a battery action zone between the non-noble metal body and the noble metal body). Here, the "primary battery water" means a function water containing metal ions and active oxygen species by a primary battery action between the non-noble metal body and the noble metal body. That is, if the metal ions and the active oxygen species (that are involved in the function or performance for sterilization or the like) in the battery action water is completely consumed by the influent water and disappear, it is impossible to sterilize microorganisms contained in the next water that flows into the container thereafter. Thus, the container has the above-described structure to avoid such defects or troubles.

3) Along with the structure of the container itself, the inventors focused on the facts that a water pressure in the pipe member is different depending on a kind of the piping member such as a flowing water pipe or a flowing water conduit as an object to which the water battery device is applied. Then, the invention prepares separately plural kinds of flow rate adjusting plates provided with flowing rate adjusting holes having different hole diameters for use in several applications. Thereby, one of the flowing rate adjusting plates having a different hole diameter is used depending on the water pressure in the pipe member.

Specifically, there is prepared a plurality of kinds of flow rate adjusting plates provided with flowing rate adjusting holes having diameters smaller than the hole diameter of the communication hole of the container. Then, a flow rate adjusting plate having an optimum flow rate adjusting hole is used according to the water pressure of the pipe member.

At this time, a flow rate adjusting plate having a flow rate adjusting hole of relatively large diameter is fitted on the communication opening of the container in case of a pipe member of relatively low water pressure. Then, a diameter of a hole that allows the water to flow in and out of the container decreases in size to the diameter of the flow rate adjusting hole, which is smaller than the diameter of the communication hole, so as to reduce the amount of the water flowing in and out of the container (compared with the amount in case of the communication hole). A flow rate adjusting plate having a flow rate adjusting hole of relatively small diameter is fitted on the communication opening of the container in case of a pipe member of relatively high water pressure. Then, a diameter of a hole that allows the water to flow in and out of the container decreases in size to the diameter of the flow rate adjusting hole, which is smaller than the diameter of the communication hole and is still smaller than the diameter in the case of the pipe member of low water pressure, so as to more reduce the amount of the water flowing in and out of the container (compared with the amount in case of the communication hole and even the amount in case of the pipe member of relatively low water pressure). Thus, the flow-in and flow-out rate is adjusted.

[Restriction of Water Communication Inside Container]

In the water battery device, an opening area of the communication hole of the container is relatively set in relation to a total facing area of the first reactor and the second reactor housed in the container and/or a total volumetric capacity of the clearance space between the first reactor and the second reactor such that the water outside of the container flows in the inside of the container at a restricted flow rate per unit time and flows out of the container at the restricted flow rate per unit time. The "restricted flow rate per unit time" means a flow rate that is smaller than a flow rate in case of a free communication, for example, a flow rate one half or less as large as the flow rate at the time of free communication (free flow-in and flow-out).

Moreover, the opening area of the communication hole of the container is set at a predetermined value or in a predetermined range such that, when the water of the restricted flow rate per unit time flows in the inside of the container through the opening hole and circulate the inside of the container and then flows out of the container through the opening hole, the concentration of the metal ions and the active oxygen species contained in the battery action water existing in the clearance space between the first reactor and the second reactor housed in the container is continuously maintained at a value not less than a fixed concentration required to inhibit biofilm being formed on the first reactor and/or the second reactor (particularly, only the first reactor in case the second reactor is made of a corrosion resistant material such as a stainless steel) caused by microorganisms in the water existing in the clearance space between the first reactor and the second reactor. Such required concentration is a value required to kill the microorganisms almost completely in a stable manner for a continuous and long time period, i.e. not less than the concentration at which the metal ions or active oxygen species are not completely consumed and part of them remain after performing their functions.

The diameter of the communication hole is set at a diameter one third or less of the diameter of the container so that the water outside of the container does not freely communicate inside the container. Alternatively, the diameter of the communication hole is set at such a diameter as to maintain the concentration of the battery action water contained in the water inside the container at a fixed concentration that is not less than (at least twice or more) the concentration of the battery action water contained in the water outside the container, i.e. at a concentration that is able to inhibit the formation of the biofilm.

Thus, the communication hole is provided to restrict the communicating amount of the water at the inside and outside of the container. Thereby, the water is communicated inside and outside the container in a restricted state by the communication hole such that the battery action water existing at the clearance space between the first reactor and the second reactor of the inner unit inside the container can be released by little and little to the outside of the container. Thus, it is possible to keep the concentration of the metal ions and the active oxygen species, which are contained in the battery action water existing at the clearance space, to the fixed concentration or more that is larger (e.g. at least twice or more) than the concentration at the outside space (i.e. to the concentration that can inhibit the formation of the biofilm).

An absolute range of the "restricted flow rate per unit time" cannot be determined or generalized for each of applications since condition for forming the biofilm are varied in accordance with various conditions such as water quality (concentration of microorganisms in the water, turbidity or the like) or water quantity in the water environment in which the water battery device of the present invention is used. Therefore, it is hard to specify or generalize the diameter of the communication hole of the container or its relative range for each of the applications. However, in case of the tap water, the hole diameter is set in the range of about 1/10 to 3/10 of the inner diameter of the container as mentioned above, for example. Thus, the hole diameter is set at an appropriate value depending on each of the applications (particularly depending on the concentration of microorganisms in the water as the object to be applied or the number of microorganism per unit water quantity or the number of microorganism per unit time).

The opening area of the communication opening of the container is set at a predetermined value such that, when the water of the restricted flow rate per unit time flows in the inside of the container through the communication opening and circulates the in the container and then flows out of the container through the communication opening, a concentration of oxygen in the water entering into the clearance space between the first reactor and the second reactor accommodated in the container becomes a value not less than a fixed concentration that is required for producing the metal ions (as positive ions) and the hydroxide ions (as negative ions corresponding to positive ions) and the active oxygen species (thought to be produced corresponding to positive ions) at the clearance space between the first reactor and the second reactor, while continuously maintaining the fixed concentration of the metal ions and active oxygen species.

That is, the diameter of the communication opening is adjusted or set at an appropriate value such that the oxygen is contained in the water at the clearance space (battery action space) between the non-noble metal body and the noble metal body inside the container always in such an amount as to be required for producing the negative ions and active oxygen species in the battery action water. Here, such required oxygen includes the oxygen existing in molecules to contribute to the production of negative ions and active oxygen species. Thereby, the oxygen for taking in the electrons generated from the non-noble metal body is prevented from draining. Accordingly, it is possible to stably ensure the formation of the active oxygen species and to inhibit the formation of the biofilm in an effective way.

[Example of Container Structure]

The container is disposed in a water flowing conduit of a pipe member in which the water flows along the conduit. Moreover, the container has a hollow cylindrical shape that is arranged along an axis of the pipe member, while making opposite ends closed ends. The communication opening is formed into a small hole shape on only one of the closed ends so as to penetrate the one closed end and communicate with an inside space of the container. The container is fixedly disposed in the conduit of the pipe member such that its axis is parallel to a flowing direction of the flowing water in the conduit of the pipe member and such that the one closed end is located at a downstream side of the container so as to set the communication opening only at the downstream side of the conduit of the pipe member.

Alternatively, the communication opening may be formed on the container only at an upper side portion of an outer peripheral surface that is located at an upper side when arranged in the conduit of the pipe member. In this case, the container is disposed such that the communication opening is located only at the upper side of the conduit of the pipe member.

Alternatively, the communication openings may be formed on both the closed ends of the container, respectively.

Alternatively, the container of a circular cylinder shape may be disposed such that its axis crosses the flow direction of the flowing water at right angles. In this case, a flow rate restricting hole is formed only at an upper part of the container. Then, plural kinds of flow rate adjusting plates are prepared for making a diameter of the restricting hole of the container smaller. Thereby, one of the flow rate adjusting plate may be disposed in accordance with the flow rate.

[Active Oxygen Produced (Reason)]

The inventors conducted verification tests on the action or mechanism by which the water battery device having the above-mentioned features produces the active oxygen species. In the verification tests, unfortunately, a direct verification result was not obtained to demonstrate the facts that the antibacterial action is caused by the active oxygen species. This is because the active oxygen species (typically five kinds of active oxygen species) have a very short lifetime. That is, the stronger the active oxygen species are, the shorter the life time is. The lifetime is just one-hundred-thousandth second to five-hundred-thousandth second. Even the lifetime of the hydroxide ions (OH$^-$), which is sometimes classified as one of active oxygen species but is not excited and activated as the other active oxygen species, is said to be about one minute at the longest.

The active oxygen species in excited and activated state have a sufficient bactericidal power to sterilize the germs in the passing water in a moment. On the other hand, the weak active oxygen species (i.e. hydroxide ions) that are not in the excited and activated state are not capable of sterilizing the germs in the passing water at once.

Moreover, the metal ions ($Zn^{2+}$ and $Mg^{2+}$) in the battery action water produced by the water battery device have no instantaneous sterilization effect. It has been proved by the inventors that it needs about 24 hours to remove various germs or the like in a number of about $10^5$. Thus, it is incontestable that the sterilization of the germs in the passing water is impossible only with the metal ions.

In addition, the inventors conducted passing water tests in which the water batter device of the present invention was disposed in a water flowing conduit that passed a well water containing 720 CFU/ml of common bacteria.

In these passing water tests, no common bacteria were detected in two samples of the well water that were collected immediately from the continuously passing water. In contrast, bacteria of 880 CFU/ml and 660 CFU/ml, which were nearly the same as the number before the passing water tests, were detected in two samples of the well water that were collected after spouting and storing the passing water at one hour intervals.

It means that, since there are no possible elements for sterilizing the passing water at once other than the active oxygen species, the passing water was sterilized by the active oxygen species. That is, there must be a condition realized for producing the active oxygen species in the passing water using the water battery device.

As regards the facts that the bacteria were detected in the two water samples collected at one hour intervals, it is presumed that bacteria in the air were stuck at an inside of a spout of a faucet near an outlet thereof and mixed into the outgoing water.

In view of these successive verification results, the inventors concluded that, since there were no other sterilizing constituents thinkable than the active oxygen species, it was attributed to the active oxygen species produced by the water battery device that had sterilized instantaneously the bacteria in the flowing water that passed the water battery device of the present invention.

Thereafter, the inventors conducted a first verification test for bathwater in the same manner.

In the verification test, well water of 700-800 CFU/ml of common bacterial was used as the bathwater. After bathing, the bathwater was collected and the collected bathwater was tested in a water quality test in the next morning.

As a result, common bacterial of 930,000 CFU/ml were detected in the bathwater.

On the other hand, the inventors have finished a circulation device for sterilizing passing water in a circulating water conduit by the water battery device of the present invention. Specifically, in the circulation device, the water battery device is arranged inside the circulating water conduit, while the bathwater using the well water being circulated at 50 to 60 L/min by a massaging jet device.

Then, the inventors conducted a second verification test for examining the quality of the bathwater that was circulated by the circulating device for 4 minutes during bathing in the same way as the first verification test.

As a result, the number of common bacteria in the bathwater was lessened up to 34,000 CFU/ml.

Since germs grow proliferously in the bathwater until the bathwater as the sample was brought in a laboratory for water quality examination test and .tested, the water itself supplied to the quality test has a poor reliability. Still, the number of bacteria of 930,000 CFU/ml decreased up to 34,000 CFU/ml in a short time. Therefore, considering the facts in a comprehensive manner, it is thought that the active oxygen species are involved in the antibacterial action of the water battery device.

Moreover, the inventors measured an electromotive force of the water battery device of the present invention in a verification test.

In the measurement test, a non-noble metal body of a circular cylinder shape made of the Zn/Mg alloy was used as an anode (negative electrode), and noble metal bodies of circular cylinder shape (of large diameter and small diameter) as cathodes (positive electrodes) were disposed in an overlapping manner and coaxial manner at an inside and an outside of the anode so as to form three-layered structure. Moreover, the intervals between the anode and the cathodes were fixed and kept constant by interval keeping members made of plastic. Furthermore, the anode, cathodes and interval keeping members were surrounded and accommodated in an outside protective cover (having slits) made of plastic so as to define a unit. Thereafter, the unit was immersed in a tap water and a pure water (distilled water), respectively, and the electromotive force (potential difference) was measured.

As a result, in case of the tap water (water temperature of 18.4 degree centigrade), the electromotive force was 1.389V (about $0.9V/dm^2$). In case of the pure water (water temperature of 15.6 degree centigrade), the electromotive force was 1.238V (about $0.8V/dm^2$).

Before the test, it was predicted that the electromotive force would become very smaller in case of the immersion in the pure water than in case of the immersion in the tap water, since the electric conductance of the pure water was very smaller than that of the tap water. However, contrary to the prediction, it was confirmed that the electromotive force became just a little bit smaller.

That is, though the electric conductivity of the pure water (about 1 μS/cm) is ¹/₂₀₀ of the electric conductivity of the tap water (about 200 μS/cm), there is only a difference of about $0.1V dm^2$ between them.

Accordingly, from the test results, it is guessed that it is not the electric conductance by impure substances (sodium, chlorine or the like) in the water but the oxygen ($O_2$) in the water that is largely involved in the electric current generated between the anode and the cathode in the water battery device of the present invention.

That is, presupposition that the electric current generated between the anode and the cathode depends only on the electric conductance is largely contradictory to the test results. Therefore, it is supposed that, when the water battery device of the present invention is disposed in the water, there is produced a battery action by the water ($H_2O$) and the dissolved oxygen ($O_2$) in the water between the anode and the cathode.

That is, it is supposed that there is generated a battery action similar to a micro corrosion cell action using the dissolved oxygen in the water at the anode so as to elude the metal ions into the water, while there is an electric current generated between the anode and the cathode using $OH^-$ produced in accordance with the battery action.

[Comparison of Sterilization Effect with Photocatalyst]

The active oxygen generation in the water by the inventive water battery device is comparable with an active oxygen generation in the water by a photocatalyst. For example, where a coated object having a surface formed with a photocatalyst film is immersed and ultraviolet rays are irradiated on the surface, the photocatalyst (titanium oxide or the like) on the surface is excited and activated.

That is, at this time, electrons are released from the photocatalyst to form positive holes by the irradiation of the ultraviolet rays to the photocatalyst. Since the positive holes have strong oxidation power and act as electron acceptors to strip off the electrons from electron donors in the water such as $OH^-$ (hydroxide ions). The $OH^-$ with electrons stripped off become OH radicals (active oxygen species) that are very instable. Thus, the active oxygen species are produced when the water is contacted with the excited photocatalyst (primary reaction).

Moreover, thus produced active oxygen species have high reactivity and react with dissolved substances in the water so as to be stabilized, thereby producing reactive products in accordance with the dissolved substances (secondary reaction). The reactive products are finally become carbon dioxide ($CO_2$) and water ($H_2O$) or the like to be stabilized.

The photocatalyst is said to perform a variety of functions and effects such as sterilization in the water by the active oxygen species generated by the primary reaction (or perform functions and effects such as sterilization to a certain degree by the products in the second reaction).

On the other hand, the water battery device of present invention has an utterly different basic structure from the photocatalyst. It has been verified by a variety of substantive experiments that the water battery device performs a variety of similar functions and effects such as sterilization in the water just by being immersed in the water without any need of irradiation of ultraviolet rays.

That is, with the inventive water battery device, the metal ions ($Zn^{2+}$, $Mg^{2+}$, $Ca^{2+}$ or the like) and the electrons are released in the water by the battery action using the water ($H_2O$) and the oxygen ($O_2$). The released electrons are taken in the oxygen in the water to become hydroxide ions ($OH^-$). The $OH^-$ has an electron with no bond (unpaired electron) and is in very instable state. Such state of $OH^-$ tends to strip off an electron from substances surrounding it such as metal ions or organic substances so as to stabilize itself or to be stabilized (oxidized).

Then, the substances with electrons stripped off seize electrons from substances surrounding them in sequence (excite themselves) to be strong active oxygen species. At last, they become the water to be stabilized.

As described above, the inventive water battery device needs no power source and requires no external energy (ultraviolet rays or the like). Moreover, the water battery device is a primary cell performing the above-mentioned actions by using the oxygen in the water without any electrical connection of the metals (non-noble metal and noble metal), which is contrary to the action of galvanic anode and the like. Thus, as described above, the water battery device produces various active oxygen species via the oxygen in the water and provides useful functions and effects such as sterilization by the active oxygen species and so on.

[Bad Active Oxygen Scavenging Ability by Battery Action Water]

The active oxygen species contained in the above-mentioned battery action water produced by the water batter device disappear instantaneously. Therefore, in case the battery action water is released from the water battery device to an outside, e.g. the battery action water of the water battery device housed in a water faucet apparatus is spouted from a spout of the faucet apparatus, it is presumed that no active oxygen species are contained (disappeared) in such battery action water. Still, the inventors confirmed by verification tests that such battery action water became reduced hydrogen water to perform high oxidizing power, thereby eliminating or curbing external active oxygen species and functioning in the same way as an enzyme SOD (superoxide dismutase).

That is, the confirmation test for removing effects of active oxygen of the water battery device was carried out by use of an electro spin resonance (ESR) apparatus, while DPPH radicals being used as radical generation reagents. As a result, it was found that the battery action water obtained by the water battery device was weak alkali reduced water (reduced water of pH 10.7 and oxidation-reduction potential ORP-420).

Moreover, the active oxygen scavenging effect was confirmed by use of the electro spin resonance (ESR) apparatus, while DPPH radicals being used as radical generation reagents.

As a result, it was verified that, though the active oxygen species were eliminated by 0% in the pure water and by only 0.2% in the tap water, the active oxygen species were eliminated by 25.66% by use of the water battery.

[Advantages of Water Battery Device]

Unique advantages obtained by the above-mentioned water battery device are as follows.

(1) It is able to sterilize any kind of water. In the invention, the "sterilization" includes every concepts relating to kill or remove microorganism (fungi, mold, bacteria, germs, virus and so on) such as anti-bacteria, antisepsis (full sterilization), disinfect (bacteria-removal), bacteria-prevention. Moreover, germs or bacteria as removed objects include a variety of microorganisms such as virus, bacterial, germs, microbes and so on. Accordingly, the sterilization function includes an anti-fungal action.

(2) It is able to inhibit generation of biofilm (slimy substance).

(3) It is able to supply Zn ions and Mg ions eluted in the water to a drinker as "essential minerals". Moreover, the battery action is capable (4) It enables the hydrogen to selectively eliminate "hydroxyl radical" among the active oxygen species. Moreover, the SOD (superoxide dismutase) is produced in large amount. The SOD is one of the enzymes that cubs the active oxygen species and involved substances are minerals such as zinc, magnesium, selenium, manganese, copper, iron. The generated SOD decomposes and eliminates the bad active oxygen species by its action as enzyme (in which Zn and Mg are involved among the above-mentioned minerals). Thus, it is possible to remove and control antigenic actions of every living organism such as human beings, animals, plants.

(5) It changes shower water or face washing water from a faucet into hydrogen water. Moreover, the bathwater becomes mineralized water and reduced water by using the water battery device in a bath system having water circulation mechanism.

(6) The water treated by the inventive water battery device (reduced water as battery action water) is usable as the water for hydroponic culture, for sterilization purpose of the water in fish firm, for supplementary purpose of mineral, or for removing and controlling antigenic actions of farm goods or fishes. Moreover, the treated water of the invention may be sprayed directly to firm goods to protect the goods against insects or harmful bugs.

(7) The treated water by the inventive water battery device is used as "mineral supplementing water" for domestic animals so as to remove and curb the antigenic action of the domestic animals. Moreover, the treated water may be used as odor eliminating water or sanitizing water to deodorize or sanitize a cattle house.

(8) The reduced water as the battery action of the invention may be used in a freshness keeping process of fresh foods so as to keep the freshness of the fresh foods. Moreover, if the reduced water is frozen (made into ice) to form ice and crystal, the reducing effects can be multiplied.

[Other Advantages of Water Battery Device]

Among the water battery devices described above, the water battery device that uses the non-noble metal body made of the simple zinc or the zinc-magnesium alloy adding the magnesium to the zinc in the above-mentioned compounding ratio has the following unique functions and effects.

Specifically, such water battery device is able to sterilize or deodorize the water during passing a water pipe in a moment or sterilize the store water when immersed in the water by the battery action using the zinc and magnesium as bioelements.

The sterilizing function is thought to be the same as a sterilizing mechanism by the active oxygen species carried out in a live body.

Accordingly, it may be said that the water environment device is an instrument (water environment regenerating device) that revives the natural environment by refreshing the water by the functions and effects, without any use of chemical agents such as conventional anti-germ products, to the same or more degree.

On the other hand, among the water battery devices described above, the water battery device that uses the non-noble metal body made of the simple magnesium or the magnesium-zinc alloy adding the zinc to the magnesium in the above-mentioned compounding ratio has the following unique functions and effects.

Specifically, the water battery device is able to produce a so-called "mineralized reduced hydrogen water" when disposed in a water container (water keeper) that is filled with the tap water. Moreover, the water battery device is able to continue producing the "mineralized reduced hydrogen water" over a long period only by restocking the tap water into the water container. That is, the water battery device continues such action over a semipermanent period until the non-noble metal body consumes by the battery action to finally loses the battery action. The "mineralized reduced hydrogen water" is said to remove and control the "bad active oxygen species" that is produced in the live body and that is believed to be a root of various sicknesses and aging. Thus, the "mineralized reduced hydrogen water" is thought to excel in anti-aging effects so as to become a disease preventing water or disease treating water for serious diseases.

The water produced by the present water battery device becomes "water mastering ultimateness" having an oxidation-reduction potential higher by 200% or more than the "spring water of base of Mt. Fuji" that is one of the typical reduced waters in Japan.

First to Fifteenth Embodiments

Best modes for embodying the present invention ("embodiment") will be described hereinafter. Through each embodiment, the same numerals are appended to the same member or elements or parts to avoid redundant explanation.

First Embodiment

Figure 1B:
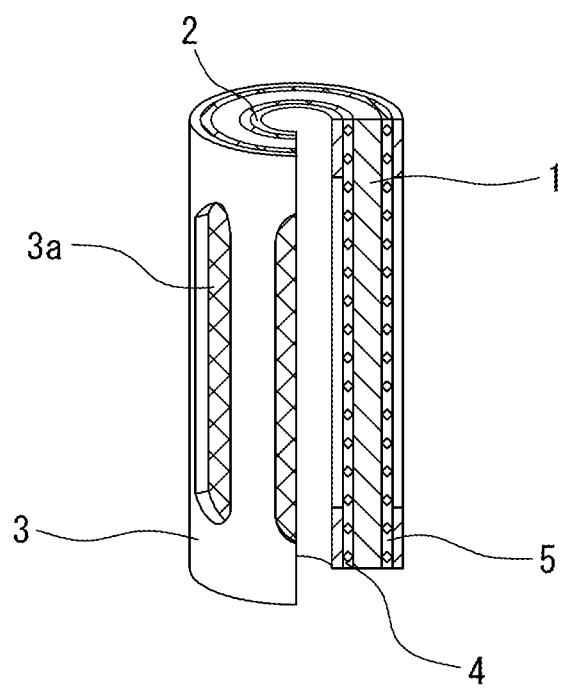
FIG. 1B is a perspective view, partly depicting a cross-section, of the inner unit, to show an inner structure of the inner unit by cutting away about one fourth of the inner unit.

As shown in FIG. 1, a water battery device according to the first embodiment of the invention has a non-noble metal body 1 having a simple circular cylinder shape with a predetermined diameter and a predetermined length. An inner noble metal body 2 is coaxially arranged at an inside of the non-noble metal body 1. The inner noble metal body 2 has a simple circular cylinder shape with a diameter smaller than that of the non-noble metal body 1 by a dimension corresponding to a clearance space. An outer noble metal body 3 is coaxially arranged at an outside of the non-noble metal body 1. The outer noble metal body 3 has a simple circular cylinder shape with a diameter larger than that of the non-noble metal body 1 by a dimension corresponding to a clearance space. An interval keeping member 4 of a small diameter is coaxially arranged and interposed between an inner peripheral surface of the non-noble metal body and an outer peripheral surface of the inner noble metal body 2. The inner interval keeping member 4 has a circular cylindrical net shape corresponding to the inner clearance space. Thus, the inner clearance space that is a minute interval with a uniform thickness is formed between the inner peripheral surface of the non-noble metal body and the outer peripheral surface of the inner noble metal body 2. An interval keeping member 5 of a large diameter is coaxially arranged and interposed between an outer peripheral surface of the non-noble metal body and an inner peripheral surface of the outer noble metal body 3. The outer interval keeping member 5 has a circular cylindrical net shape corresponding to the outer clearance space. Thus, the outer clearance space that is a minute interval with a uniform thickness is formed between the inner peripheral surface of the non-noble metal body and the outer peripheral surface of the inner noble metal body 2.

The noble metal body 3 has slots 3a of slot shape extending along its axis on locations placed at fixed angular interval in a circumferential direction, respectively.

Though not shown, an inner unit that is composed of the non-noble metal body 1, noble metal bodies 2 and 3 and interval keeping members 4 and 5 is accommodated and arranged directly in a protective cover made of a synthetic resin. The protective cover has a predetermined shape such as a bottomed circular cylindrical shape having an openable lid. Alternatively, the inner unit is housed and disposed in a protective cover made of a metal via an isolating member having a circular cylindrical net shape. The isolating member is made of an electric insulating material to isolate the noble metal body 3 and the protective cover.

Second Embodiment

Figure 2:
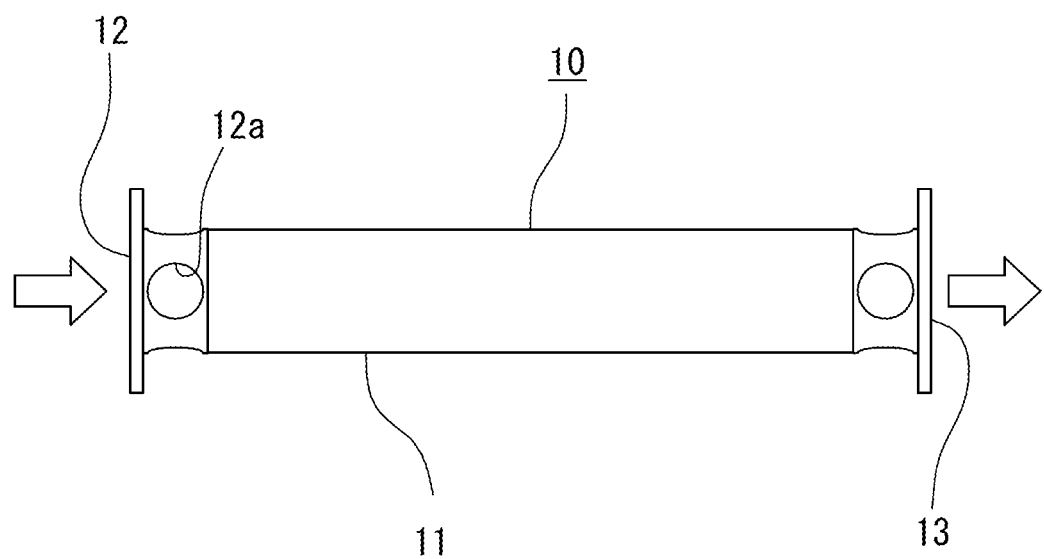
FIG. 2 is a side view showing a water treatment device for running water purification as a water battery device according to a second embodiment of the invention.
Figure 3:
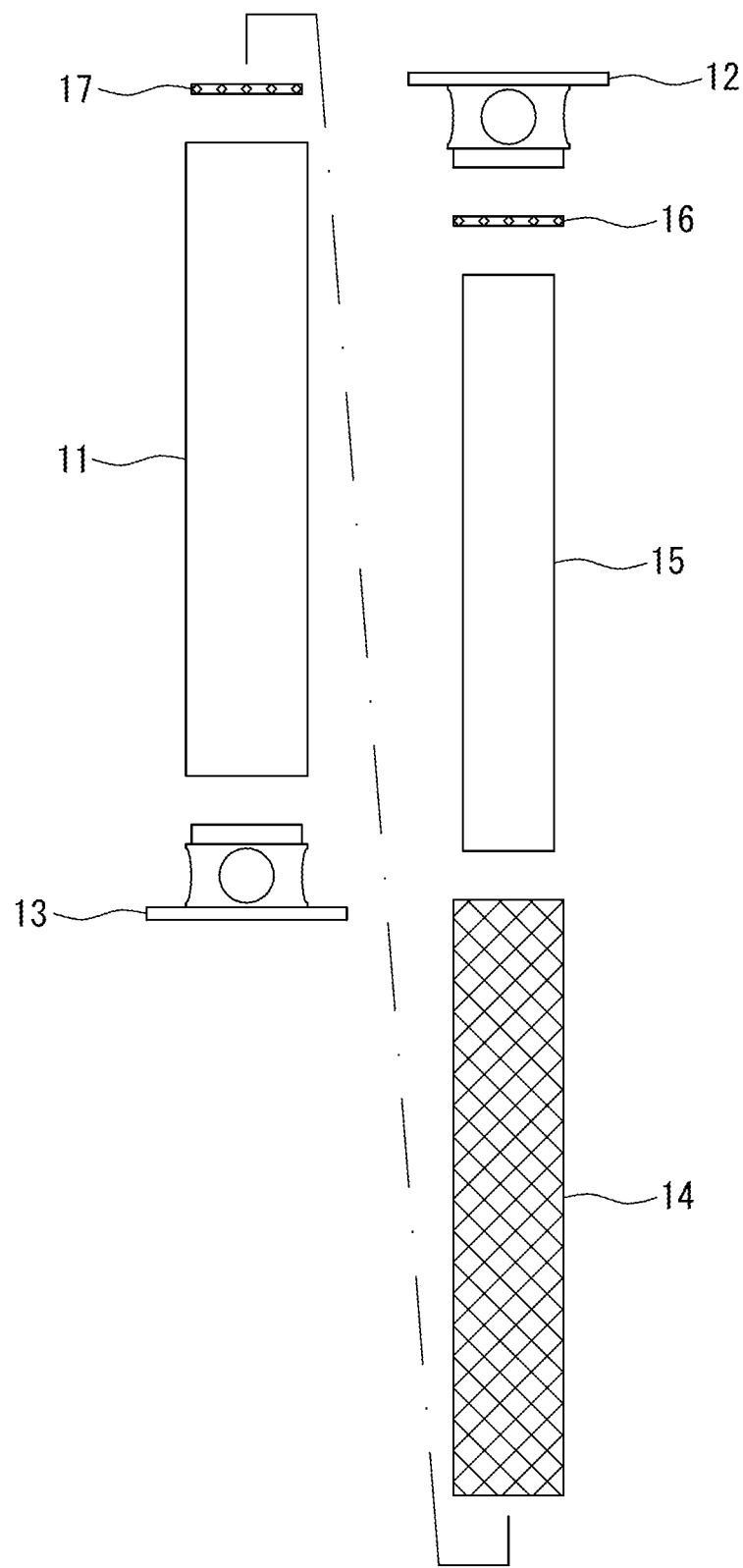
FIG. 3 is an exploded side view showing an arrangement of parts or components of the water treatment device for running water purification as the water battery device according to the second embodiment of the invention.
Figure 4:
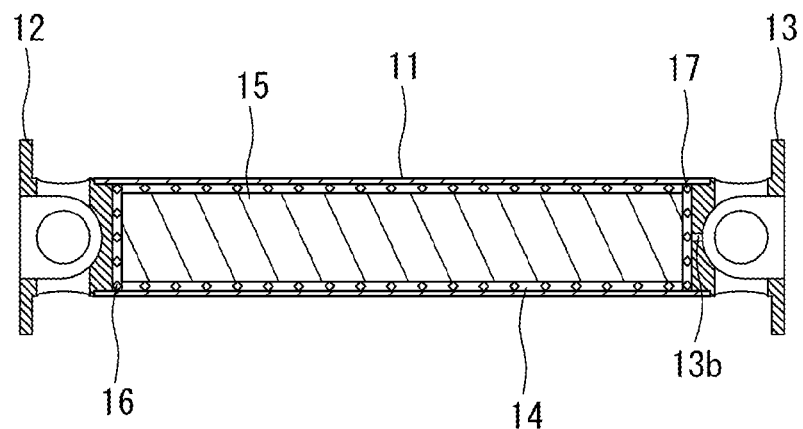
FIG. 4 is a cross-sectional view of the water treatment device for running water purification as the water battery device according to the second embodiment of the invention.

As shown in FIG. 2 to FIG. 4, a water battery device according to a second embodiment of the invention is concretized into a water treatment device 10 for flowing water purification (i.e. flowing water type water battery device that is accommodated in flowing water).

In detail, the water treatment device 10 is a type of water treatment instrument that is used in the flowing water while being put therein. As shown in FIG. 2, the water treatment device 10 has a structure composed of a housing 11, a inlet portion 12 and an outlet portion 13. The housing 11 has a circular cylindrical shape with opposite ends opened and is constituted by a circular cylindrical noble metal body described later. The inlet portion 12 has a short circular cylindrical shape with a flange. The outlet portion 13 has a short circular cylindrical shape with a flange. The inlet portion 12 and the outlet portion 13 are fixed to a right end and a left end of the housing 11 in coaxial manner so as to be detachable by tight fitting or screwing, respectively.

When the water treatment device 10 is fitted and housed inside a water environment of a receiving member to which the device 10 is applied, the flanges of the inlet portion 12 and the outlet portion 13 are contacted and engaged with an inner peripheral surface of an inside space of the receiving member, respectively. Typically, the inside space of the water environment may be a flowing water conduit at an inside space of a pipe member such as a tap water pipe, and the flanges are held and stopped on the inner peripheral surface of the conduit of the pipe member.

Moreover, outer ends (axial ends near flange) in the axial direction of the inlet portion 12 and the outlet portion 13 are formed with circular openings, respectively, to define opening ends. Inner ends (axial ends near housing 11) in the axial direction of the inlet portion 12 and the outlet portion 13 are made into closed ends, respectively, so that the inlet portion 12 and the outlet portion 13 block up the opposite end openings of the housing 11 in watertight manner.

Furthermore, cylindrical portions of the inlet portion 12 and the outlet portion 13 have circular communication holes 12a and circular communication holes 13a, respectively. The communication holes 12a and 13a penetrate the cylindrical portion walls at fixed positions located at predetermined angular intervals in a circumferential direction. In the example of FIG. 2, two holes 12a and two holes 13a are formed at 180 degrees intervals on the inlet portion 12 and the outlet portion 13, respectively, so as to communicate with the opening ends of the inlet portion 12 and the outlet portion 13 via the inside space of the cylindrical portions thereof.

The inlet portion 12 is located at an upstream side of the inside space or conduit of the receiving member, while the outlet portion 13 is located at a downstream side. Thus, the water flowing from the opening end of the inlet portion 12 to the inside space thereof flows out of the inside space toward an outer peripheral surface of the housing 11 via the communication holes 12a. Then, the water flowing along the outer peripheral surface of the housing 11 flows into the inside of the outlet portion 13 through the communication holes 13a and flows out of the outlet portion 13 through the opening end thereof toward the downstream side.

Moreover, as shown in FIG. 4, a communicating hole 13b as a fine hole and a through hole is formed at the center of the closed end of the outlet portion 13. The inside space of the housing 11 communicates with the outside space (at the side of the outlet portion 13) through the communicating hole 13b.

In the present embodiment, a diameter of the communicating hole 13b is set at about 1/15 of a diameter of the housing 11.

On the other hand, as shown in FIG. 3, in the water treatment device 10, the housing 11 as a container constitutes a circular cylindrical noble metal body (second reactor). A non-noble metal body 15 is accommodated and arranged in the housing 11 as the noble metal body via an isolating net 14. The non-noble metal body 15 has a circular cylindrical shape corresponding to the cylindrical shape of the housing 11. The net 14 has a circular cylindrical net shape as an interval keeping member.

An isolating net 16 and an isolating net 17 are interposed between one of the opposite ends of the non-noble metal body 15 and an inner surface of the closed end of the inlet portion 12 corresponding to the one end and between the other of the opposite ends of the non-noble metal body 15 and an inner surface of the closed end of the outlet portion 13 corresponding to the other end, respectively. The isolating nets 16 and 17 have a circular net shape corresponding to the inner surfaces of the inlet portion 12 and the outlet portion 13. The isolating net 14 has a circular cylindrical net shape having an outer diameter such that it nearly touches the inner peripheral surface of the housing 11. The isolating net 14 has an axial length shorter than that of the housing 11 by a total of thicknesses of the isolating nets 16 and 17 (i.e. the same axial length as the non-noble metal body 15).

The non-noble metal body 15 has an outer diameter smaller than the inner diameter of the housing 11 by the thickness of the isolating net 14. The non-noble metal body 15 has an axial length smaller than the axial length of the housing 11 by the total of the thicknesses of the isolating nets 16 and 17.

The isolating net 14 and the isolating nets 16 and 17 provide at least inner surface sides with supporting structures for the non-noble metal body 15. The supporting structures touch the outer peripheral surface, the one end surface and the other end surface of the non-noble metal body 15, respectively, in a point-like manner or in a linear manner so as to support the non-noble metal body 15. Specifically, the nets 14, 16 and 17 have a plurality or multiplicity of dot-like small protrusions each having a sharp top end or linear ribs each having a sharp ridge formed on the inner surface so as to support the non-noble metal body 15 by point contact or by line contact.

Figure 5:
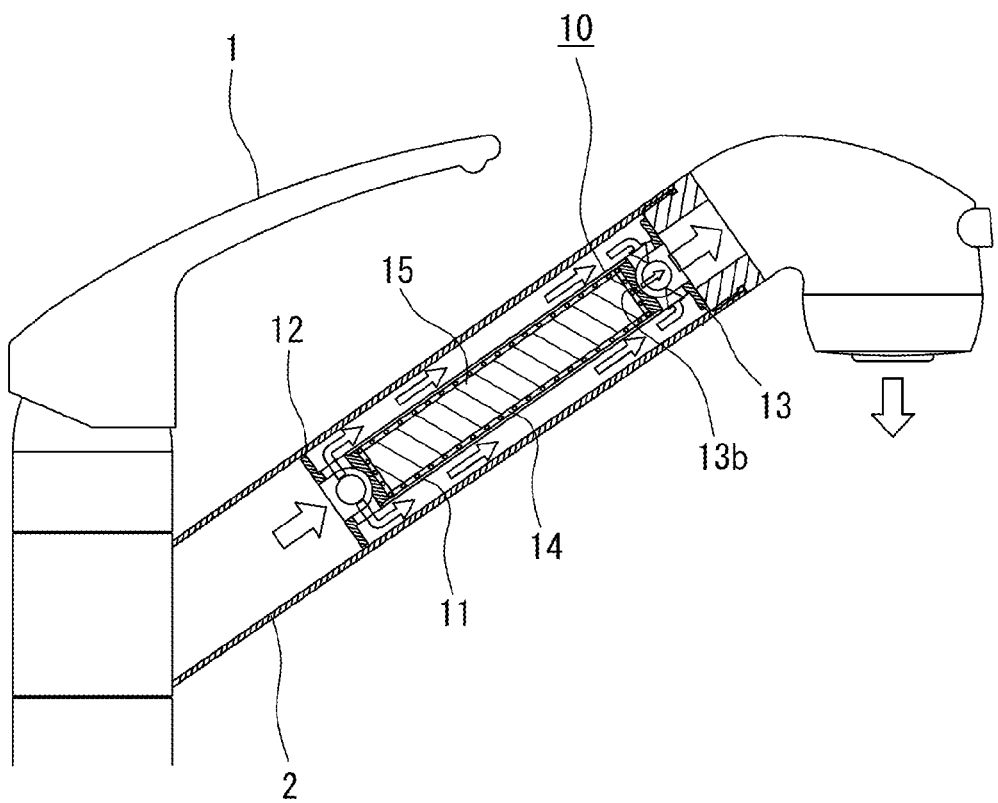
FIG. 5 is a cross-sectional view showing the water battery device according to the second embodiment of the invention that is housed and fitted in a faucet pipe of a water tap as one example of an object to be assembled.

As shown in FIG. 4 and FIG. 5, the isolating net 14 is inserted in the housing 11. Then, the non-noble metal body 15 is inserted into the isolating net 14 and the isolating nets 16 and 17 are disposed at the opposite ends of the metal body 15 in overlapped manner. Thereafter, the inlet portion 12 and the outlet portion 13 are fitted to the housing 11. Thus, all the components are assembled to form an integral unit of the water treatment device 10.

The non-noble metal body 15 has a simple circular column shape of a predetermined diameter that is made of a zinc/magnesium alloy containing a prescribed content of magnesium (in the range of 3-10% or preferably in the range of 3-5%).

The housing 11 has a simple circular cylindrical shape of a predetermined diameter that is made of a stainless steel (preferably SUS304). The inner diameter of the housing 11 is larger than the non-noble metal body 15 by the thickness of the isolating net 14. The housing 11 has the same cross-section over its full length (in the axial direction) and extends a predetermined length (the same length as the non-noble metal body 15).

The isolating net 14 constitutes an interval keeping member.

That is, the isolating net 14 is made of an electric insulating body such as synthetic resin or rubber. When the non-noble metal body 15 is accommodated inside the housing 11 as the noble metal body, the isolating net 14 holds the non-noble metal body 15 and the noble metal body (housing 11) in a fixed manner to each other. In detail, the isolating net 14 supports them such that the outer peripheral surface of the non-noble metal body 15 and the inner peripheral surface of the noble metal body are kept in a non-contact state with each other over their entire surfaces. At the same time, the non-noble metal body 15 and the noble metal body are secured to each other by the isolating net 14 such that they face to each other in a planar way with a clearance space of a small interval that becomes uniform at least along the full length of them. In this state, each of the metal bodies is immovable without intended external force applied thereto.

For example, as shown in FIG. 5, the water treatment device 10 may be used as a water treatment device for raw water purification in a hydrant cock. In this case, it is put and arranged at an inside of a water-supply pipe 2 of a water tap faucet 1. Specifically, the flange of the inlet portion 12 and the flange of the outlet portion 13 are touched and held on a base end side and a leading end side of an inner peripheral surface of the water-supply pipe 2, respectively, so as to fix the housing 11.

In this fixed state, the outer peripheral surface of the housing 11 faces the inner peripheral surface of the water-supply pipe 2 with a predetermined clearance space. Thus, there is formed a water passing space (water flowing conduit) of a circular cylindrical shape between the outer peripheral surface of the housing 11 and the inner peripheral surface of the water-supply pipe 2.

In this state, when the raw water (such as well water or tap water) passes from a water-supply opening of the water tap faucet to the inside of the water tap faucet, the raw water passes through the inlet portion and flows into the outlet portion via the water passing space between the outer peripheral surface of the housing and the inner peripheral surface of the water-supply pipe.

At this time, the water flowing from the upstream side of the water treatment device 10 is shut off once at the inlet portion 12. Then, the water flows in the water flowing conduit around the outer peripheral surface of the housing 11 basically just through the communication holes 12a of the inlet hole 12.

Moreover, the water flowing through the conduit around the outer periphery of the housing 11 is shut off once at the outlet portion 13. Then, the water flows out toward the downstream side of the water-supply pipe 2 basically just through the communication holes 13a of the inlet hole 13.

The water from the conduit around the outer periphery of the housing 11 flows into the inside of the cylindrical portion of the outlet portion 13 through the communication holes 13a of the outlet portion 13 and flows out of the opening end provided at the flange toward the downstream side of the water-supply pipe 2. At this time, part of the passing water flowing into the inside of the cylindrical portion of the outlet portion 13 flows into the inside of the housing 11 through the communicating hole 13b located at the inside of the outlet portion 13. Then, the water flows into the cylindrical clearance space (space formed by the isolating net 14) between the outer periphery of the columnar non-noble metal body 15 and the inner periphery of the cylindrical noble metal body as the housing 11 and stays in the clearance space for a fixed time period.

At this time, the entire surface of the outer periphery of the non-noble metal body 15 faces the inner peripheral surface of the noble metal body (housing 11) with the clearance space having the uniform and minute thickness. Therefore, the metal ions (zinc ions and magnesium ions) are eluted from the outer peripheral surface of the non-noble metal body 15 (zinc/magnesium alloy) by the battery action due to ionization tendency difference between them. Such battery action is supposed to be a battery action similar to a micro cell that accompanies no corrosion. Moreover, electrons are produced accordingly and taken in the oxygen so as to generate active oxygen species and they are eluted into the water.

Thereby, the raw water becomes a treated water (function water in which the metal ions and the active oxygen species are dissolved). Then, after a fixed time period, the treated water is drawn by the raw water that flows out of the inside of the cylindrical portion of the outlet portion 13 through the communication holes 13a so as to flow out through the communicating hole 13b positioned at the inside of the cylindrical portion of the outlet portion 13 to the outside of the housing 11.

The treated water flown out of the communicating hole 13b is mixed and diluted in the passing water inside the water passing space between the outer periphery of the housing 11 and the inner periphery of the water-supply pipe. Thus, the treated water flows out of the communication holes 13 of the outlet portion 13 to the downstream side inside the water-supply pipe 2 of the tap faucet, while merging into the raw water, then being spouted at last from the spout of the water-supply pipe 2.

The treated water is a function water having a strong sterilization action and activating function. That is, the zinc (Zn) ions and the magnesium (Mg) ions are specific metal ions that have sterilizing function in the water. Particularly, the zinc ions have strong sterilizing function. Therefore, it is possible to sterilize various germs such as common bacteria or *Escherichia coli* in the passing water by the Zn ions or Mg ions eluted into the passing water.

Moreover, the active oxygen species exhibit the sterilization effects in the same manner. Accordingly, it is possible to sterilize or destroy bacteria in the passing water (raw water) by the metal ions and active oxygen species. Thus, the spouted water (treated water) is available for use as the sterilized water and can improve the safety in case it is supplied for drinking.

Furthermore, the treated water has Zn ions and Mg ions dissolved as minerals therein. Therefore, it is possible to supplement the minerals to the drinkers in case it is served for drinking.

Third Embodiment

Figure 6:
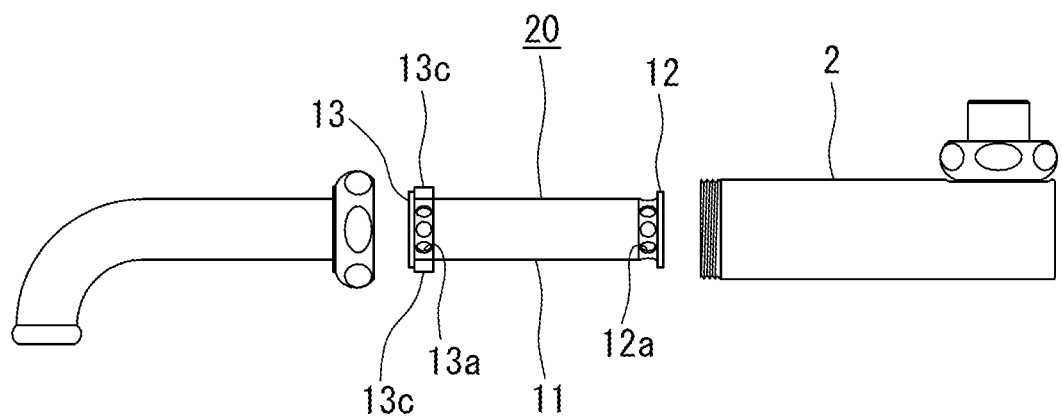
FIG. 6 is a side view showing a water treatment device for running water purification as a water battery device according to a third embodiment of the invention, which is in a state before being assembled in a faucet pipe of a water tap as one example of an object to be assembled.
Figure 7:
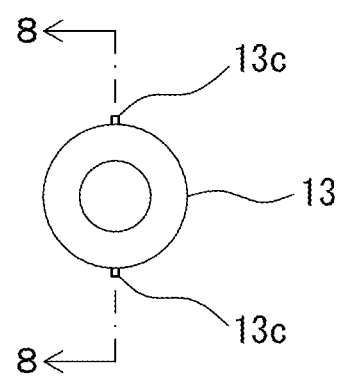
FIG. 7 is a front view showing the water treatment device for running water purification as the water battery device according to the third embodiment of the invention.

As shown in FIG. 6 and FIG. 7, a water batter device according to the third embodiment of the invention is concretized into a water treating device 20 for flowing water purification like the second embodiment and is applicable to the same usages.

In the water treatment device 20 of the third embodiment, the outlet portion 13 further has protruded portions 13c protruded outwardly (in the radial direction) from the outer periphery of the cylindrical portion.

The protruded portions 13c are formed on positions located at fixed angular intervals (180 degrees in the example shown in FIG. 6 and FIG. 7) in the circumferential direction of the outlet portion 13, respectively.

Figure 8:
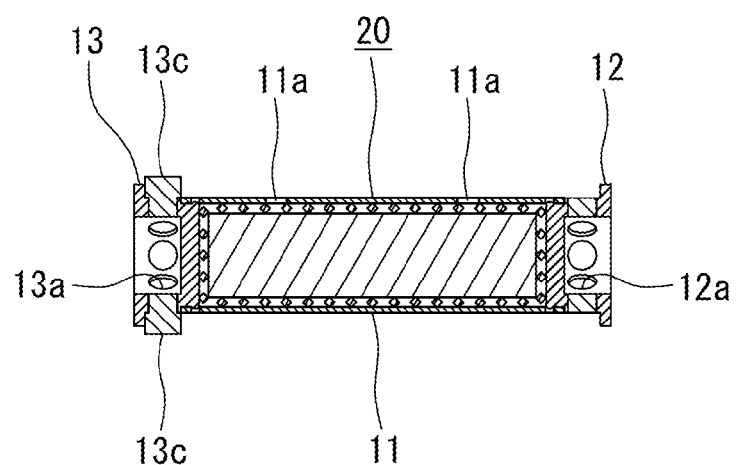
FIG. 8 is a cross-sectional view take along line 8-8 of FIG. 7.

As shown in FIG. 8, in the water treatment device 20, the housing 11 has communication holes 11a as communication openings penetrated on the upper part or the top part (in the fitted state to the pipe 2). The communication holes 11a allows the inside and the outside of the housing 11 to communicate with each other.

The communication holes 11 are formed at two positions located at fixed interval in the axial direction (longitudinal direction) of the housing 11. No communication openings are formed at the other parts (such as the outlet portion 13 or the like).

When the water treatment device 20 is fitted in the pipe 2 as a receiving object, the protruded portions 13c are engaged and hooked at dents or grooves formed at corresponding positions of the inner peripheral surface of the pipe 2. Thus, the protruded portions 13 position the housing 11 in the circumferential direction such that the communication holes 11a come to the uppermost part.

Figure 9:
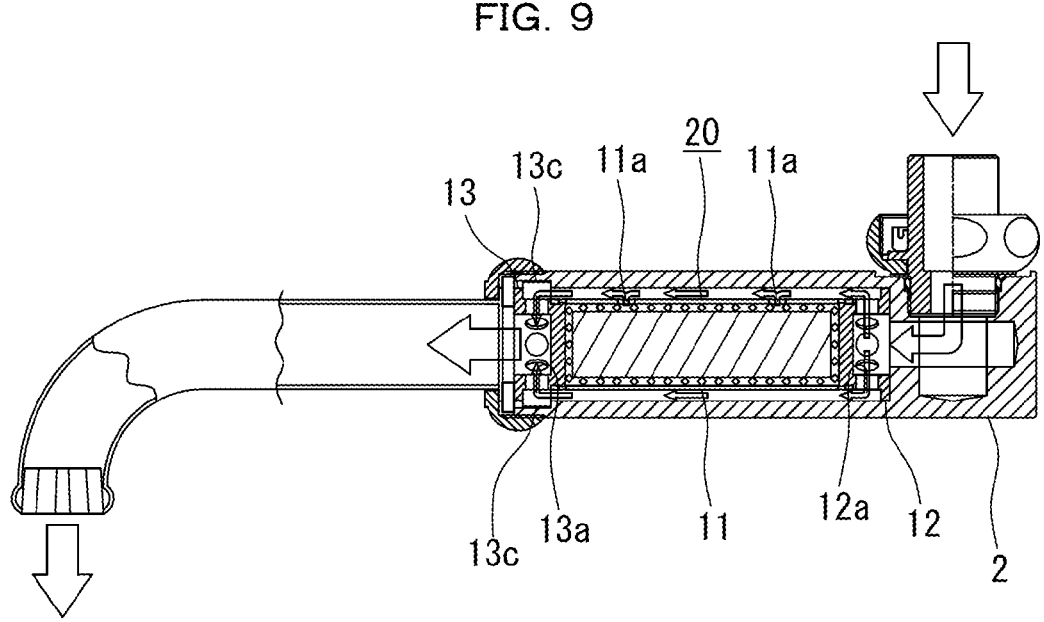
FIG. 9 is a cross-sectional view of the water treatment device for running water purification as the water battery device according to the third embodiment of the invention that is housed and assembled in the faucet pipe of the water tap.

As shown in FIG. 9, with the water treatment device 20, the raw water flows into the housing 11 from the communication holes 11a of the housing 11 and remains in the clearance space for a fixed time period so as to become a treated water (battery action water). After the fixed time period, the treated water is drawn by the raw water flowing around the outer periphery of the housing 11 to flow out of the housing 11 to the outside through the communication holes 11a.

Fourth Embodiment

Figure 10:
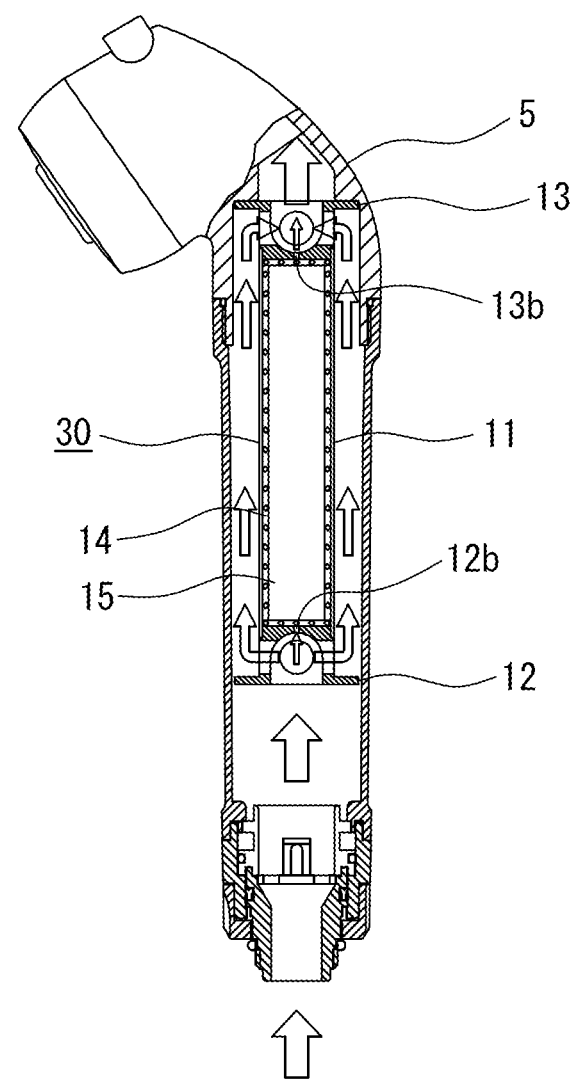
FIG. 10 is a cross-sectional view of a water treatment device for running water purification as a water battery device according to a fourth embodiment of the invention that is housed and assembled in a shower head.

As shown in FIG. 10, a water treatment device 30 for flowing water purification according to the fourth embodiment has a configuration to be fitted in an inside space (water flowing conduit) of a handle (part to be held by a hand) of a shower head. The water treatment device 30 has basically the same structure as the water treatment device 10 of the second embodiment, except it has a communicating hole 12b (having a fine hole shape like the communicating hole 13b) formed also on the inlet portion 12 so as to penetrate it.

The raw water at the upstream side flows into the housing 11 through the communicating hole 12b of the inlet portion and then becomes the battery action water by the metal ions and the active oxygen species from the non-noble metal body 15. Then, the battery action water flows out of the communicating hole 13b of the outlet portion 13 so as to be mixed with the raw water from the outer peripheral surface of the housing 11, thereafter being spouted from a spout of a head part of the shower head.

Fifth Embodiment

Figure 11:
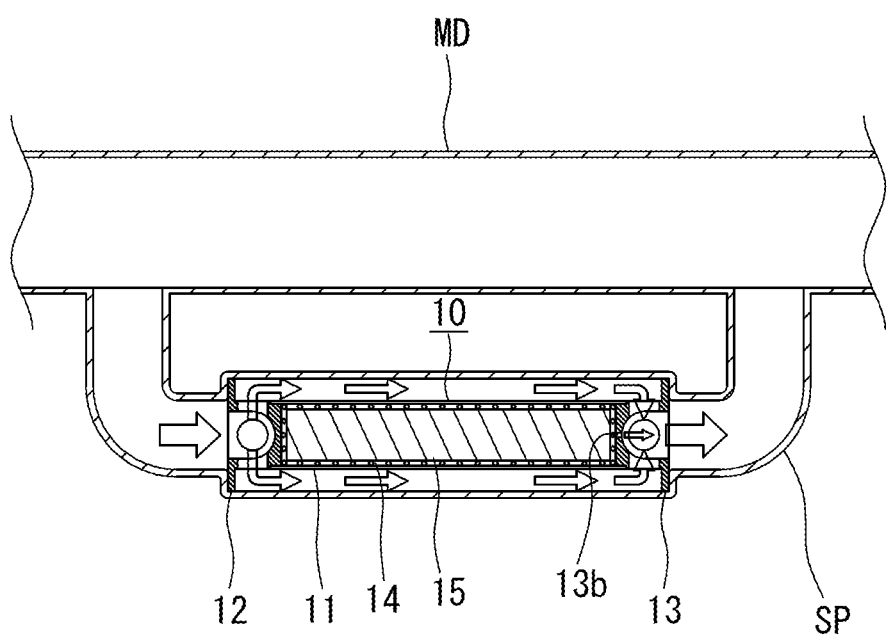
FIG. 11 is a cross-sectional view showing a water treatment device for running water purification as a water battery device according to a fifth embodiment of the invention that is attached to a pipe as a parallel circuit.
Figure 12:
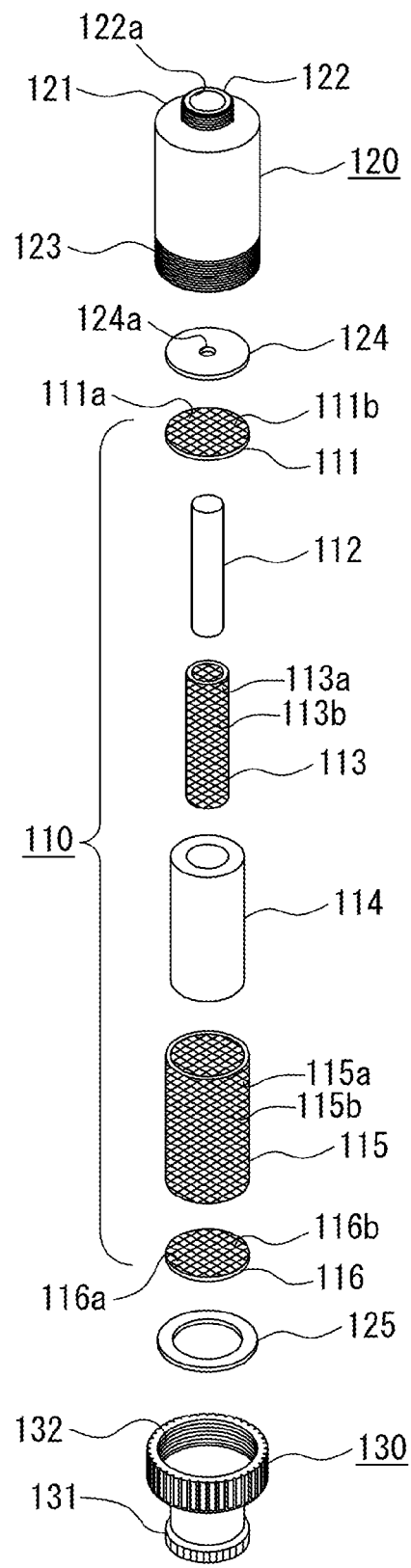
FIG. 12 is an exploded perspective view showing a drainage-built-in adapter as a water battery device according to a sixth embodiment of the invention.
Figure 13:
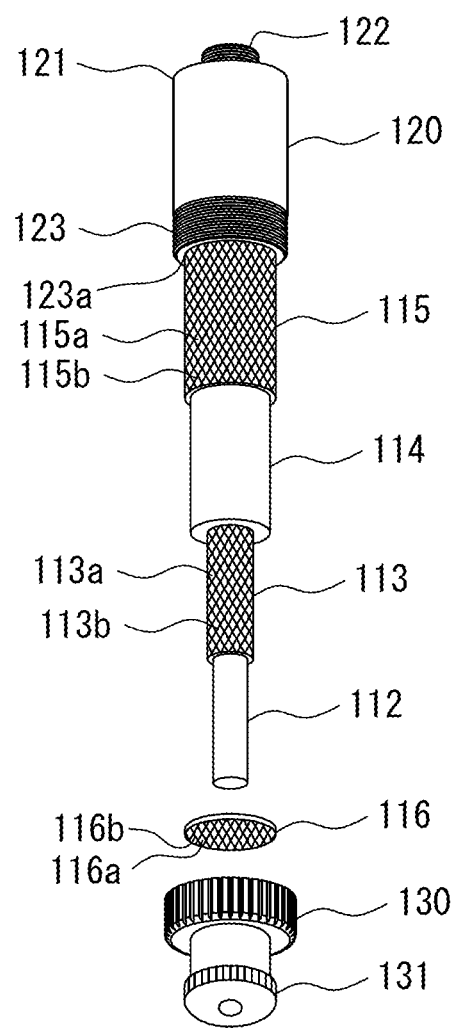
FIG. 13 is an assembly drawing showing a state in which each of parts of the drainage-built-in adapter as the water battery device according to the sixth embodiment of the invention is inserted and accommodated in a housing of the drainage built-in adapter.
Figure 14:
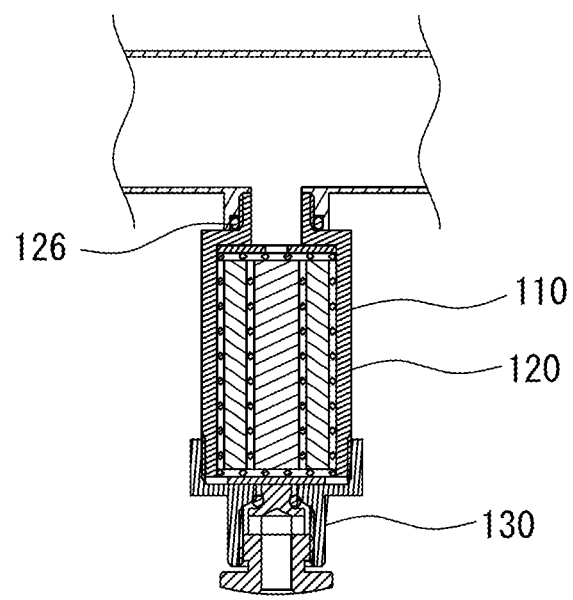
FIG. 14 is a cross-sectional view of the drainage-built-in adapter as the water battery device according to the sixth embodiment of the invention that shows a state in which it is assembled in the pipe.
Figure 15:
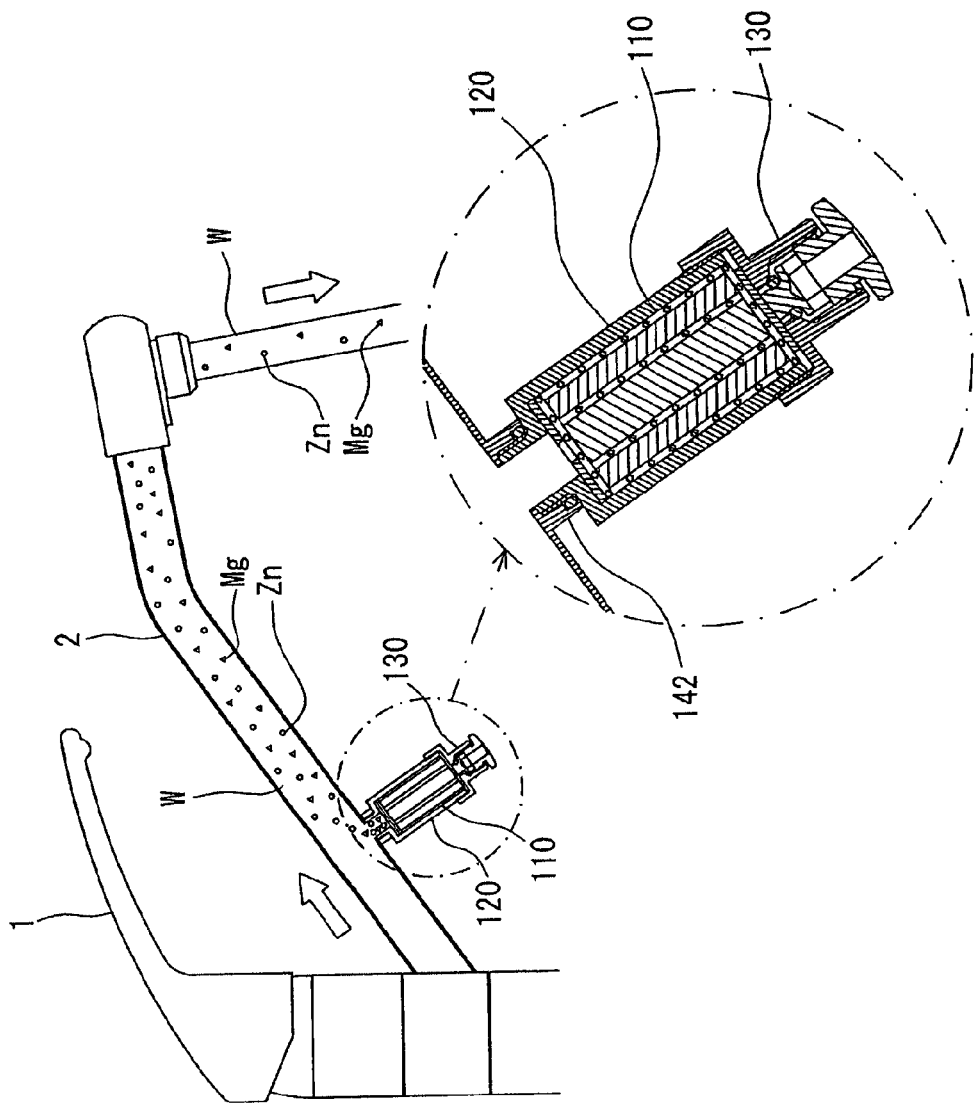
FIG. 15 is a cross-sectional view of as the water battery device according to the sixth embodiment of the invention that shows a state in which it is assembled in a faucet pipe of a single lever water tap as one example of a pipe, while depicting a part corresponding to the drainage-built-in adapter in an enlarged manner as an accompanying figure.

As shown in FIG. 11, according to the fifth embodiment of the invention, a water battery device similar to the water treatment device 10 of the second embodiment is disposed inside a secondary pipe SP, which is connected in parallel to a pipe MP as a main pipe at the middle of the pipe MP, so as to supply the battery action water.

In this case, the diameter of the secondary pipe SP is changed (increased or decreased) in accordance with a required quantity of the battery action water sent out from the secondary pipe SP to the main pipe MP. At the same time, the diameter of the water treatment device 10 (i.e. the diameters of the housing 11 and the non-noble metal body 15 and so on) is changed (increased or decreased) accordingly. That is, if the required quantity is large, they should be larger, and if the required quantity is small, they should be smaller. Thus, the water treatment device 10 is able to supply the battery action water in a required amount.

Sixth Embodiment

As shown in FIG. 12 to FIG. 15, a water drainage adapter according to the sixth embodiment is composed of a sterilizing unit 110, a water drainage housing 120 and a water drainage cap 130. The housing 120 is made of a metal as a container having substantially a circular cylindrical shape that accommodates the sterilizing unit 11 in an inside thereof. The cap 130 is made of a metal that is fitted to a lower end opening of the housing 120 in a watertight manner.

The housing 120 has a male thread portion 122 that has a circular cylindrical shape of a small diameter formed on an upper end of a base portion 121 that has a circular cylindrical shape of a large diameter.

An upper end of the male thread portion 122 defines a circular upper end opening of a small diameter. A small diameter space of circular cross-section inside the male thread portion 122 communicates with a large diameter space of a circular cross-section inside the base portion 121.

A male thread at an outer peripheral surface of the male thread portion 122 is threadedly fitted into a female thread at an inner peripheral surface of the attachment portion of the spouting pipe 2 of the tap faucet 1. Thereby, the housing 120 is fitted on the attachment portion so as to communicate the water passing conduit inside the spouting pipe 2 and the inside space of the housing 120 in watertight manner.

On the other hand, a male thread portion 123 is formed on an outer peripheral surface of a lower end part of the base portion 121 of the housing 120. A lower end of the male thread portion 123 defines a lower end opening 123a of a circular shape of large diameter.

A flow rate adjusting plate 124 and the sterilizing unit 110 can be accommodated in the inside through the lower end opening 123a of the housing 120 in sequence.

The flow rate adjusting plate 124 is made of a metal such as a copper alloy including a brass or the like and is a holed disk body having a diameter corresponding the an inner peripheral part at the upper end of the base portion 121 of the housing 120.

The flow rate adjusting plate 124 has a circular flow rate adjusting hole 124a of a predetermined diameter formed at its center. The adjusting plate 124 is accommodated at the inner peripheral part at the upper end of the base portion 121 so that the adjusting hole 124a faces the circular opening of the male thread portion 122.

Thereby, the inside space of the base portion is communicated in watertight manner with the inside space of the male thread portion 122 and with the inside water passing conduit of the spouting pipe 2 via the adjusting hole 124a of the adjusting plate 124.

Consequently, the water flowing into the housing 120 from the spouting pipe 2 enters first into the inside space of the male thread portion 122 and then passes the adjusting hole 124a of the adjusting plate 124 to run into the inside space of the base portion 121. Thereafter, the water circulates in the inside space of the base portion 121 and then passes the adjusting hole 124a of the adjusting plate 124 again so as to return from the inside space of the male thread portion 122 into the inside water passing conduit of the spouting pipe 2.

Accordingly, if the diameter of the adjusting hole 124a of the adjusting plate 124 is increased or decreased and/or the shape of the adjusting hole 124a is changed, the cross-sectional area of the hole is adjusted (enlarged or lessened) so as to adjust (increase or decrease) passable amount of water. Thus, it is possible to adjust the quantity of water flowing from the spouting pipe 2 into the housing 120 and the water quantity flowing out of the housing 120 to the spouting pipe 2.

For example, plural kinds of flow rate adjusting plates 124 having different are prepared in advance. Then, the adjusting plate 124 is exchanged to one having a desired hole diameter.

For example, if the adjusting plate 124 is changed to the one having an adjusting hole 124a of larger diameter, the passing water amount of the adjusting hole 124a increases. If the adjusting plate 124 is changed to the one having an adjusting hole 124a of smaller diameter, the passing water amount of the adjusting hole 124a increases.

Thus, it is possible to adjust the passing water amount to be supplied to the inside of the housing 120 by the adjusting plate 124.

The adjusting hole 124a of the adjusting plate may changed its shape and dimension (e.g. into a different shape such as polygonal shape) so as to change or increase or decrease the cross-sectional area in the same manner, thereby adjusting the flow rate.

The sterilizing unit 110 has an upper isolating net plate 111, a non-noble metal body 112, an inner isolating net tube 113, a noble metal body 114, an outer isolating net tube 115 and a lower isolating net plate 116.

The upper isolating net plate 111 has a disk net shape of nearly the same diameter as the adjusting plate 124 and has many small holes 111a that penetrate in the thickness direction over its entire surface.

The upper isolating plate 111 is made of a synthetic resin such as polypropylene, etc.

The inner isolating net tube 113 constitutes an interval keeping member of the present embodiment and defines the clearance space between the non-noble metal body 112 and the noble metal body 114.

The inner isolating net tube 113 has many small holes 113a that penetrate in the thickness direction over its entire surface.

The inner isolating net tube 113 is made of an electric insulating material like the upper isolating plate 111.

The outer isolating net tube 115 has a circular cylinder net shape covering the outer peripheral surface of the noble metal body 114 as a whole so that the overall outer peripheral surface of the noble metal body 114 is kept untouched with the inner peripheral surface of the base portion 121 of the housing 120.

The outer isolating net tube 115 has many small holes 115a that penetrate in the thickness direction over its entire surface. The outer isolating net tube 115 is made of an electric insulating material like the upper isolating plate 111.

The lower isolating net plate 116 has the same configuration as the upper isolating net plate 111 and has many small holes 116a that penetrate in the thickness direction over its entire surface.

Seventh Embodiment

Figure 16:
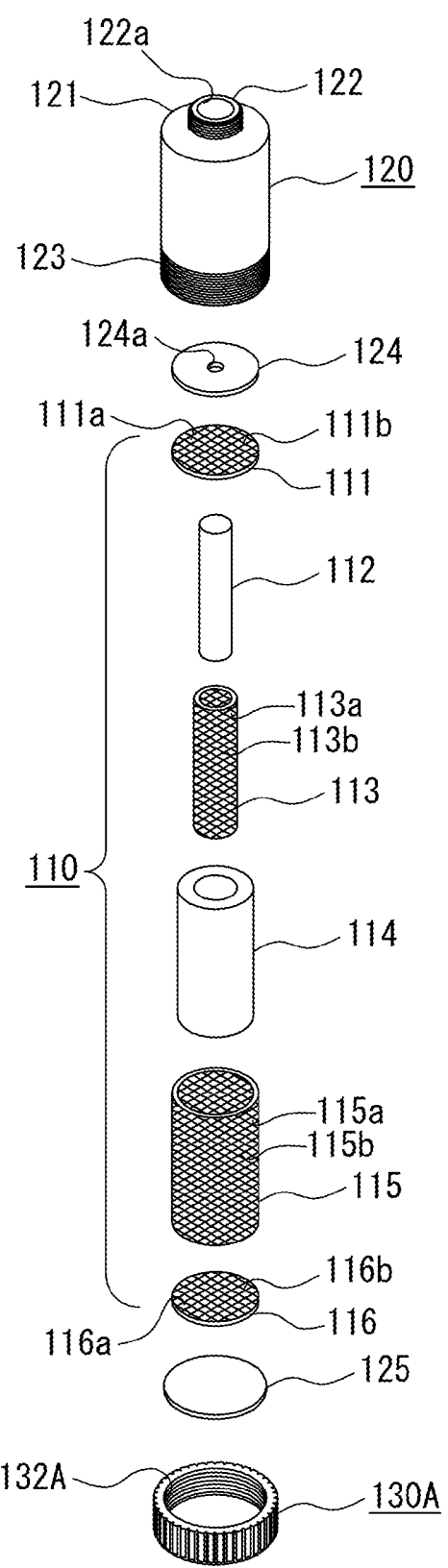
FIG. 16 is an exploded perspective view showing an adapter without drainage as a water battery device according to a seventh embodiment of the invention.

As shown in FIG. 16, a water battery device according to the seventh embodiment has basically the same structure as the water drainage adapter of the sixth embodiment, except the drainage cap 130 of the drainage adapter is changed into a normal cap 130A having no drainage function. The water battery device according to the seventh embodiment has the same functions and effects as the sixth embodiment.

In the sixth and the seventh embodiments, the drainage housing 120 that houses the sterilizing unit 110 therein is mounted in the water path of the raw water inside the spouting pipe 2 as the water environment, which is subject to the treatments such sterilization, such that it extends essentially at right angles to the water path (substantially perpendicular to the water flowing direction). Then, the raw water inside the spouting pipe 2 enters into the drainage housing 120 through the upper end opening 122a in the direction substantially perpendicular to the water flowing direction. Thereafter, the raw water circulates inside the housing 120 to become the metal ion containing battery action water by the sterilizing unit 110.

That is, the flow rate adjusting hole 124a of the adjusting plate constitutes a flow rate adjusting means that controls the amount of water flowing from the inside space (internal water environment) of the drainage housing 120 to the external water environment such as the inside space of the spouting pipe 2 as connecting side or water passing side of the drainage housing 120.

The diameter of the adjusting hole 124a depends on the flow rate per unit time of the water environment as object, volumetric capacity of the housing, volumetric capacity of the electrodes of the sterilizing unit and so on. Still, it is preferable to set the hole diameter within a range of $1/10$ to $3/10$ of the diameter of the housing 120.

Eighth Embodiment

Figure 17:
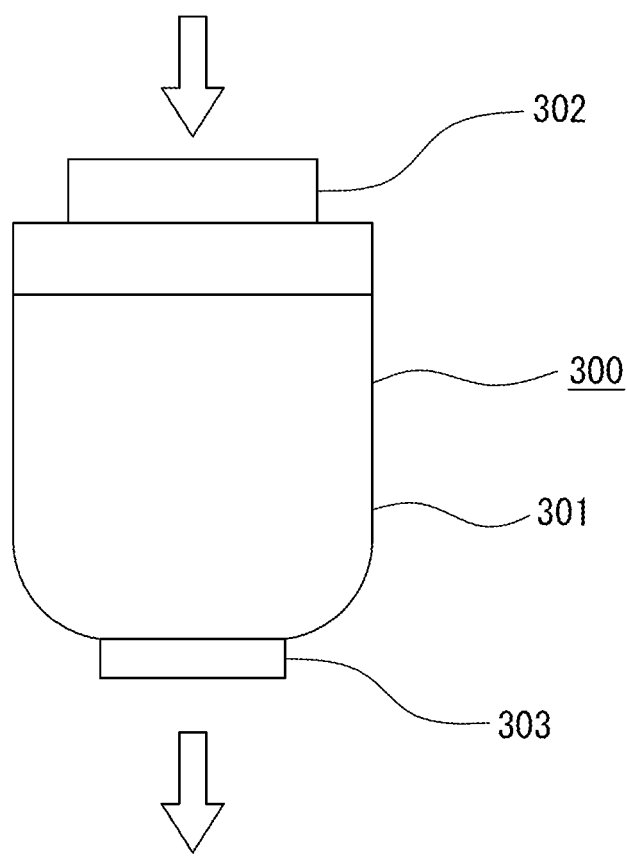
FIG. 17 is a front view showing a spout adapter as a water battery device according to an eighth embodiment of the invention.
Figure 18:
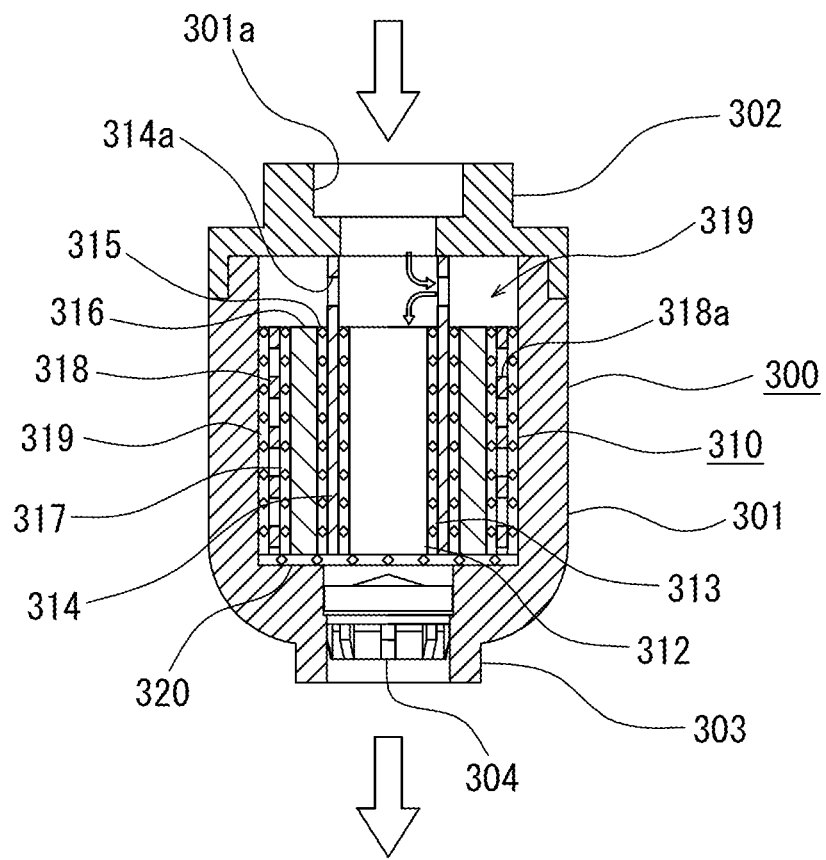
FIG. 18 is a cross-sectional view showing the spout adapter as the water battery device according to the eighth embodiment of the invention.

As shown in FIG. 17 to FIG. 19, a water battery device according to the eighth embodiment is concretized in a spouting cap as a spouting opening adapter fitted detachably to a spouting opening of a tap faucet.

The spouting cap has a housing 300. The housing 300 has a base portion 301 of substantially a circular cylindrical shape, an inflow opening 302 and a spouting opening 303. The inflow opening 302 is integrally formed on one end (upstream end) of the base portion 301 so as to be detachably attached to the spouting opening of the tap faucet. The spouting opening 303 is integrally formed on the other end (downstream end) of the base portion 301.

A sterilizing unit 310 is housed in an inside space of the housing 300.

Figure 19A:
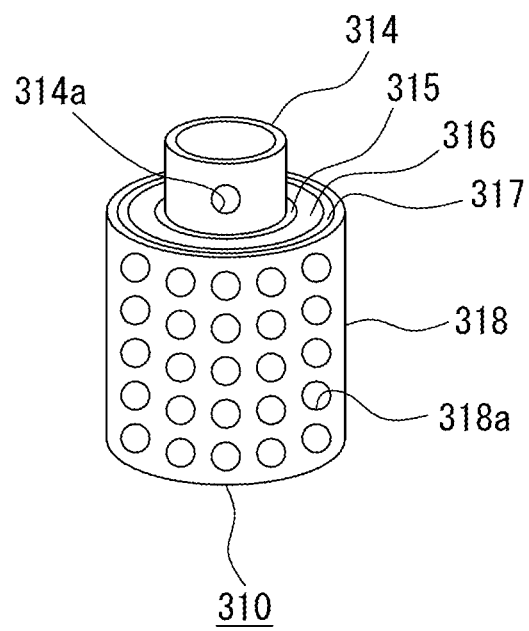
FIG. 19A is a perspective view showing inner components of a first modified example of the spout adapter as the water battery device according to the eighth embodiment of the invention.

As shown in FIG. 18 and FIG. 19A, the sterilizing unit 310 according to a first example is composed of an inner non-noble metal body 312, a first inner isolating net tube 313, an inside noble metal body 314, a second inner isolating net tube 315, an outer non-noble metal body 316, a first outer isolating net tube 317, an outer noble metal body 318, a second outer isolating net tube 319 and a lower isolating net plate 320. The sterilizing unit 310 has a shape corresponding to the space inside the housing 300 as a whole.

Specifically, the sterilizing unit 310 is structured such that the inner non-noble metal body 312, inner noble metal body 314, outer non-noble metal body 316 and outer noble metal body 318 are coaxially disposed, thereby defining a circular cylindrical shape as a whole.

The isolating net tubes (first inner isolating net tube 313, second inner isolating net tube 315, first outer isolating net tube 317) are interposed between the inner non-noble metal body 312, inner noble metal body 314, outer non-noble metal body 316 and outer noble metal body 318, respectively, so that these metal bodies are not directly contacted with each other. The second outer isolating net tube 319 is fitted on an outer peripheral surface of the outer noble metal body 318 so that the outer noble metal body 318 is not directly contacted with other members. The isolating net plate (lower isolating net plate 320) is mounted on the lower end surfaces of the inner non-noble metal body 312, inner noble metal body 314, outer non-noble metal body 316 and outer noble metal body 318 that are laid in overlap manner so as to define a coaxial multilayer circular cylinder.

The basic configuration of the inner non-noble metal body 312 and so on is the same as those mentioned above.

On the other hand, the outer noble metal body 318 has many water passing holes 318a as small circular holes that penetrate the wall in the thickness direction.

The inner noble metal body 314 of the circular cylinder is formed with plural passing holes 314a of small diameter that penetrate the wall in the thickness direction. The battery action water in the inside clearance space of circular cylindrical shape between the inner non-noble metal body 312 and the inner noble metal body 314 flows out of the water passing holes 314a to an inside of a storage space for the battery action water at the outer peripheral side of the inner noble metal body 314. Moreover, the battery action water inside the storage space (that contains the battery action water from the outer non-noble metal body 316 and the outer noble metal body 318) circulates from the storage space 319 to an inside of an inner clearance space of a circular cylindrical shape between the inner non-noble metal body 312 and the inner noble metal body 314 via the water passing holes 314a.

Thereby, the spouting cap 300 blocks the raw water, which enters from the one end (upstream end) of the inner clearance space between the inner non-noble metal body 312 and the inner noble metal body 314 to the inside of the inner clearance space, from flowing directly out of the other end (downstream end) between the inner non-noble metal body 312 and the inner noble metal body 314. Thus, the spouting cap 300 blocks the battery action water, which is produced in the inner clearance space between the inner non-noble metal body 312 and the inner noble metal body 314, from flowing out (or spouted out) in a moment along with the flowing water (or spouted water).

With such configuration, the battery action water changes its flowing direction by nearly 90 degrees at one axial end (inner peripheral end) of each water passing hole 314a of the inner noble metal body 314 so as to enter into the storage space 310. Then, the entering water (with first density of battery action water) additionally contains the battery action water produced between the outer non-noble metal body 316 and the outer noble metal body 318 in the storage space 319. Thereafter, the battery action water (second density larger than the first density) runs through the water passing holes 134a back to the inside space at the upper end side between the inner non-noble metal body 312 and the inner noble metal body 314. Finally, the battery action water enters into the inner clearance space between the inner non-noble metal body 312 and the inner noble metal body 314, thereby being spouted out of the spouting opening 303 via a faucet aerator 304.

Figure 19B:
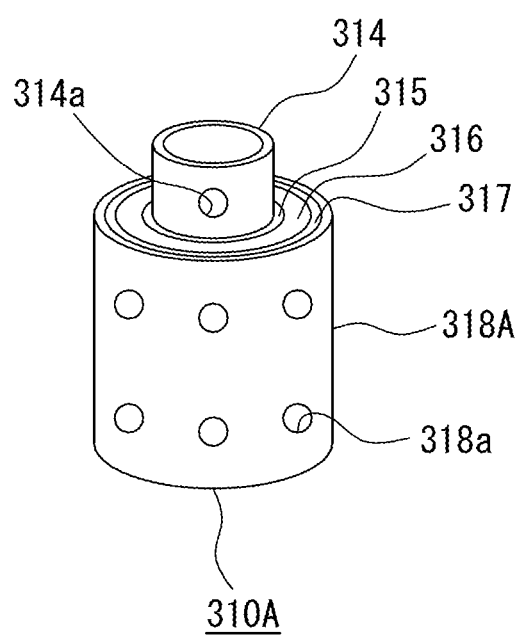
FIG. 19B is a perspective view showing inner components of a second modified example of the spout adapter as the water battery device according to the eighth embodiment of the invention.

As shown in FIG. 19b, a sterilizing unit 310A according to a second example has basically the same configuration as the first example of sterilizing unit 310. Still, in the sterilizing unit 310A, an outer noble metal body 318a has a different structure. Specifically, the outer noble metal body 318a is formed with less number of water passing holes 318a than the outer noble metal body 318. Alternatively, the outer noble metal body may be formed into a simple circular cylinder having no water passing holes 318a.

The second example has the same functions and effects as the first example.

Modified Examples of First to Eighth Embodiments

Figure 20A:
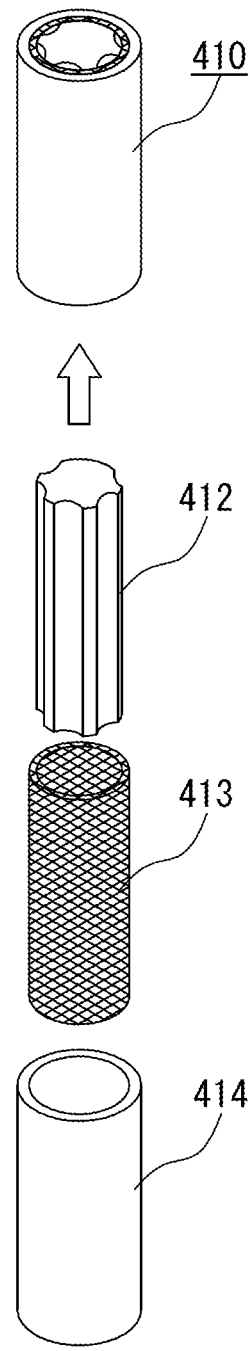
FIG. 20A to FIG. 20C show water battery units as other examples of the water battery devices according to the first to the seventh embodiments, respectively.
Figure 20B:
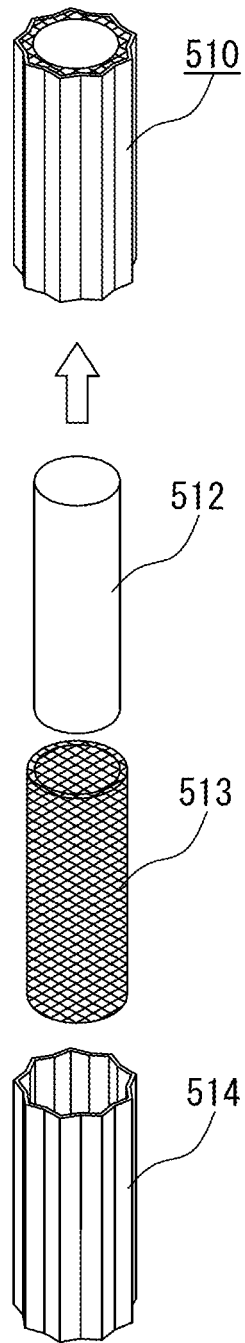
Figure 20C:
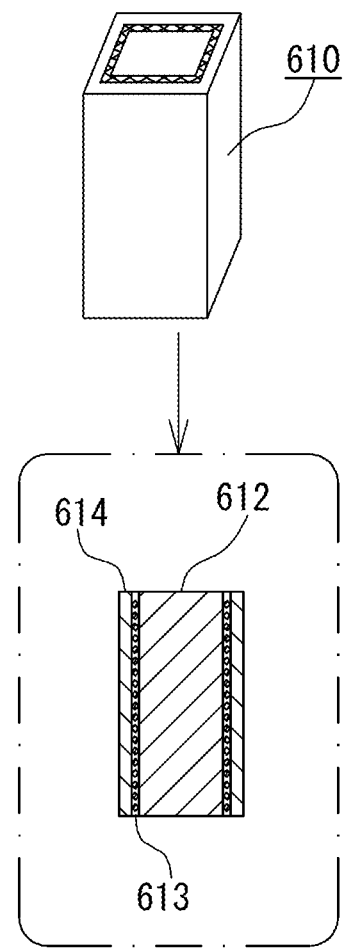

Each of the water battery devices according to the first embodiment to the eighth embodiment is a dry-cell-type water battery device. As shown in FIG. 20A to FIG. 20C, the water battery devices according to the first embodiment to the eighth embodiment can be practiced in a variety of configurations.

First to Third Modified Examples

Combination Mode of Different Metal Bodies (Single-Type)

The water sterilizing device of the present invention can be used as a sterilizing device composed of the sterilizing unit alone as a matter of course, other than the modes in which the sterilizing unit 10 and so on are accommodated in the water feeding device or the like as described in the above embodiments.

For example, as shown in FIG. 20A, a sterilizing unit 410 has a round structure composed of a non-noble metal body 412 (first reactor), an isolating tube net 413 (interval keeping member) and a noble metal body 414 (second reactor). The non-noble metal body 412 has a column shape of star-like cross-section. The noble metal body 414 of circular cylindrical shape is coaxially arranged at an outside of the non-noble metal body 412 via the isolating tube net 413 of a circular cylindrical net shape. Thus, the sterilizing unit 410 becomes a sterilizing device by itself.

As shown in FIG. 20B, a sterilizing unit 510 has a round structure composed of a non-noble metal body 512 (first reactor), an isolating tube net 513 (interval keeping member) and a noble metal body 514 (second reactor). The non-noble metal body 512 has a circular cylindrical shape. The noble metal body 514 has a circular cylindrical shape of a star-like cross section. The noble metal body 514 is coaxially arranged at an outside of the non-noble metal body 512 via the isolating tube net 513 of a circular cylindrical net shape. Thus, the sterilizing unit 510 becomes a sterilizing device by itself.

As shown in FIG. 20C, a sterilizing unit 610 has a square structure composed of a non-noble metal body 612 (first reactor), an isolating tube net 613 (interval keeping member) and a noble metal body 614 (second reactor). The non-noble metal body 612 has a square column shape. The noble metal body 614 has a square tube shape. The noble metal body 614 is coaxially arranged at an outside of the non-noble metal body 612 via the isolating tube net 613 of a square tubular net shape. Thus, the sterilizing unit 610 becomes a sterilizing device by itself.

[Modified Examples of Non-Noble Metal Bodies of First to Eighth Embodiments]

Figure 21A:
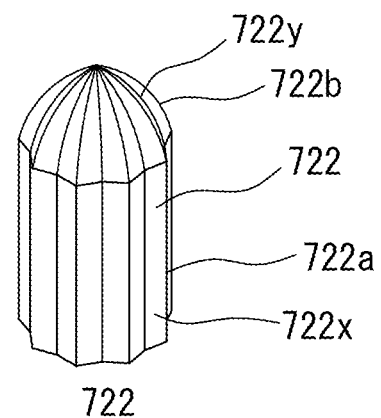
FIG. 21A to FIG. 21B show other examples of non-noble metal bodies of the water battery devices according to the first to the seventh embodiments, respectively.

In a passing water environment that requires to ensure a flow rate and a rectifying effect at a spouting opening of a tap faucet or the like, it is desirable to use a non-noble metal body 722 of a star-like cross-sectional column type as shown in FIG. 21A. Metal ions are dissolved from an outer peripheral surface 722a of the non-noble metal body 722.

Figure 21B:
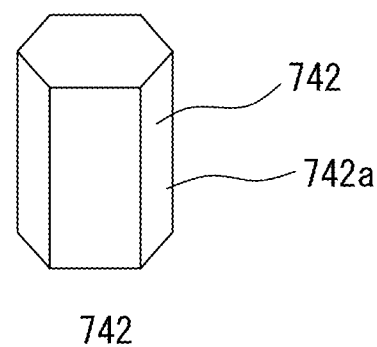

In this case, the non-noble metal body has a base portion 722x and a head portion 722y. The base portion 722x has a columnar shape of a star-like cross section. The head portion 722y is integrally formed at an upper end (an end at an upstream side such as an upper end inside a spouting opening). The head portion 722y has a tapered shape so as to be conical toward its upside. Thus, an outer peripheral surface 722b of the head portion 722y is able to rectify a coming water stream in smoother way. Alternatively, as shown in FIG. 21B, a non-noble metal body 742 of polygonal shape (having a cross section of hexagon or the like) may be used so that metal ions are eluted from its outer surface 742a.

[Modified Examples of Noble Metal Bodies of First to Eighth Embodiments]

Figure 22A:
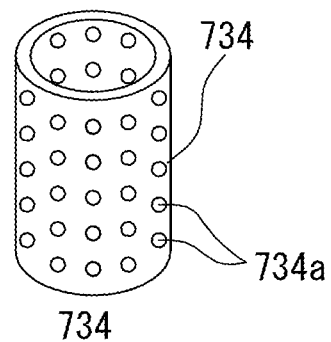
FIG. 22A to FIG. 22F show other examples of noble metal bodies of the water battery devices according to the first to the seventh embodiments, respectively.
Figure 22B:
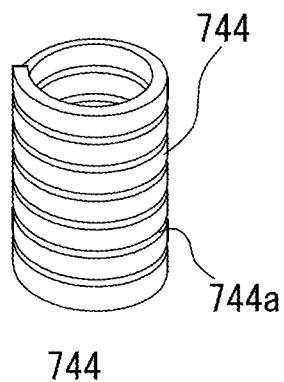
Figure 22C:
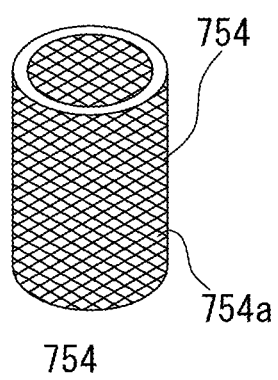

As shown in FIG. 22A, a noble metal body 734 of a circular cylindrical shape with small circular holes may be used so as to promote the water flow to the inside non-noble metal body through many small holes 734a. Alternatively, as shown in FIG. 22B, a noble metal body 744 having a spiral or coil-spring-like ring shape formed into a circular cylindrical shape may be used so as to promote the water flow to the inside non-noble metal body. Alternatively, as shown in FIG. 22C, a noble metal body 754 having a circular cylindrical net shape may be used so as to promote the water flow to the inside non-noble metal body through many meshes 754a.

Figure 22D:
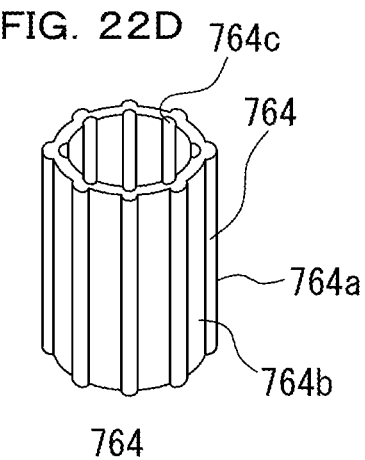
Figure 22E:
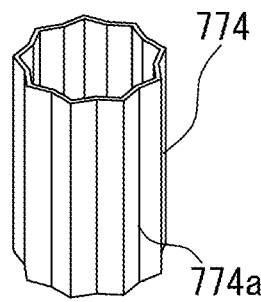

Alternatively, as shown in FIG. 22D, a noble metal body 764 having a ribbed circular cylindrical shape may be used so as to ensure the flow rate or perform the stream rectifying effect through dents or grooves 764b formed between curved ribs 764a or through small dents or grooves 764c of the same curvature formed at an inner surface of the curved ribs 764a. Still, it is preferable to use a noble metal body 774 having a tubular shape of a star-like cross section as shown in FIG. 22E so as to ensure the flow rate or perform the stream rectifying effect through dents or grooves provided at fixed intervals in the circumferential direction on an inside and an outside thereof.

Figure 22F:
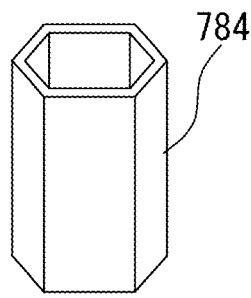

As show in FIG. 22F, a noble metal body 784 having a polygonal shape (of hexagonal cross section or the like) may be used.

[Inner Unit of First to Eighth Embodiments]

Figure 23A:
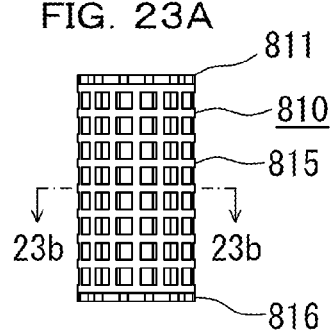
FIG. 23A to FIG. 23E show inner units (non-noble metal body, noble metal body and interval keeping member) of the water battery devices according to the first to the seventh embodiments, respectively.
Figure 23B:
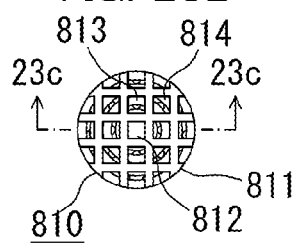

As shown in FIG. 23A and FIG. 23B, a sterilizing unit 810 may be composed of an upper isolating net plate 811 (isolating member), a non-noble metal body 812 (first reactor) of a circular cylindrical shape, a inner isolating net tube 813 (interval keeping member), a noble metal body 814 (second reactor) of a circular cylindrical shape, an outer isolating net tube 815 (isolating member) and a lower isolating net plate 816 (isolating member). The upper isolating net plate 811 is a disc-shaped net having small holes 811a. The inner isolating net tube 813 is a circular cylindrical net having small holes 813a. The outer isolating net tube 815 is a circular cylindrical net having small holes 815a. The lower isolating net plate 816 is a disc-shaped net having small holes 816a.

On the other hand, the inner isolating net tube 813 has supporting points 813b made of semispherical protrusions formed respectively at crossing positions of linear portions constituting the net on an inner surface and an outer surface thereof, in place of the above-mentioned supporting lines or the like. Thus, the inner isolating net tube 813 supports an outer peripheral surface of the inner non-noble metal body 812 and an inner peripheral surface of the outer noble metal body 814, respectively, by point contact.

Figure 23C:
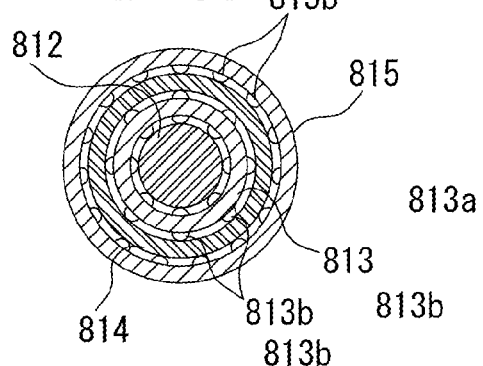
Figure 23D:
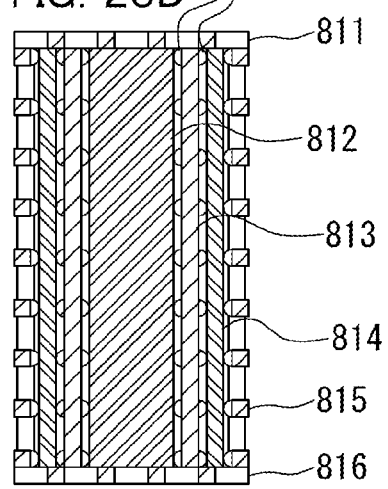
Figure 23E:
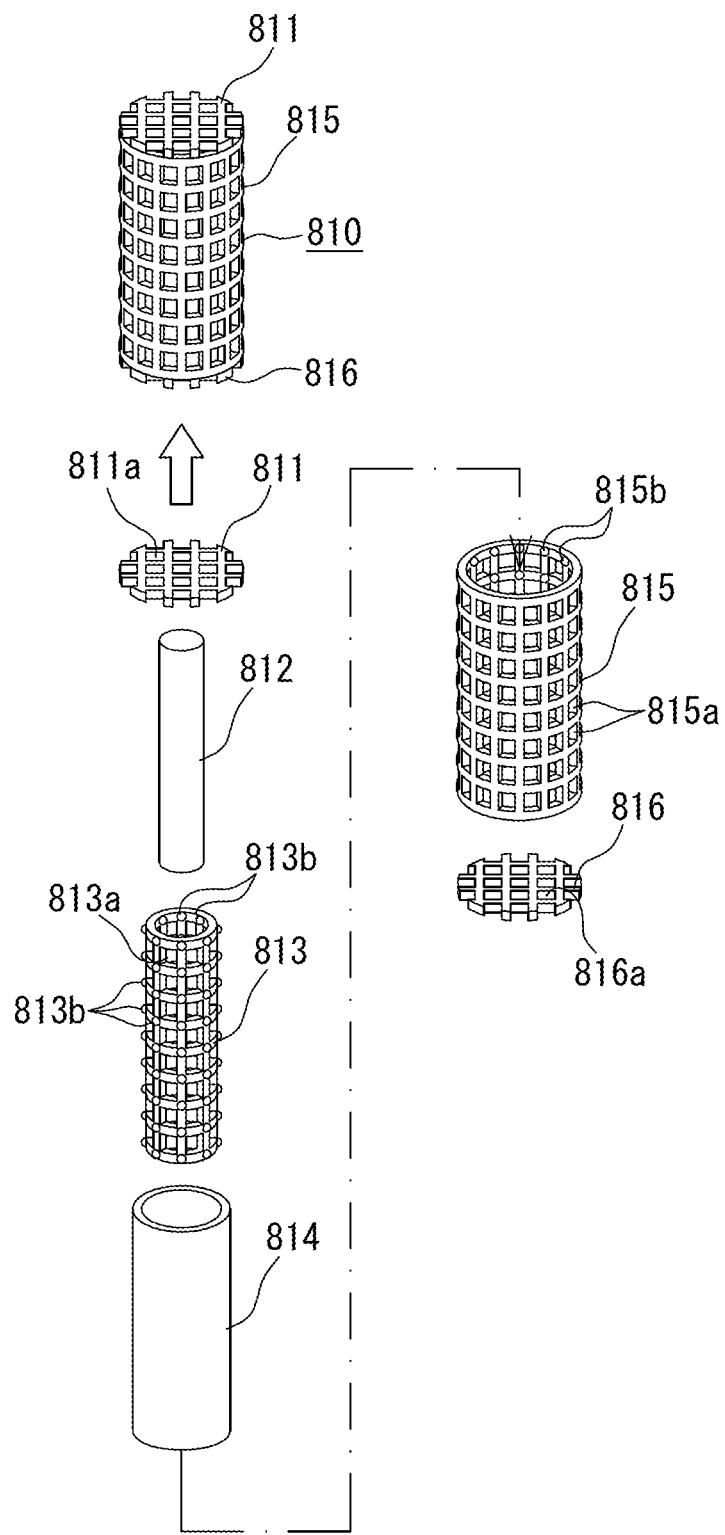

Particularly, as shown in FIG. 23C and FIG. 24D, there is a sufficient clearance for flowing water formed between the supporting points 813b. It was confirmed that the water entering into the clearance space between the non-noble metal body 812 and the noble metal body 814 flowed very smoothly in the sterilizing unit 810.

Moreover, in the sterilizing unit 810, the inner isolating net tube 815 has supporting points 815b made of semispherical protrusions formed respectively at crossing positions of linear portions constituting the net on an inner surface thereof. Thus, the outer isolating net tube 815 supports an outer peripheral surface of the inner non-noble metal body 812 and an inner peripheral surface of the outer noble metal body 814 by point contact.

[First Modified Example of Inner Unit of First to Eighth Embodiments]

Figure 25:
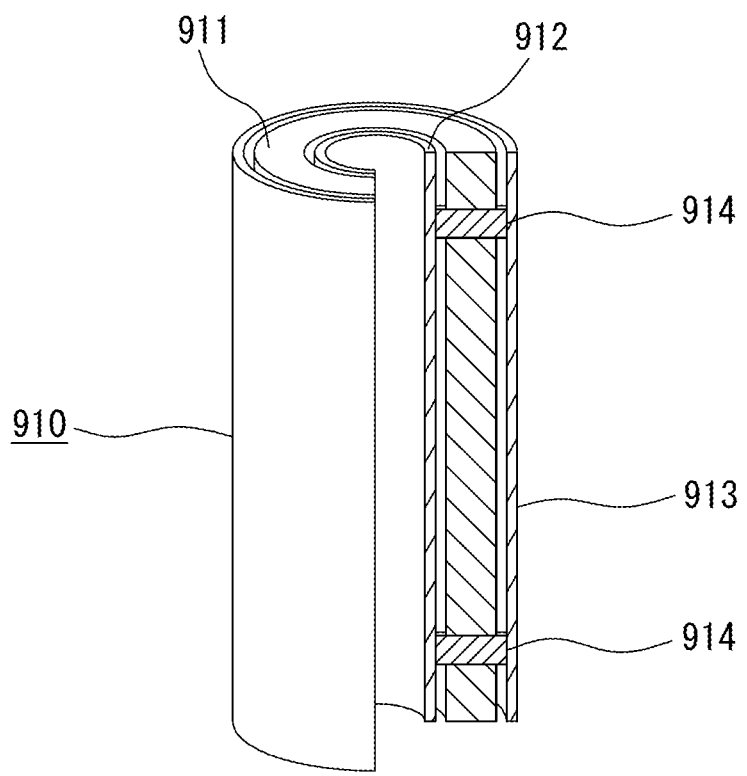
FIG. 25 is a perspective view showing the first modified example of the inner unit of the water battery device according to the first to the seventh embodiment of the invention, while cutting away a part thereof.

As shown in FIG. 24A to FIG. 25, in the first modified example, an inner unit 910 is concretized into a three-layer structure that is composed of a non-noble metal body 911 and two noble metal bodies 912 and 913. The non-noble metal body 911 has a circular cylindrical shape and the noble metal bodies 912 and 913 have a circular cylindrical shape corresponding to the non-noble metal body 911. The noble metal bodies 912 and 913 are disposed at an inside and an outside of the non-noble metal body 911. The non-noble metal body 911 and the noble metal bodies 912 and 913 are separated to each other with the fixed clearance space via interval keeping members 914. The interval keeping member 914 is structured into a small rod shape.

The interval keeping members 914 are provided at positions located at predetermined angular intervals in the circumferential direction (constant intervals of 120 degrees in the illustrated example) on opposite end portions in the axial direction (longitudinal direction) of the non-noble metal body 911, respectively, so as to penetrate the non-noble metal body 911 in the thickness direction.

Each of the interval keeping member 914 is fitted on the non-noble metal member 911 such that the opposite end portions are protruded by a predetermined dimension (same dimension as the thickness of the clearance space) from the inner peripheral surface and the outer peripheral surface of the non-noble metal body 911.

The noble metal bodies 912 and 913 are inserted and fitted respectively into the inside and the outside of the non-noble metal body 911 that has the interval keeping members 914 fixed thereto. Then, the outer peripheral surface of the noble metal body 912 and the inner peripheral surface of the noble metal body 913 are contacted and supported on inner ends and outer ends of the interval keeping members 914, respectively. Thus, the clearance spaces are formed between the inner peripheral surface of the non-noble metal body 911 and the outer peripheral surface of the inner noble metal body 912 and between the outer peripheral surface of the non-noble metal body 911 and the inner peripheral surface of the outer noble metal body 913, respectively.

[Second Modified Example of Inner Unit of First to Eighth Embodiments]

Figure 27:
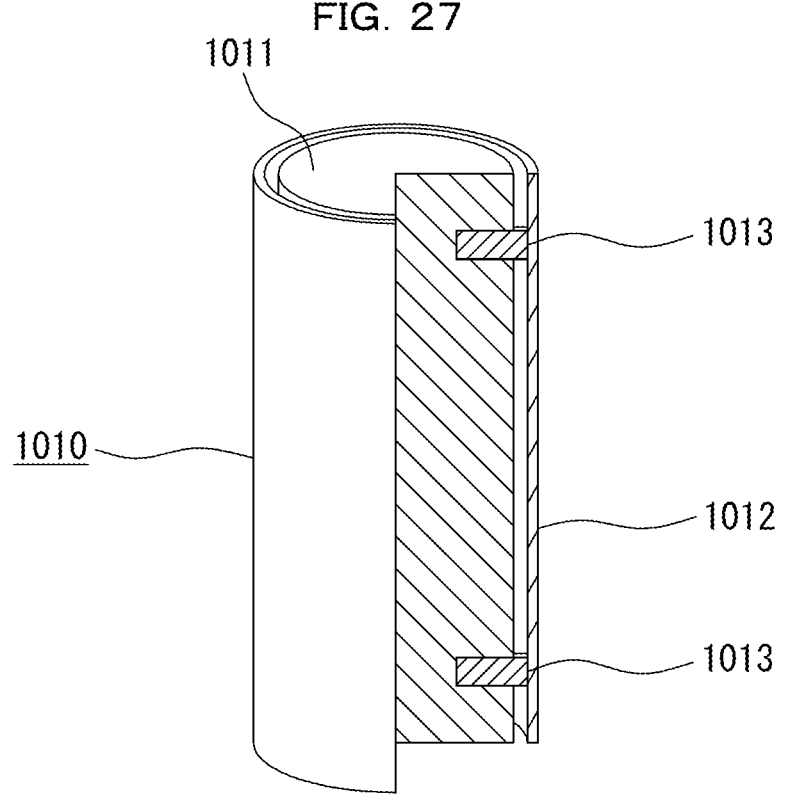
FIG. 27 is a perspective view showing the second modified example of the inner unit of the water battery device according to the first to the seventh embodiment of the invention, while cutting away a part thereof.
Figure 28:
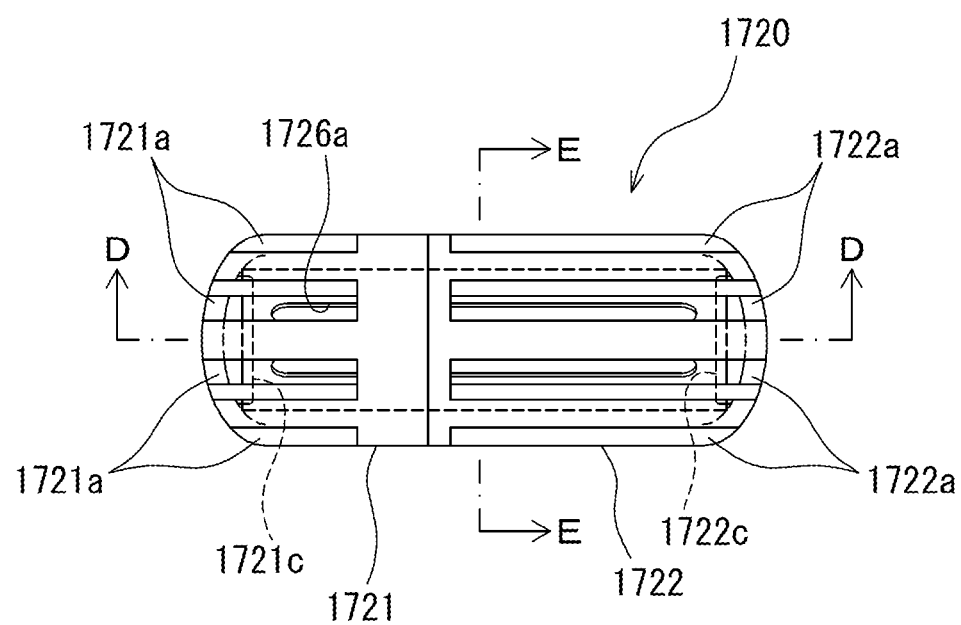
FIG. 28 is a front view showing a capsule type water battery device that is a water treating device for stored water purification as a water battery device according to a ninth embodiment of the invention.
Figure 29:
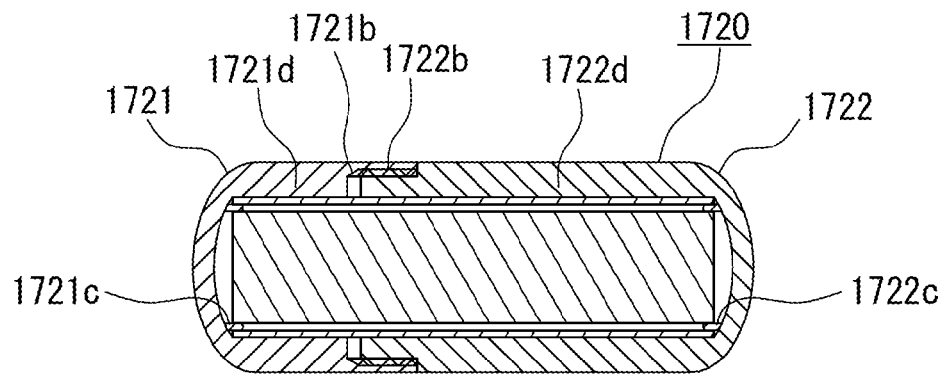
FIG. 29 is a cross-sectional view taken along line 29-29 of FIG. 28 and shows an internal structure of the capsule type water battery device as the water battery device according to the ninth embodiment of the invention.
Figure 30:
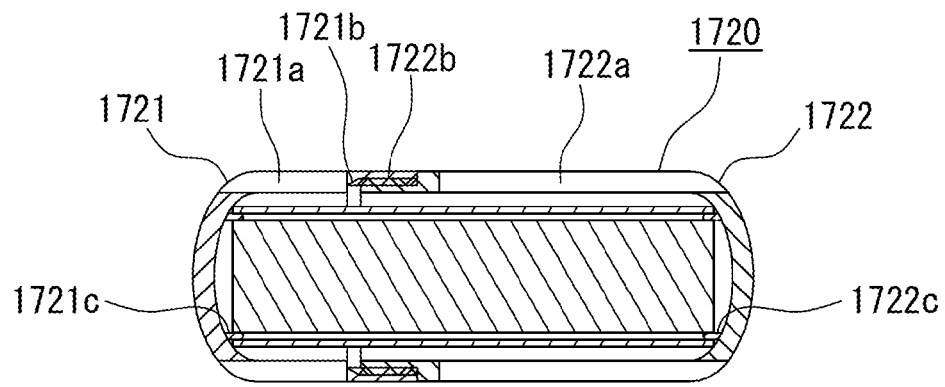
FIG. 30 is a cross-sectional view showing the capsule type water battery device similar to the cross-sectional view of FIG. 29 but taken along a slit portion thereof in place of the 29-29 line.
Figure 31:
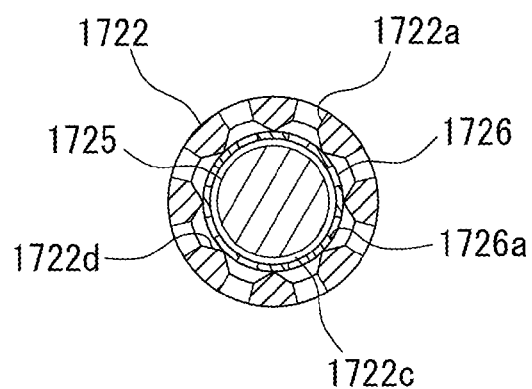
FIG. 31 is a cross-sectional view taken along line 31-31 of FIG. 28.

As shown in FIG. 26A to FIG. 27, in the second modified example, an inner unit 1010 is concretized into a two-layer structure that is composed of a non-noble metal body 1011 and a noble metal body 1012. The non-noble metal body 1011 has a circular column shape and the noble metal body 1012 has a circular cylindrical shape corresponding to the non-noble metal body 1011. The noble metal body 1012 is disposed at an outside of the non-noble metal body 1011. The non-noble metal body 1011 and the noble metal body 1012 are separated to each other with the fixed clearance space via interval keeping members 1014. The interval keeping member 1014 is structured into a small rod shape.

Each of the interval keeping member 1014 is fitted on the non-noble metal member 1011 such that the leading end portion (inside end portion) is protruded by a predetermined dimension (same dimension as the thickness of the clearance space) from the outer peripheral surface of the non-noble metal body 1011. The noble metal body 1012 is fitted on the outside of the non-noble metal body 1011 that has the interval keeping members 1014 fixed thereto.

[Water Battery Device for Stored Water Purification]

The present invention can be concretized into a water battery device for stored water purification as described above other than the water battery devices for flowing water purification according to the above-mentioned embodiments.

In this case, the water battery device has a container formed with slits so as to allow the water go into and out of the container.

Moreover, an inner unit composed of a non-noble metal body and a noble metal body is housed in a hollow inside space of the container.

The water battery device is put and immersed in the stored water, so that the stored water enters into the inside space of the container through the slits of the container.

Then, part of the stored water that entered into the inside space remains there for a fixed time period.

At this time, the metal ions are dissolved from the outer peripheral surface of the non-noble metal body by the battery action between the non-noble metal body and the noble metal body, while the active oxygen species being produced and dissolved into the water.

Thus, the stored water becomes a treated water (function water in which the metal ions and the active oxygen species are dissolved) that was treated under the battery action. After the fixed time period, the treated water is released from the container to the stored water so as to perform the various effects such as sterilization as described above.

Ninth Embodiment

As show in FIG. 28 to FIG. 31, a water battery device according to the ninth embodiment of the invention is concretized into a water battery unit 1720 as a water treatment device for store water purification.

The water battery unit 1720 has a housing composed of a first half housing piece 1721 and a second half housing piece 1722.

The first half housing piece 1721 has substantially a hollow circular cylindrical shape with a top surface at one end side formed into a curved shape (nearly semispherical shape) and a circular opening at the other end.

A plurality of water passing slits 1721a is formed on a periphery of the first half housing piece 1721 so as to penetrate the wall of the first half housing piece 1721 in the thickness direction so as to communicate an inside space thereof with an outside space. The water passing slits 1721a have a linear shape and arranged at constant angular intervals.

Similarly, the second half housing piece 1722 has substantially a hollow circular cylindrical shape with a top surface at one end side formed into a curved shape (nearly semispherical shape) and a circular opening at the other end.

The second half housing piece 1722 has a length longer than (about twice of three times as long as) the first half housing piece 1721.

A plurality of water passing slits 1722a is formed on a periphery of the second half housing piece 1722 so as to penetrate the wall of the second half housing piece 1722 in the thickness direction so as to communicate an inside space thereof with an outside space. The water passing slits 1722*a* have a linear shape and arranged at constant angular intervals.

A female thread 1721*b* is formed on an inner periphery of the other end portion the first half housing piece 1721. A male thread 1722*b* is formed on an outer periphery of the other end portion the second half housing piece 1722. The male thread 1722*b* is screwed into the female thread 1721*b* so as to couple and assemble the first half housing piece 1721 and the second half housing piece 1722. The male thread 1722*b* is loosened from the female thread 1721*b* so as to take apart the first half housing piece 1721 and the second half housing piece 1722.

Where the first half housing piece 1721 and the second half housing piece 1722 are coupled and assembled with each other, there is formed a housing space of a circular cylindrical shape for accommodating and fixedly holding a water battery 1725 and 1726. The housing space communicates with the outside space through the slits 1721*a* and 1722*a*.

The water battery unit 1720 has an inner unit of a similar structure to that of the above-described inner unit. The inner unit has a non-noble metal body 1725 and a noble metal body 1726. The noble metal body 1725 is a circular cylinder formed having a plurality of slits (slots) penetrating it in the thickness direction.

The water battery unit 1720 is immersed in the water to generate the battery action via the water existing in a minute clearance space between facing surfaces of the non-noble metal body 1725 and the noble metal body 1726.

An engaging protrusion 1721*c* of a shot ring shape is integrally formed on an inside bottom surface (inside bottom surface of a curved top surface part) of the first half housing piece 1721. Similarly, an engaging protrusion 1722*c* of a shot ring shape is integrally formed on an inside bottom surface (inside bottom surface of a curved top surface part) of the second half housing piece 1722.

Touch holding portions 1721*d* are integrally formed on portions but the slits 1721*a* (portions between the slits 1721*a*) in the inside periphery (inside periphery at the housing space part) of the first half housing piece 1721, respectively. The touch holding portion 1721*d* has substantially a triangular cross section with a tip at the inner side so as to project toward the center of the housing.

Similarly, Touch holding portions 1722*d* are integrally formed on portions but the slits 1722*a* (portions between the slits 1722*a*) in the inside periphery (inside periphery at the housing space part) of the second half housing piece 1722 respectively. The touch holding portion 1722 has substantially a triangular cross section with a tip at the inner side so as to project toward the center of the housing.

Where the water battery is housed inside the housing 1721 and 1722, the tips of the touch holding portions 1721*d* and 1722*d* touch the outer peripheral surface of the noble metal body 1726 so as to support the noble metal body 1726 along their ridges, while ensuring a sufficient water communication space between the water battery and the slits 1721*a* and 1722*a*.

Thus, the engaging protrusions 1721*c* and the engaging protrusions 1722*c* constitute an interval keeping member in collaboration so as to fixedly hold the clearance space at a constant interval between the non-noble metal body 1725 and the noble metal body 1726.

Tenth Embodiment

Figure 32:
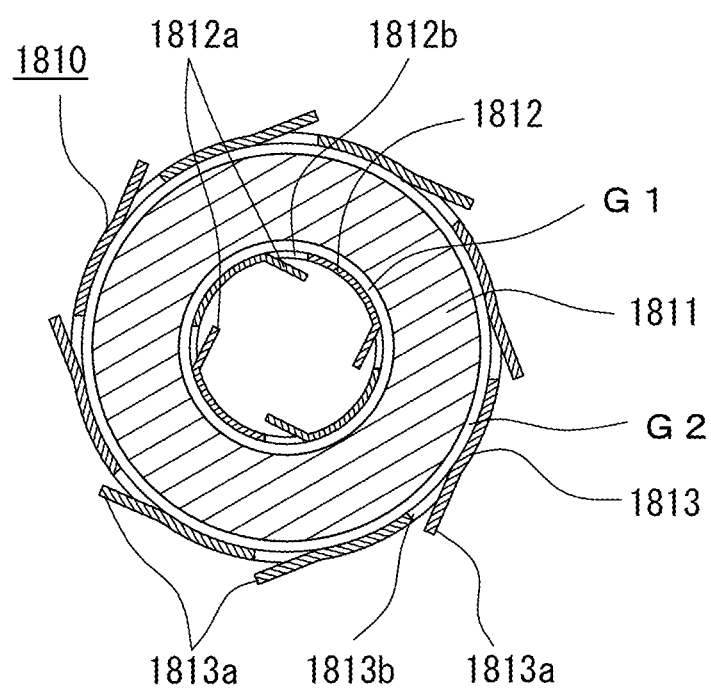
FIG. 32 is a cross-sectional view showing an inner unit of a water battery device according to a tenth embodiment of the invention.
Figure 33:
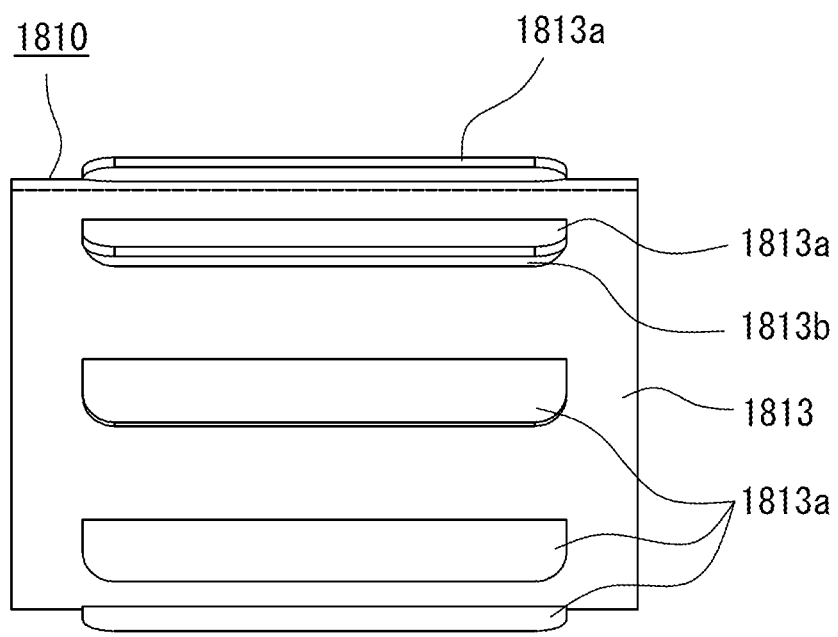
FIG. 33 is a front view showing the inner unit of the water battery device according to a tenth embodiment of the invention.

As shown in FIG. 32 and FIG. 33, a water battery device according to the tenth embodiment is different from the above-mentioned embodiments in a structure of an inner unit 1810.

In detail, the inner unit 1810 has a three-layer structure coaxially disposing a non-noble metal body 1811, an inner noble metal body 1812 and an outer noble metal body 1813 in overlapped manner. The non-noble metal body 1811 has a circular cylindrical shape of a middle diameter. The inner noble metal body 1812 has a circular cylindrical shape of a small diameter. The outer noble metal body 1813 has a circular cylindrical shape of a large diameter.

The inner noble metal body 1812 forms a plurality of lip portions 1812*a* having linear band shape by cutting and opening corresponding portions at constant angular intervals in the circumferential direction, respectively, and bending them toward an outside. Water passing slits 1812*b* of long rectangular shape are provided at the lip portions 1812*a*.

Similarly, the outer noble metal body 1813 forms a plurality of lip portions 1813*a* having linear band shape by cutting and opening corresponding portions at constant angular intervals in the circumferential direction, respectively, and bending them toward an outside. Water passing slits 1813*b* of long rectangular shape are provided at the lip portions 1813*a*.

The non-noble metal body 1811, inner noble metal body 1812 and outer noble metal body 1813 are separated by the interval keeping member at constant intervals G1 and G2, respectively.

According to the tenth embodiment, the lip or cut-out portions 1812*a* of the inner noble metal body 1812 and the lip or cut-out portions 1813*a* face the non-noble metal body 1811 so as to produced the battery action even between the lip portions 1812*a* and 1813*a* and the non-noble metal body 1811, in comparison with the case that simply forms the slits on the noble metal bodies.

Eleventh Embodiment

Figure 34:
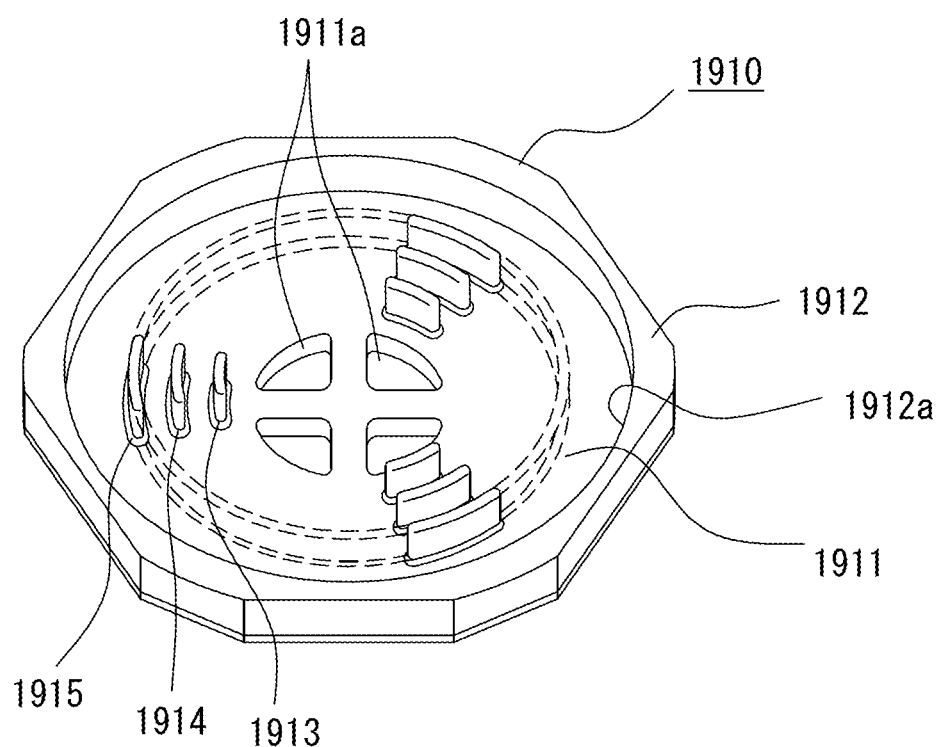
FIG. 34 is a front view showing a cap of an immersion type water battery device as a water battery device according to an eleventh embodiment of the invention.

As shown in FIG. 34, a water battery device according to the eleventh embodiment relates to a cap 1910 constituting a immersion type water battery device by gripping axial opposite ends of an inner unit to form one body.

Specifically, the cap 1910 has a base portion 1911 of a disk shape and an outer peripheral portion 1912 of a circular ring shape that is formed on one side of an outer peripheral edge of the base portion 1911 so as to be protruded therefrom in the thickness direction.

A plurality of water passing holes 1911*a* is formed to penetrate a center part of the base portion 1911.

Inner engaging protrusions 1913, middle engaging protrusions 1914 and outer engaging protrusions 1915 are integrally formed in order toward an outside in the radial direction between the water passing holes 1911*a* of the base portion 1911 and an inner circumferential surface of the outer peripheral portion 1912, respectively.

The inner engaging protrusions 1913, middle engaging protrusions 1914 and outer engaging protrusions 1915 are provided in plurality (every three pieces in the illustrated example) at equal angular intervals in the circumferential direction, respectively. Each piece of the engaging protrusions 1913, middle engaging protrusions 1914 and outer engaging protrusions 1915 has a curved lip shape of the same curvature as that of their circumferences.

The outer engaging protrusions 1915 may be formed into a circular ring shape that is continuous in the circumferential direction as shown by two-dot chain line in FIG. 34.

The cap 1910 is fitted in tight manner on the axial opposite ends of the non-noble metal body and inner and outer noble metal bodies of the above-mentioned three-layer structure.

At this time, the inner and outer peripheral surfaces at the end portion of the inner noble metal body are fitted into between the inner engaging protrusions 1913 and the middle engaging protrusions 1914. The inner and outer peripheral surfaces at the end portion of the non-noble metal body are fitted into between the middle engaging protrusions 1914 and the outer engaging protrusions 1915. The inner peripheral surface at the end portion of the inner noble metal body is fitted on the outer periphery of the outer engaging protrusions 1915.

Alternately, it is possible that the outer peripheral surface at the end portion of the inner noble metal body is fitted on the inner periphery of the inner engaging protrusions 1913. In this case, the inner and outer peripheral surfaces at the end portion of the non-noble metal body are fitted into between the inner engaging protrusions 1913 and the middle engaging protrusions 1914. The inner and outer peripheral surfaces at the end portion of the outer noble metal body are fitted into between the middle engaging protrusions 1914 and the outer engaging protrusions 1915.

Twelfth Embodiment

Figure 35:
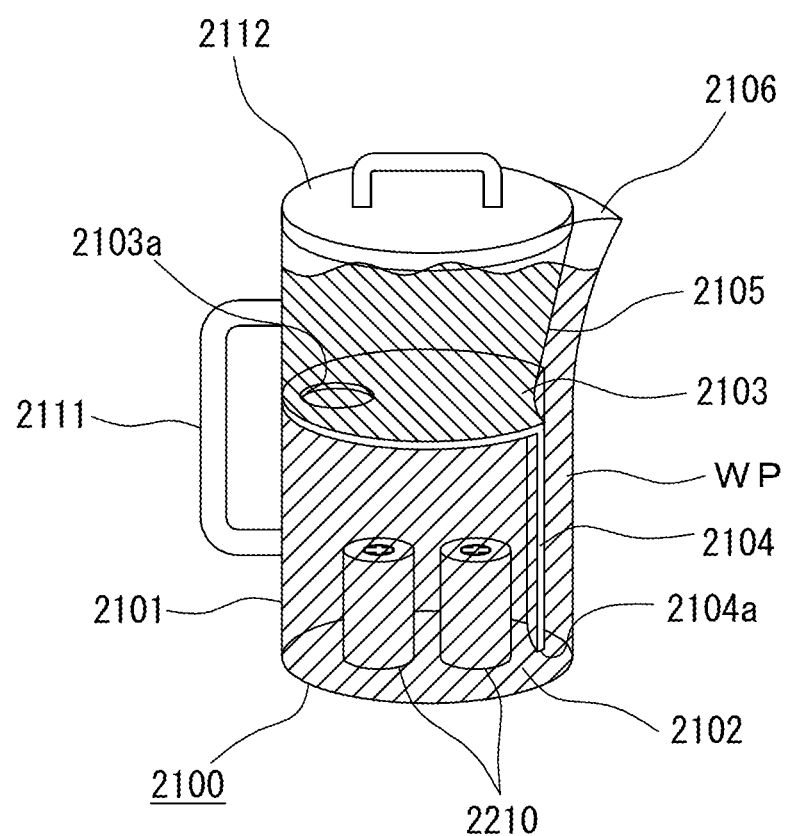
FIG. 35 is a front view showing a pot type water battery device as a water battery device according to a twelfth embodiment of the invention.

As shown in FIG. 35, a water battery device according to the twelfth embodiment is concretized into a pot-type water battery device 2100 as a water treatment device for stored water purification.

The pot-type water battery device 2100 has a similar appearance to that common jugs or pitchers. The water battery device 2100 has a side wall 2101 and a bottom wall 2102. A horizontal dividing wall 2103 of a horizontal plate shape is integrally formed at a middle part in a height direction of the side wall 2102 so as to divide an inside space into an upper space and a lower space.

A water passing hole 2103 penetrates the horizontal dividing wall 2103 at a position near an outer periphery and opposite to a lip 2106.

The water battery device 2100 has a vertical dividing wall 2104 integrally formed at an inside of the side wall 2101 corresponding to the lip 2106. The vertical dividing wall 2104 has a plate shape extending from the dividing wall 2103 to a predetermined position above the bottom wall 2102.

A little water passing clearance is formed between a lower end 2014a of the vertical dividing wall 2104 and the bottom wall 2102.

A water passage WP is formed between the vertical dividing wall 2104 and the lip 2106 of the side wall 2101 so as to extend from the water passing clearance to the lip 2106.

A fixing member (not shown) is provided on the bottom wall 2101 for fixing the inner unit 2210 (without a container) in the above-mentioned embodiments. The inner unit 2210 is secured to a predetermined zone (zone not facing the water passing hole 2103a).

Thus, the lip 2106 is blocked by the vertical dividing wall 2104 so as to be isolated from the upper space and the lower space above and under the horizontal dividing wall 2103 by the vertical.

With the pot-type water battery device 2100, when a lid 2112 is opened and a raw water is poured to an inside, the raw water is first filled in the upper space above the horizontal dividing wall 2103. Then, the raw water passes through the water passing hole 2103 and filled into the lower space under the horizontal dividing wall 2103. Thus, the inner unit 2210 produces the battery action water.

At this time, the poured water (raw water) is shut off by the horizontal dividing wall 2103 without directly hitting the inner unit 2210, thereby being filled in the accommodating space of the inner unit 2210 only from the water passing hole 2103a.

If the raw water directly hits the non-noble metal body, the oxide film tends to be formed on the non-noble metal body by the oxygen in the raw water. However, in the present embodiment, the horizontal dividing wall 2103 prevents such troubles.

The battery action water is stored and accumulated in the lower space under the horizontal dividing wall 2103 at high concentration. Moreover, the concentration becomes higher step by step from the upper part to the lower part even in the lower space under the horizontal dividing wall 2103. The concentration becomes the highest at the water passing clearance under the lower end of the vertical dividing wall 2104.

When a user holds a handle 2111 to tilt the pot-type water battery device and pour the water through the lid 2106, the battery action water of the highest concentration flows out among the battery action water at the lower space under the horizontal dividing wall 2103. Then, such battery action water flows through the water passing clearance at the lower end of the vertical dividing wall 2104 and runs along the water passage WP, thereby being spouted from the lip 2106 at last.

At this time, the battery action water in the accommodating space of the inner unit 2210 is not spouted to the outside at one time but discharged at a restricted flow rate by the vertical dividing wall 2104. Consequently, it prevents the troubles or defects caused by the concentration of the battery action water becoming too low (i.e. formation of oxide film or biofilm) in effective way.

Thirteenth Embodiment

Figure 36:
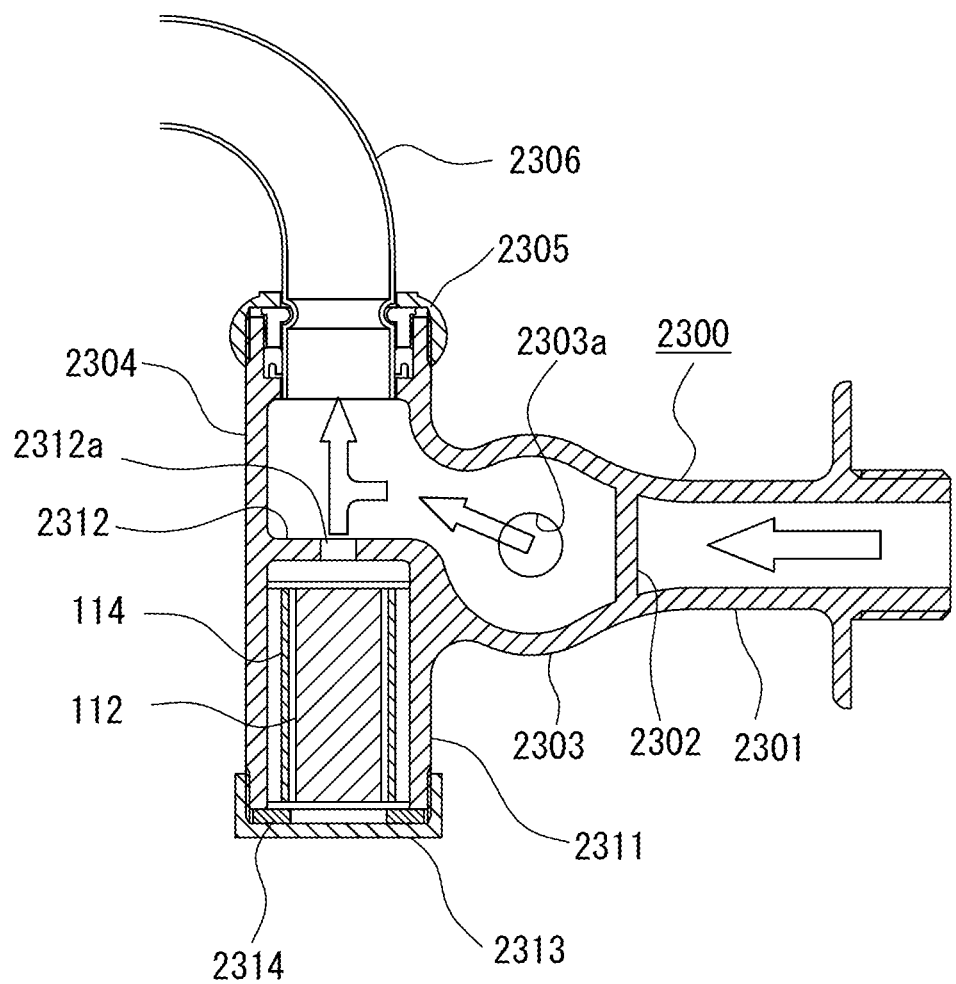
FIG. 36 is a front view showing a water battery device built-in with single faucet as a water battery device according to a thirteenth embodiment of the invention.

As shown in FIG. 36, a water battery device according to the thirteenth embodiment is concretized into a water battery device 2300 of single tap built-in type.

As shown by arrows in FIG. 36, the water battery device 2300 forms a flowing path in which the raw water from an upstream pipe 2301 flows through a dividing wall 2302 through a water passing hole 2303a of a downstream pipe 2303 and then flows to a spouting portion 2304 that is disposed at right angles to the downstream pipe 2303. Substantially the same structure as the water battery device according to the seventh embodiment is provided at a crossing part of the flowing path.

Specifically, a housing 2311 of a circular cylindrical shape is integrally formed on the crossing portion so as to be nearly perpendicular to the downstream pipe 2303.

Thus, the raw water inside the downstream pipe 2303 enters into the inside of the housing 2311 through a center outlet hole 2312a of an upper dividing wall 2312 of the housing 2311 in a direction substantially perpendicular to the water flowing direction.

Thereafter, the raw water circulates inside the housing 2311 to become the battery action water by the sterilizing unit 112, 114.

The battery action water flows out of the center outlet hole 23-4 of the upper dividing wall 2312 of the housing 2311 toward the spouting portion 2304, thereby being supplied from a spouting opening 2305 to a spouting pipe 2306.

That is, the battery action water inside the housing 2311 is drawn or induced by the raw water flowing along the downstream pipe 2303 so as to be discharged to the outside.

An lower end opening of the housing 2311 is covered in watertight manner via a sealing member 2314 by a cap 2313.

Fourteenth Embodiment

As shown in FIG. 37 to FIG. 43, a water battery device according to a fourteenth embodiment is concretized into an immersion-type water battery device 2400 as a water treatment device for stored water purification.

The water battery device 2400 has a container and an inner unit 1800. The container is composed of a housing 2410 and a cap 2430. The inner unit 1800 is accommodated in the container. The housing 2410 has a structure to house and hold the inner unit 1800 at a fixed position.

The cap 2430 has a structure to be fitted detachably on a upper end opening of the housing 2410.

<Housing>

Figure 38:
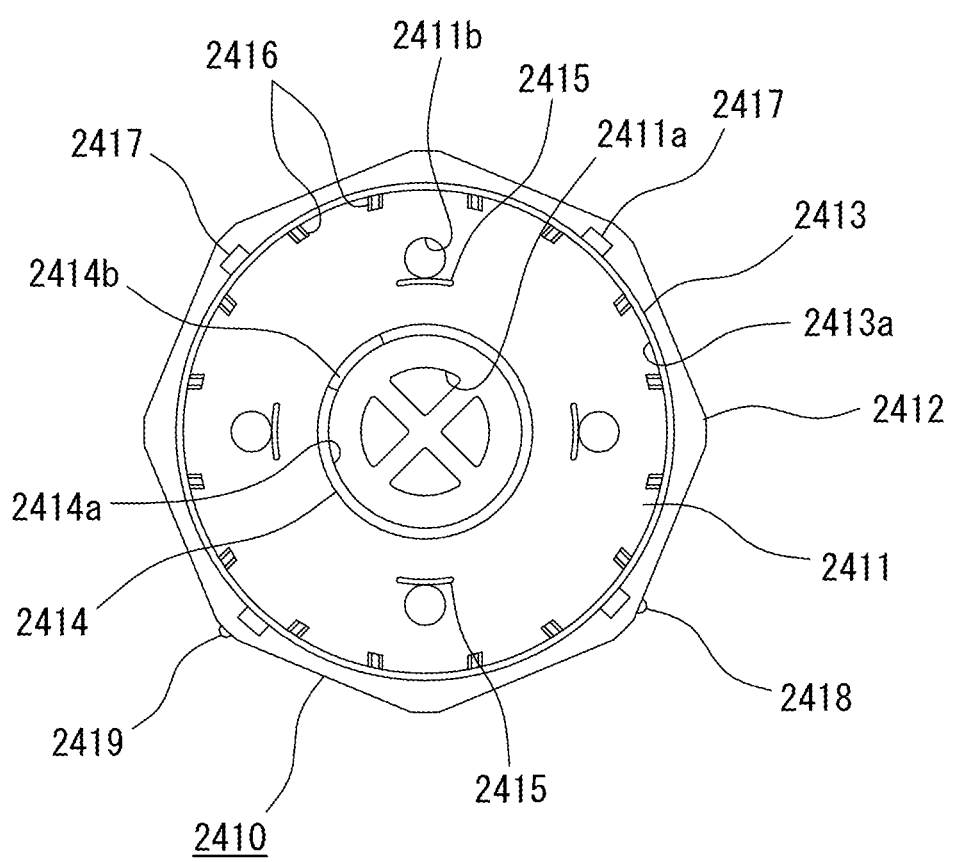
FIG. 38 is a plan view showing the internal structure of the housing of the immersion type water battery device according the fourteenth embodiment of the invention

Specifically, as shown in FIG. 38, the housing 2410 has a base portion 2411 and a tubular portion 2412. The base portion 2411 has a disk shape. The tubular portion 2412 is integrally formed on an outer circumferential edge of the base portion 2411 so as to extend upward toward one side in the axial direction (upside in used state).

An outer peripheral surface of the tubular portion 2412 has substantially a octagonal tubular shape by chamfering corners of a regular octagon. An inner peripheral surface of the tubular portion 2412 has a circular cylindrical shape. The other end (upper end) of the tubular portion 2412 is made into a circular opening. A mounting portion 2413 is formed integrally on the upper end of the inner periphery of the tubular portion 2412, while being shaped into a circular ring thin plate shape, so as to project coaxially from the circular opening.

Thereby, an inner peripheral surface 2413a of a circular cylindrical shape is formed from the axial one end (lower end) of inner peripheral surface of the tubular portion 2412 to a leading end (upper end) of the mounting portion 2413 at the other side.

Figure 40:
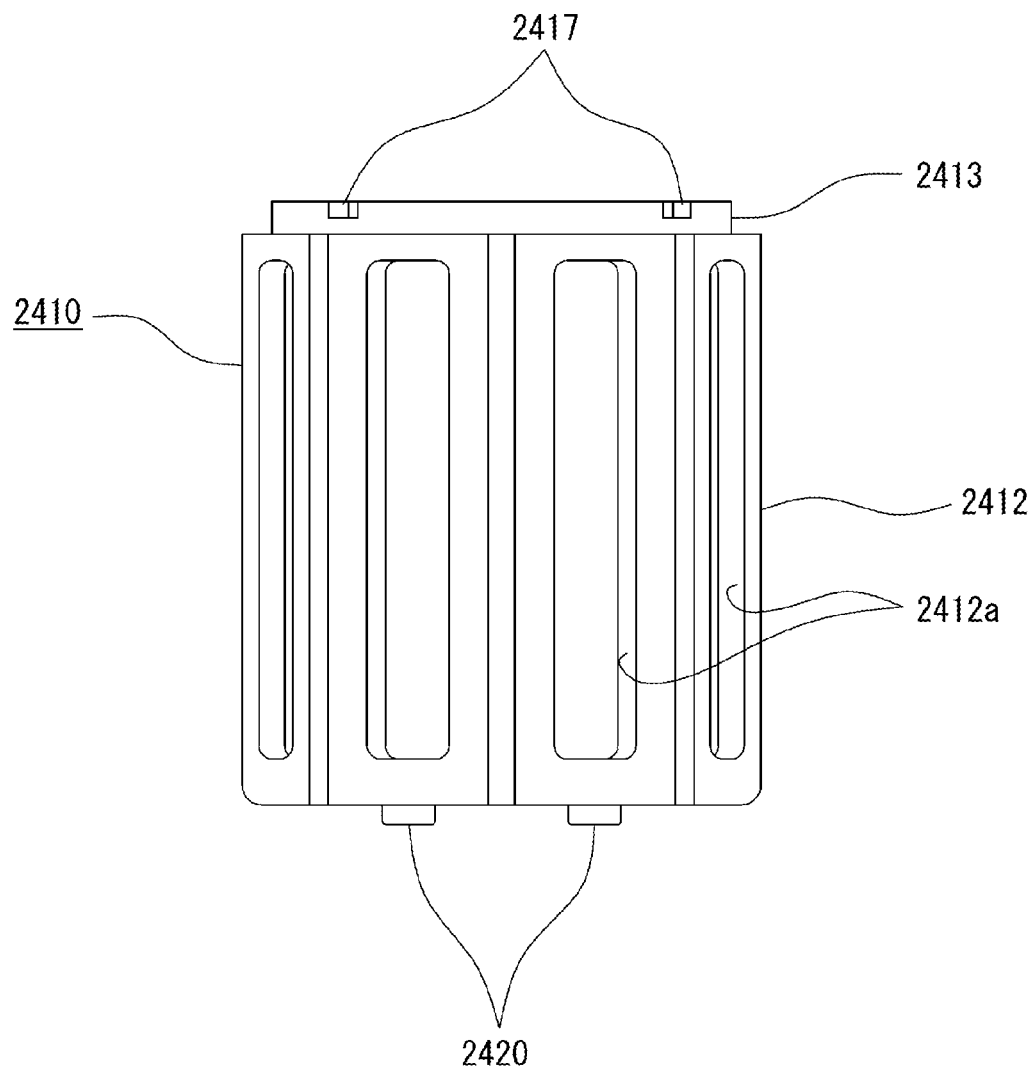
FIG. 40 is a side view showing the housing of the immersion type water battery device according the fourteenth embodiment of the invention

As show in FIG. 40, eight slits 2412a are formed on eight band-shaped flat surface portions, which are faces except the chamfered corners, constituting the outer peripheral surface of the tubular portion 2412. The slit 2412a extends linearly from a position near the lower end to a position near the upper end of the bar-shaped portion and penetrates it or passes through the inner peripheral surface thereof so as to communicate an inside space and an outside space.

The slit 2412a is a tapered slot that has a width gradually decreasing from an outer side surface as a flat surface to an inner peripheral surface of a circumferential surface of the tubular portion 2412.

A length (height) of the slit 2412a is set at substantially the same as a height of the lip 1813a of the outer noble metal body 1813. While the width of the slit 2412a decreases inwardly, a width just at the inner peripheral surface of the tubular portion 2412 is set at substantially the same as the width of the lip 1813a.

A width (circumferential dimension) between the adjacent slits 2412a of the tubular portion 2412 is set at substantially the same as the width dimension (maximal width size) of the lip 1813a just at the outer side surface.

That is, the tubular portion 2412 arranges the eight slits 2412a and the eight blocking or shutting-off portions between slits alternately at constant angular intervals (360/16=about 14 degrees intervals) in the circumferential direction.

The housing 2410 is structured such that it accommodates and holes the non-noble metal body 1811, inner noble metal body 1812 and outer noble metal body 1813 of the inner unit 1800 at the constant clearance intervals at the fixed positions.

Specifically, four inner water passing holes 2411a of quadrant shape penetrate the center part of the base portion at equal angular intervals in the circumferential direction.

A fitting protrusion 2414 of a circular ring shape of predetermined diameter is integrally formed at an outside of the inner water passing holes 2411a on the inner surface (upper surface) of the base portion 2411 so as to be coaxial with the base portion 2411.

The inner water passing holes 2411a are coaxially disposed at an inside of the fitting protrusion 2411.

A diameter (inner diameter) of an inner peripheral surface 2414a of the fitting protrusion 2414 is set at substantially the same diameter (outer diameter) as the outer peripheral surface of the inner noble metal body 1812. Thus, the fitting protrusion 2414 is detachably fitted tightly on the outer peripheral surface of the lower end portion of the inner noble metal body 1812 so as to fix it at a fixed position.

The fitting protrusion 2414 has an outer diameter of substantially the same as the diameter (inner diameter) of the inner peripheral surface of the non-noble metal body 1811 (or of a diameter slightly smaller by one tenth or one hundredth of millimeter) so as to be detachably fitted tightly on the inner peripheral surface of the lower end portion of the non-noble metal body 1811 to secure it in the fixed position.

A thickness of the fitting protrusion 2414 is set at the same value as the constant clearance interval between the non-noble metal body 1811 and the inner noble metal body 1812. Thus, the fitting protrusion 2414 constitutes an interval keeping member to maintain the constant clearance interval between the non-noble metal body 1811 and the inner noble metal body 1812 at their lower end side.

The fitting protrusion 2414 has a predetermined height (width). A circumferential portion (angular range of about 30 degrees to about 40 degrees) of the fitting protrusion 2414 is cut out by the same circumferential length from the upper end to the middle toward the lower end so as to define a cutout 2414b.

A lower end of the cutout 2414b is positioned at a predetermined height from the inner surface of the base portion 2411.

A plurality of (four) separating protrusions 2415 of projecting piece shape is integrally formed at an outside of the fitting protrusion 2414 on the inner surface of the base portion 2411 so as to project upward. The separating protrusions 2415 are disposed on a circle (imaginary circle) of a predetermined diameter so as to be coaxial with the base portion 2411 at constant angular intervals (90 degrees intervals).

Each separating protrusion 2415 is an arc-shaped plate having the same curvature as the diameter of the imaginary circle.

The imaginary circle on which the separating protrusions 2415 are arranged has a diameter larger than the outer diameter but smaller than the inner diameter of the non-noble metal body 1811. Preferably, the imaginary circle has a diameter at the middle of the outer diameter and the inner diameter of the non-noble metal body 1811.

The separating protrusion 2415 has a height smaller than the height of the fitting protrusion 2414 and substantially the same as the height of the lower edge of the cutout 2414b (or slightly smaller or slightly larger by one tenth or one hundredth millimeter).

When the non-noble metal body 1811 is fitted on the outside of the fitting protrusion 2414, the separating protrusions 2415 support the bottom surface (lower end surface) of the non-noble metal body 1811 so as to keep the bottom surface of the non-noble metal body 1811 separated above the inner surface of the base portion 2411 by a fixed distance.

Circular outer water passing holes 2411b of small diameter penetrate the base portion 2411 at the outside of the separating protrusions 2415 so as to circumscribe the separating protrusions 2415, respectively. A diameter of the outer water passing hole 2411b is within a range of a circumferential length of the separating protrusion and within a range of the thickness of the non-noble metal body 1811.

Thereby, when the non-noble metal body 1811 is fitted and held on the outside of the fitting protrusions 2414, the bottom surface (lower surface) of the non-noble metal body 1811 is engaged with and supported on the upper end of the separating protrusions 2415. Thus, bottom surface of the non-noble metal body 1811 is separated above from the inner surface of the base portion 2411 by a fixed distance (height of the separating protrusion 2415), while the bottom surface facing the outer water passing holes 2411*b* in separated manner.

At this time, the bottom surface of the non-noble metal body 1811 is at substantially the same height as the cutout 2414*b* of the fitting protrusion 2414 at the inner peripheral side of the non-noble metal body 1811 (or a height slightly smaller or slightly larger by one tenth of one hundredth millimeter).

Figure 37:
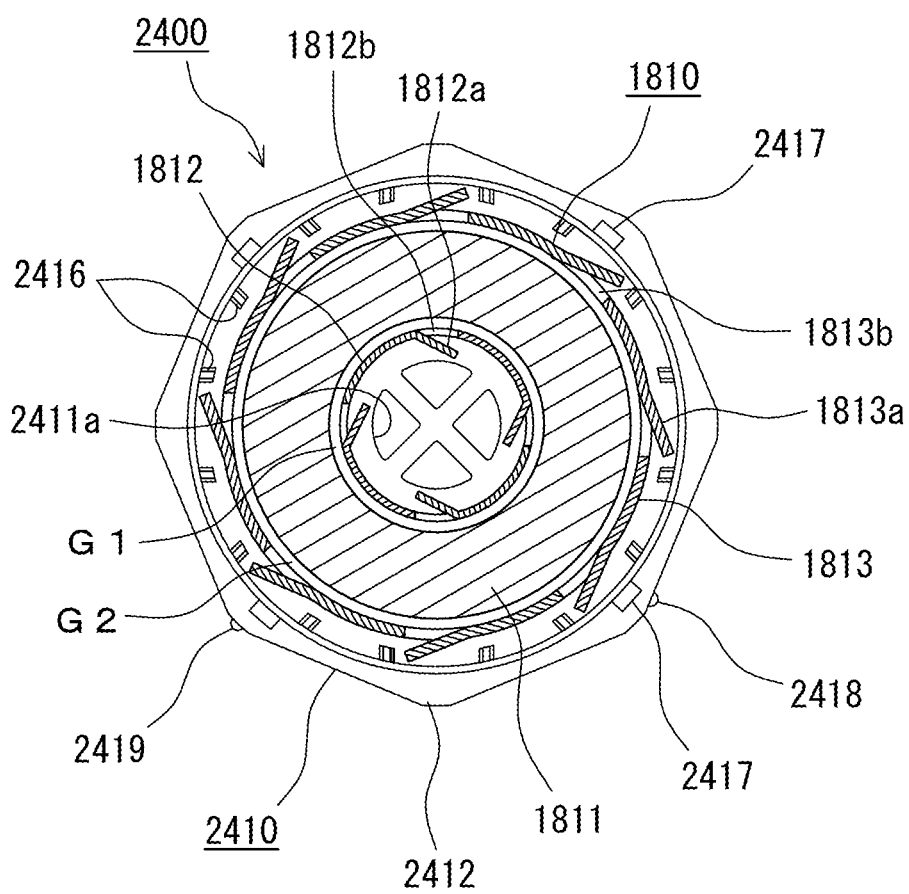
FIG. 37 is a plan view showing an internal structure (with a cap detached from a housing) of an immersion type water battery device that is a water treatment device for stored water purification as a water battery device according a fourteenth embodiment of the invention, while depicting a metal body part as a cross-section view.

As shown in FIG. 37, regulating protrusions 2416 are integrally formed on the inner peripheral surface of the tubular portion 2412 and the mounting portion 2413 at constant intervals in the circumferential direction of the inner peripheral surface.

Each regulating protrusion 2416 extend along full length from the lower end to the upper end of the inner peripheral surface. Each regulating protrusion 2416 has a rib-shape or bar-shape of a constant width that is protruded inward from the inner peripheral surface of the tubular portion 2412 and the mounting portion 2413 (e.g. in the radial direction toward the center).

The interval provided between the regulating protrusions 2416 is an interval that divide the inner peripheral surface of the housing 2410 into sixteen. Thus, the regulating protrusions 2416 are disposed at substantially the same fixed intervals as the maximal width of the slit 2412 in the circumferential direction.

The regulating protrusions 2416 are disposed at positions corresponding to (or at substantially the same circumferential positions as) lateral opposite ends of the slits 2412*a* at the inner peripheral surface of the housing 2410, more exactly, at opposite ends in the width direction at the outer surface side as the maximal width.

In detail, the regulating protrusion 2416 has a tapered shape that enlarges its width gradually from an upper end to a lower end thereof so as to define a conical front shape. Moreover, the regulating protrusion 2416 is protruded in tapered manner from the inner peripheral surface of the housing 2410, while increasing its width (projecting dimension) gradually from the upper end to the lower end, so as to define conical side shape.

The thickness of the tubular portion 2412 itself is tapered so as to increase gradually from the upper end to the lower end. The inner peripheral surface of the housing 2410 is a tapered surface that decreases it diameter gradually from the upper end to the lower end.

A circle or circular cylinder (imaginary one) connecting the inner end surface (leading end surface in the projecting direction) of the sixteen regulating projections 2416 has a diameter at its lower most end set at a value substantially the same as the outer diameter of the outer noble metal body 1813.

A diameter at the uppermost end of the imaginary cylinder is larger than the outer diameter of the outer noble metal body 1813. Thereby, when the outer noble metal body 1813 is accommodated in the housing 2410, the outer peripheral surface at the lower end of the outer noble metal body 1813 is contacted or nearly contacted with the inner end surface of the regulating protrusions 2416 so as to be detachably fitted tightly therein. Thus, the outer noble metal body 1813 is held at the fixed position.

Moreover the constant clearance interval is maintained between the outer noble metal body 1813 held at the fixed position in the above-mentioned manner and the non-noble metal body 1811 held at the fixed position by the fitting protrusions 2414.

That is, the regulating protrusions 2416 and the fitting protrusions 2414 constitute the interval keeping member in cooperation to keep the fixed clearance interval between the non-noble metal body 1811 and the outer noble metal body 1813.

On the other hand, the outer noble metal body 1813 arranges eight lips 1813*a* and eight inter-cutout blocking portions at constant angular intervals (360/14=about 14 degrees intervals) in the circumferential direction one after the other.

Thereby, as shown in FIG. 37, when the outer noble metal body 1813 is housed in the housing 2410, each of the lips 1813*a* is located between the pair of adjacent regulating protrusions 2416*a* corresponding thereto. Moreover, the lateral outer ends (leading ends in the projecting direction) of the lips 1813*a* are located at positions near the base end of the regulating protrusions 2416*a* or away from the inner end of the regulating protrusions 2416*a*. Thus, the lateral outer ends of the lips 1813*a* are adapted to touch the regulating protrusions 2416*a* so as to stop the outer noble metal body 1813 from rotating.

There are two modes as modes of accommodating the outer noble metal body 1813 in the housing 2410. In a first accommodating mode, the lips 1813*a* are located between the regulating protrusions 2416*a* so as to face the slits 2412*a*. In a second accommodating mode, the lips 1813*a* are located between the regulating protrusions 2416*a* so as to face the inter-slit blocking portions.

In the first accommodating mode, the outer ends of the lips 1813*a* of the outer noble metal body 1813 are located near the slits 2412*a* in relation to the regulating protrusions 2416*a* (exactly, near the one end in the width direction of the slit 2412*a*). In the second accommodating mode, the outer ends of the lips 1813*a* of the outer noble metal body 1813 are located near the inter-slit blocking portions in relation to the regulating protrusions 2416*a* (exactly, near the one end in the width direction of the inter-slit blocking portion).

FIG. 37 illustrates the second accommodating mode.

Accordingly, the first accommodating mode enables the flow rate of the water to be relatively large between the slits 2412*a* and the water passing slits 1813*b*. The second accommodating mode enables the flow rate of the water to be relatively small between the slits 2412*a* and the water passing slits 1813*b*. Thus, it is possible to control or adjust the water flow rate per unit time or the water flow rate per unit volume.

Particularly, the container with the structure of the housing 2410 has the container structure that enables the electric current to be produced in the water between the non-noble metal body 1811 and the outer noble metal body 1813, that keeps the concentration of the oxygen in the water at a value required for continually producing the battery action water and that surrounds the non-noble metal body 1811 and the outer noble metal body 1813 so as to keep the concentration of the battery action water produced between the non-noble metal body 1811 and the outer noble metal body 1813 at a value not less than a predetermined concentration at which the oxide film or the biofilm is formed on the facing surface of the non-noble metal body and so as to maintain the concentration of the battery action water from the non-noble metal body 1811 at the value not less than the predetermined concentration.

The structure using the slits 2412a and the regulating protrusions 2416 of the housing 2410 to allow the first and second accommodating modes to be selected constitute a flow rate adjusting means in the container structure that makes only part of the used water flows into the inside of the container and flows out of the container.

The container has an indirect flow-in/flow-out container structure as the container structure that allows the water of the limited flow rate per unit time to flow in the inside of the container and flows out of the container and that allows the limited flow rate of the water to communicate the batter action space composed of the clearance space between the first reactor and the second reactor inside the container.

Four fitting protrusions 2417 are integrally formed on the upper end surface of the tubular portion 2412 at constant angular intervals (90 degrees) in the circumferential direction so as to be protrude from the outer peripheral surface of the mounting portion 2413.

A first target protrusion 2418 is integrally formed at a first angular position on the outer side surface of the tubular portion 2411, while a second target protrusion 2419 being integrally formed at a second angular position on the outer side surface of the tubular portion 2411, for positioning of the cap 2430 at the time of fitting to the housing 2410.

Figure 39:
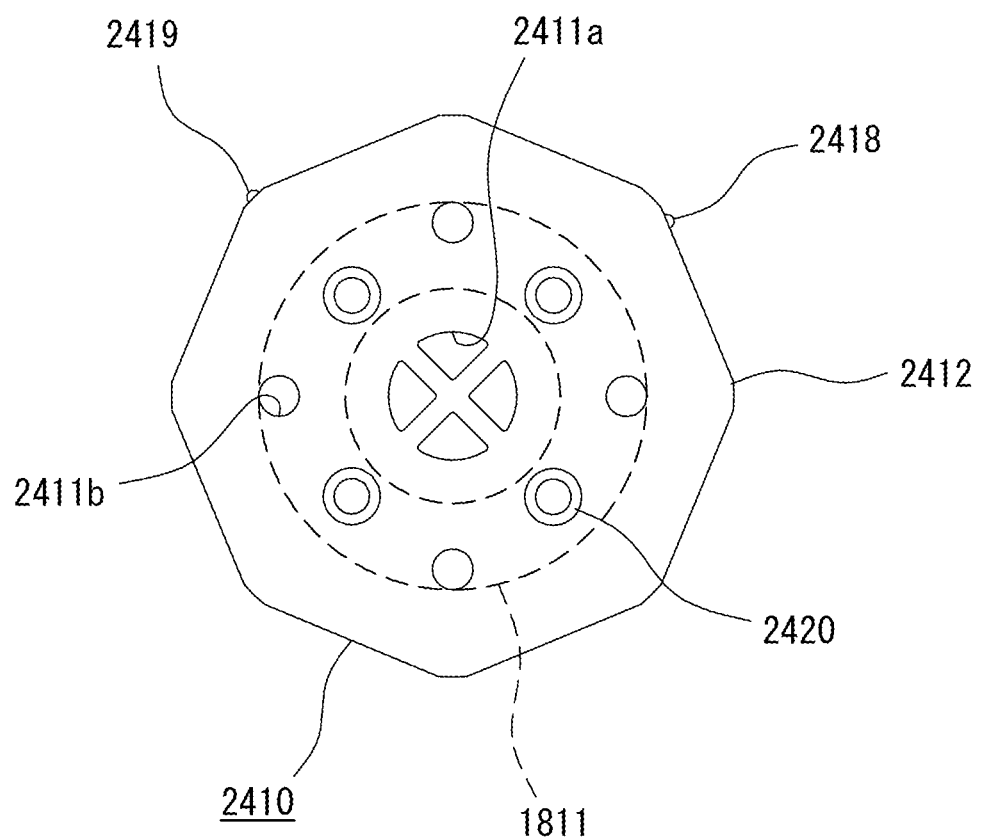
FIG. 39 is a bottom view showing the immersion type water battery device according the fourteenth embodiment of the invention

As shown in FIG. 39, four supporting protrusions 2420 are integrally formed on the lower surface of the base portion 2411 of the housing 2410 at constant angular intervals (90 degrees intervals) in the circumferential direction. The supporting protrusions 2420 are located at positions facing the bottom surface of the non-noble metal body 1811 accommodated inside the housing 2410

<Cap>

Figure 41:
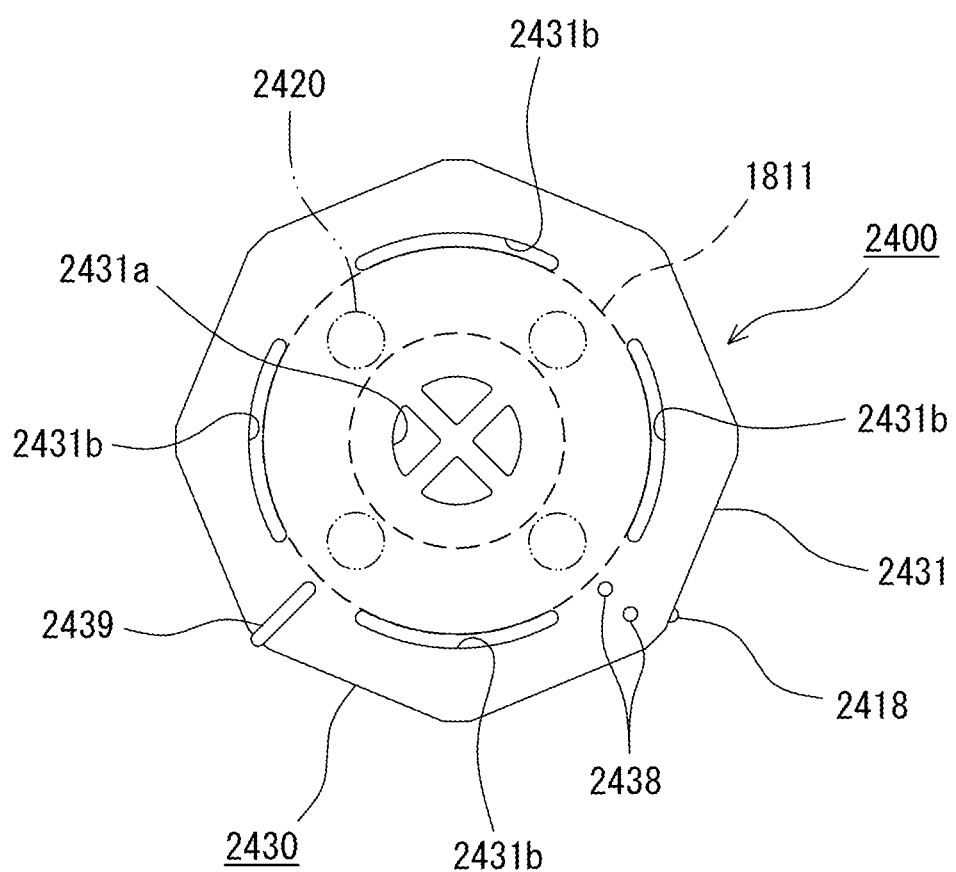
FIG. 41 is a plan view showing the immersion type water battery device according the fourteenth embodiment of the invention
Figure 42:
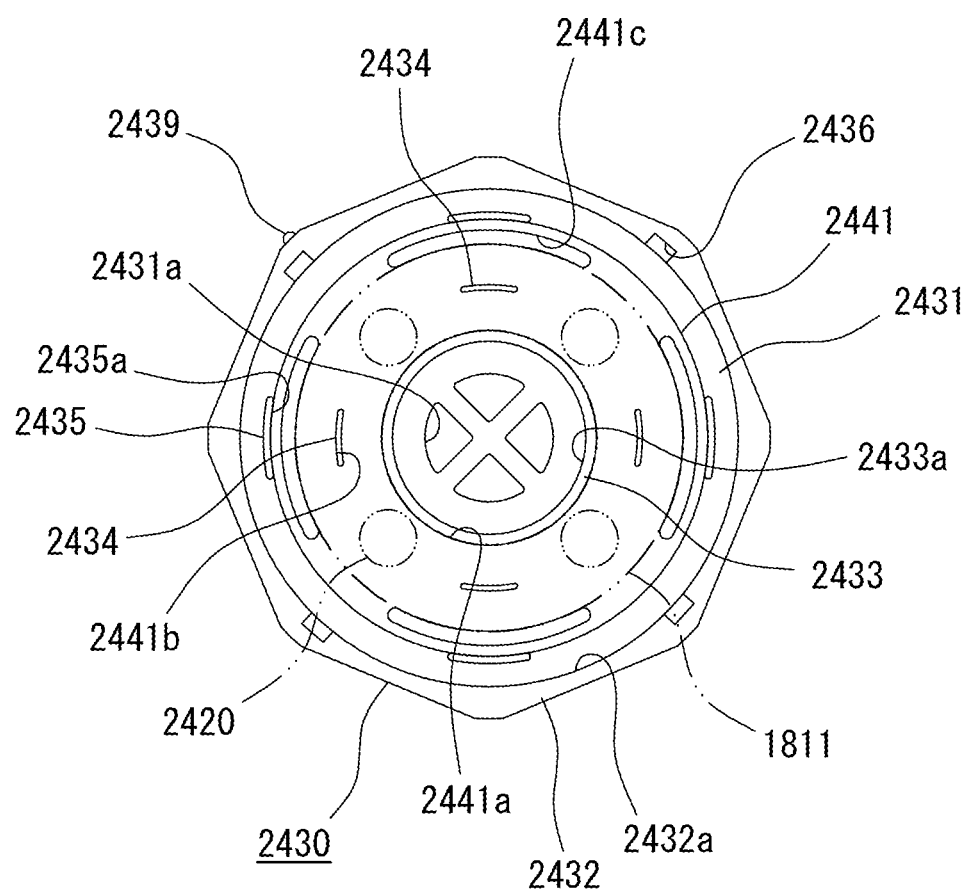
FIG. 42 is a bottom view showing the cap of the immersion type water battery device according the fourteenth embodiment of the invention
Figure 43:
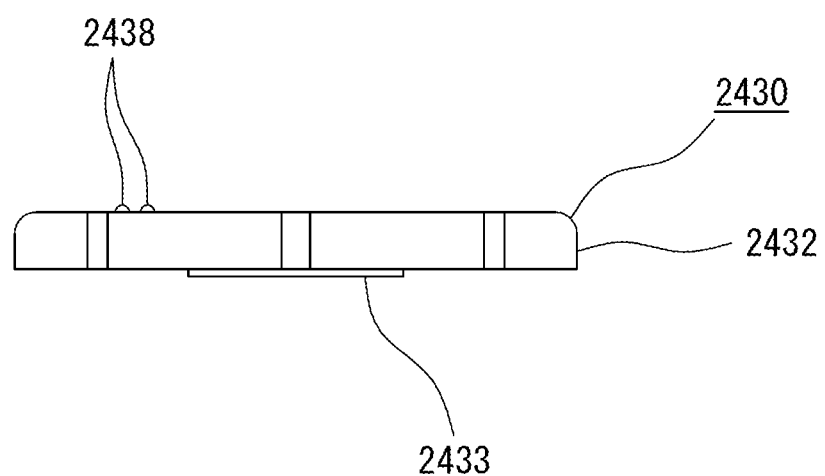
FIG. 43 is a side view showing the cap of the immersion type water battery device according the fourteenth embodiment of the invention

As shown in FIG. 41 to FIG. 43, the cap 2430 has a base portion 2411 of a disk shape and an outer peripheral portion 2412 that is formed on one side of an outer peripheral edge of the base portion 2411 so as to be protruded therefrom in the thickness direction.

An outer peripheral surface of the outer peripheral portion 2432 has substantially an octagonal tubular shape of the same shape and the same dimension as the outer peripheral surface of the housing 2410 (particularly same as those at the upper end position). An inner peripheral surface 2432a has a circular cylindrical shape of the same diameter as the outer peripheral surface of the mounting portion 2413.

A plurality of water passing holes 2411a is formed to penetrate a center part of the base portion 2411 at positions corresponding to the inner water passing holes 2411a of the housing 2411a. The water passing hole 2431a has the same shape as the water passing hole 2411a.

A fitting protrusion 2433 is integrally formed at the outside of the water passing holes 2431a on the inner surfaced (lower surface) of the base portion 2431 so as to be coaxial with the base portion 2431. The fitting protrusion 2433 has a circular ring shape to and is protruded downward.

The water passing holes 2431a are coaxially disposed at the inside of the fitting protrusion 2433.

The fitting protrusion 2433 has the ring shape of the same thickness and the same diameter (outer diameter and inner diameter) as the fitting protrusion 2414 so as to be tightly fitted on the outer peripheral surface of the upper end portion of the inner noble metal body 1812 and to secure it at a fixed position. The fitting protrusion 2433 also is tightly fitted on the inner peripheral surface of the upper end portion of the non-noble metal body 1811 so as to hold it at a fixed position.

The fitting protrusion 2433 constitutes an interval keeping member to keep the constant clearance interval at the upper end side between the non-noble metal body 1811 and the inner noble metal body 1812.

The fitting protrusion 2433 is a member corresponding to the fitting protrusion 2414. When the cap 2430 is fitted on the housing 2410, the fitting protrusion 2433 constitutes the interval keeping member at the upper end side of the non-noble metal body 1811 to maintain the constant clearance interval between the non-noble metal body 1811 and the inner noble metal body 1812. Therefore, the fitting protrusion 2433 may have the same height as the fitting protrusion 2411 or may have a different height. Preferably, it has a height little larger than the projecting height of the outer peripheral portion 2432 from the base portion 2431 (slightly larger projecting height as shown in FIG. 43).

The fitting protrusion 2433 has no cutout 2414a as in the fitting protrusion 2414.

As shown in FIG. 42, a plurality of (four) separating protrusions 2434 of projecting piece shape is integrally formed at an outside of the fitting protrusion 2433 on the inner surface of the base portion 2431 so as to project downward. The separating protrusions 2434 are disposed on a circle (imaginary circle) of a predetermined diameter so as to be coaxial with the base portion 2431 at constant angular intervals (90 degrees intervals).

The separating protrusions 2434 are members corresponding to the separating members 2415. The separating protrusion 2434 may be formed into the same dimension and the same shape as the separating protrusion 2415 or may be located on an imaginary circle corresponding to the imaginary circle on which the separating protrusions 2415 are located within a range facing the upper end surface of the non-noble metal body 1811 disposed at the fixed position of the housing 2410

The separating protrusion 2434 has a height smaller than the projecting height of the When the non-noble metal body 1811 is fitted on the outside of the fitting protrusion 2433, the separating protrusions 2434 support the top surface (upper end surface) of the non-noble metal body 1811 so as to keep the top surface of the non-noble metal body 1811 separated below the inner surface of the base portion 2431.

As shown in FIG. 41, four air vent holes 2431b are formed to penetrate nearly middle positions (in the radial direction) between the separating protrusion 2434 and the outer peripheral portion 2432 on the base portion 2431, respectively. The air vent holes 2431b are disposed on a circle (imaginary circle) of a predetermined diameter that is coaxial with the base portion 2411 at constant angular intervals (90 degrees intervals).

Each air vent hole 2431b has a thing groove shape or slit shape that extends in the circumferential direction by a fixed arc angle and with a fixed width.

Each of the air vent holes 2431b has a predetermined shape and a predetermined dimension and is disposed at a predetermined angular position within a predetermined angular range such that, when the cap 2430 is fitted on the housing 2410, the air vent holes 2431b have a predetermined opening area and are located within the range of the clearance space between the non-noble metal body 1811 and the outer noble metal body 1813 housed at the fixed positions of the housing 2410.

In the present embodiment, the air vent holes 2431b are disposed such that the inner circumferential edge coincides perfectly with the outer peripheral surface of the non-noble metal body 1811 (housed at the fixed position of the housing 2410) as shown by the broken line in FIG. 41 and such that the outer circumferential edge coincides perfectly with the inner peripheral surface of the noble metal body 1813 (housed at the fixed position of the housing 2410) (the line not shown).

That is, the air vent hole 2431b has a width that is set at the same value as the thickness of the clearance space between the non-noble metal body 1811 and the outer noble metal body 1813 such that the inner circumferential edge and the outer circumferential come to such positions.

However, it is possible for the air vent hole 2431b to set the inner circumferential edge position and the outer circumferential position at desired positions as long as they are within the range between the outer peripheral surface position of the non-noble metal body 1811 and the inner peripheral surface position of the outer noble metal body 1813. Moreover, the air vent hole 2431b may have a width set at a desired value according to the change of the circumferential positions.

In addition, while the arc angle of each air vent hole 2431b is set at about 70 degrees, it may be set at a desired angle within a range of the circumferential length of the clearance space between the non-noble metal body 1811 and the outer noble metal body 1813.

The air vent holes 2431b serve to ventilate or outgas the air when the air such as the oxygen is generated in the water at the clearance space by the battery action at the clearance space between the non-noble metal body 1811 and the outer noble metal body 1813.

That is, the inventors have acquired the following knowledge. In case the cap 2430 shuts off a location corresponding to the clearance space between the non-noble metal body 1811 and the outer noble metal body 1813, an air remains inside the cap 2430. In this case, if the water battery device is set up vertically with the cap 2430 positioned at the upper side in the stored water, the air produced at the clearance space goes up in and remains at the upper part inside the container. Accordingly, the outer peripheral surface of the non-noble metal body 1811 is tarnished (into black color) along an uprising route of the air.

Particularly, it was confirmed that the tarnished area became large near the upper end portion of the non-noble metal body 1811 where the air remained.

It will be caused by the fact that the oxygen in the uprising air oxidizes the surface of the non-noble metal body 1811.

Accordingly, in the present embodiment, the air vent holes 2431b are provided at above the route where the air produced at the clearance space between the non-noble metal body 1811 and the outer noble metal body 1813 goes up and passes along, i.e. at such positions as to let out the air completely. Thus, the uprising air can be smoothly and surely let out to the outside so as to prevent the tarnishing (by the formation of oxide film) of the non-noble metal body 1811.

Therefore, the total arc angle defined by all the air bent hole 2431b is preferably set at a wide angle as large as possible (i.e. in a major range in the circumferential direction of the clearance space) so as to perform the air vent effect uniformly over the whole clearance space.

By the same reason, the width of the air vent hold 2431b is preferably set at the same value as the thickness of the clearance space so that the inner and outer circumferential edges coincide with the inner and outer peripheral edges of the clearance space.

As show in FIG. 42, a plurality of (four) engaging protrusions 2435 of a projecting piece shape is integrally formed at the outside of the air vent holes 2431b on the inside surface (lower surface) of the base portion 2431, respectively, so as to be protruded downward. The engaging protrusions 2435 are arranged at constant angular intervals (90 degrees intervals) on a circle (imaginary circle) of a predetermined diameter that is coaxial with the base portion 2411.

The engaging protrusion 2435 has an arc plate shape and is disposed at an outside position in the radial direction that is away from the outer peripheral surface of the outer noble metal body 1813 (fitted at the fixed position of the housing 2410).

An end surface covering noble metal body 2441 of a circular ring shape (toroidal shape) is coaxially fitted on the inside surface of the base portion 2431.

Specifically, the noble metal body 2441 has a center hole (inner peripheral edge) 2441a that is the same circle as the outer peripheral surface of the fitting protrusion 2433.

The noble metal body 2441 has four arc holes 2441b of the same shape and the same dimension as the separating protrusions 2434 formed therethrough at the same position in the radial direction and at the same angular intervals as the separating protrusions 2434.

The noble metal body 2441 has four air vent holes 2441c of the same arc angle and the same width as the air vent holes 2431b formed therethrough at the same position in the radial direction and at the same angular intervals as the air vent holes 2431b of the base portion 2431.

The noble metal body 2441 is tightly fitted on the outer peripheral surface of the fitting protrusion 2433 vi the center hole 2441a, while the arc holes 2441b being tightly fitted on the separating protrusions 2434, respectively. Thus, the noble metal body 2441 is secured at its fixed position and the air vent holes 2441c perfectly coincide and align with the air vent holes 2431b.

At this time, the separating protrusions 2434 are protruded downward from the surface of the end surface covering noble metal body 2441 by a slight amount.

Moreover, the noble metal body 2441 has the circular outer circumferential edge touched and engaged with the inner peripheral surface of the engaging protrusions 2435.

The projecting height of the engaging protrusions 2435 is set larger than the projecting height of the separating protrusions 2434 so that the it regulates the movement of the outer noble metal body 1813 from being shifted or offset outward. Still, it is possible to set the height of the engaging protrusions 2435 at essentially the same as that of the separating protrusions 2434.

While the engaging protrusions 2435 is formed and protruded at the same angular positions as the separating protrusions 2434 in FIG. 42, they may be provided at other angular positions.

As shown in FIG. 42, four fitting dents 2436 are formed at the inner peripheral edge of the outer peripheral portion 2432 at fixed angles (90 degrees) in the circumferential direction.

The fitting dents 2436 of the cap 2430 is fitted on the fitting protrusions 2417 of the housing 2410 and then rotated in clockwise or counterclockwise direction so as to attach or detach the cap 2430 to the housing 2410.

A first target protrusion 2438 is integrally formed on the upper surface of the base portion 2431 corresponding to the first target protrusion 2418 of the housing 2410. A second target protrusion 2438 is integrally formed on the outer peripheral surface of the outer peripheral portion 2432 corresponding to the second target protrusion 2419.

At a first angular position where the first target protrusion 2438 coincides with the first target protrusion 2418, the fitting protrusions 2417 are located at positions to fit on fitting holes at the end of the fitting dents 2436 (exposed portions depicted in FIG. 42). Thus, at the first angular position, the cap 2430 can be fitted on the housing 2410.

If the cap 2430 is rotated in the clockwise direction from the above fitting state (start position), the fitting protrusions 2417 slide to be engaged within engaging grooves (not shown) of the fitting dents 2436 so that the cap 2430 is secured to the housing 2410. In such final fastened state, the second target protrusion 2430 coincides with the second target protrusion 2419.

Thereby, the upper end portion of the non-noble metal body 1811 is fitted and held on the outside of the fitting protrusion and the top surface (upper surface) of the non-noble metal body 1811 is touched on the lower end of the separating protrusions 2434 so as to be prevented from moving. Moreover, the top surface of the non-noble metal body is located downward away from the end surface covering noble metal body 2441 by a predetermined distance. Furthermore, the clearance space between the non-noble metal body 1811 and the outer noble metal body 1813 faces the air vent holes 2441c and 2431c while separated away therefrom.

Accordingly, the noble metal body 2441 faces the upper end surface of the non-noble metal body 1811 with a minute clearance space (by the projecting height of the separating protrusions 2434) kept between them, thereby producing the battery action via the water (and oxygen dissolved therein) alone between them.

In the present embodiment, the noble metal body 2441 may be disposed at the inside surface (bottom surface) of the base portion 2411 of the housing 2410 so as to produce the battery action between the noble metal body 2441 and the bottom surface of the non-noble metal body 1811.

Moreover, water passing holes similar to the outer water passing holes 2411b may be formed at middle positions of the separating protrusions 2434 near the base portion 2431, respectively, at similar arrangement intervals and at similar positions in the radial direction.

In this case, it is possible to tightly fit the supporting protrusions 2420 of the housing 2410 thereon so as to detachably couple a plurality of water battery devices in the vertical direction.

However, in case no means is provided for maintaining the concentration of the battery action at the fixed concentration or more by controlling the water flow rate in the container so that the water battery device is used by itself as a single unit, it is preferable to eliminate such water passing holes so as to restrict the water flow rate in the container.

On the other hand, in case the water environment where the water battery device is disposed is the water inside a shielding type container, it is possible to make a structure of the shielding type container (water container or water keeper or the like) into the above-mentioned container structure that maintains the concentration of the battery action water. In this case, the communication holes may be added thereto.

<Functions and Effects>

When the water battery device is immersed in a predetermined stored water (stored water inside a water container or the like), the water at the outside of the water battery device enters into the clearance space between the non-noble metal body 1811 and the inner noble metal body 1812 mainly through the inner water passing holes 241a of the housing at first and then through the water passing slits 1812b of the inner noble metal body 1812. Thereafter, the water becomes the battery action watery by the battery action at the clearance space between the non-noble metal body 1811 and the inner noble metal body 1812.

At the same time, the water enters into the clearance space between the non-noble metal body 1811 and the outer noble metal body 1813 mainly through the slits 2412a of the housing 2410 and then through the water passing slits 1813b of the outer noble metal body 1813. Thereafter, the water becomes the battery action watery by the battery action at the clearance space between the non-noble metal body 1811 and the outer noble metal body 1813.

Thus produced battery action water gradually flows out of the inner water passing holes 2411a to the outside through the water passing slits 1812b of the inner noble metal body 1812. Moreover, the battery action water gradually flows out of the slits 2412a to the outside through the water passing slits 1813b of the outer noble metal body 1813.

At this time, the container composed of the housing 2410 and the cap 2430 has the above-described battery action water concentration maintaining structure. Therefore, the battery action water is maintained at the fixed concentration or more that completely blocks the oxide film or the like from being generated by the mechanism as described above.

That is, the gradual release of the battery action water from the above-mentioned container is a structure from the viewpoint of preventing the formation of the oxide film or the biofilm on the non-noble metal body inside the container rather than a structure taking into account a variety of functions such as sterilizing effect in the water environment to which the battery action water is released.

Moreover, at this time, it is though that the air such as the oxygen or the hydrogen is produced in the water by the battery action between the non-noble metal body 1811 and the inner noble metal body 1812 and by the battery action between the non-noble metal body 1811 and the outer noble metal body 1813, thereby running up along the surface of the non-noble metal body 1811.

However, at this time, the air such as the oxygen uprising in the water is released smoothly in the water at the outside of the container via the water passing holes 2431a between the non-noble metal body 1811 and the inner noble metal body 1812 and via the air bent holes 2431b between the non-noble metal body 1811 and the outer noble metal body 1813. Consequently, the air never remains at the inside of the container.

Accordingly, it is possible to prevent the surface of the non-noble metal body 1811 from being oxidized and tarnished by the remaining oxygen or the like.

Modified Example of Fourteenth Embodiment

In the fourteenth embodiment, the upper half of the non-noble metal body 1811 may be formed into a tapered surface that lessens the diameter toward the upper end so as to facilitate the uprising air such as the oxygen to flow more smoothly in the water.

In this case, the upper half of the outer noble metal body 1813 is preferably formed into a tapered surface that lessens the diameter toward the upper end.

Moreover, in this case, it is preferable to se the positions of the air vent holes in the radial direction at the position corresponding to the clearance space between the non-noble metal body and the outer noble metal body each of which has the tapered surface.

[Use of Non-Noble Metal Body Made of Magnesium/Manganese Alloy (Mg/Mn)]

In the immersion-type water battery device, a non-noble metal body made of Zn/Mg and a non-noble metal body made of Mg/Zn is combined with the aforementioned noble metal body so as to form a first inner unit. Then, a plurality of water battery devices each composed of the first inner unit is immersed and disposed in the water. In addition, a non-noble metal body made of magnesium/manganese (Mg/Mn) alloy is combined with the aforementioned noble metal body to form a second inner unit. Then, one or more second water battery devices each composed of the second inner unit are immersed and disposed in the water at a predetermine proportion in number in relation to the number of the first water battery devices. For example the second water battery devices may be disposed in relation to the first water battery devices in a proportion of one to seven (1:7).

In this case, the Mg/Mn alloy may be manufactured by substituting Zn of the Mg/Zn alloy with Mn.

That is, the Mg/Mn alloy is manufactured by adding Mn as an added metal to Mg as the main metal by a predetermined addition rate. It is preferable to use an alloy that added 1% of Mn to the 99% of Mg as the Mg/Mn alloy.

A sterilization effect as shown by Zn cannot be expected. Instead, it is expected that Mn performs a reduced hydrogen water production effect or a SOD enzyme production effect.

[Manufacture of Non-Noble Metal Body by Extrusion]

The non-noble metal body can be molded in to the above-mentioned fixed shape by casting using a predetermined casting mold. Still, there is a fear that minute pores (micropores) be formed on the metal body after molding in case of the casting thereby lowering the mass-production efficiency. In view of heightening the mass-production efficiency, the non-noble metal body may be manufactured into the fixed shape by extrusion molding.

MODIFIED EMBODIMENTS

The preferred embodiments described herein are illustrative and not restrictive, the scope of the invention being indicated in the appended claims and all variations which come within the meaning of the claims are intended to be embraced therein.

The invention claimed is:

1. A water battery device comprising a container and an inner unit disposed at an inside of the container:
   the inner unit including;
   a first reactor made of a first metal having a predetermined ionization tendency so as to produce metal ions in a running water to perform a sterilization effect,
   a second reactor made of a second metal having an ionization tendency lower than the first metal, the second reactor having a facing surface disposed in a facing manner to an entire surface of a main portion of a metal ion producing surface on an overall surface of the first reactor, and
   an interval keeping member fixedly holding the first reactor and the second reactor such that the first reactor and the second reactor are kept in an untouched state with each other over their entire surfaces and such that the first reactor and the second reactor planarly face to each other with an clearance space, the interval keeping member keeping the first reactor and the second reactor from being electrically conducted so as to electrically insulate the first reactor and the second reactor, and
   the container including a communication hole allowing the running water to communicate between an outside of the container and the inner unit disposed at the inside of the container;
   wherein the inner unit makes the metal ions dissolve into the running water by a battery action between the first reactor and the second reactor to produce a treated water when the running water is passed through the communication hole to the inside of the container, the battery action being produced by use of a medium consisting of only the water entering into the clearance space,
   wherein the container has an indirect flow-in/flow-out container structure that provides the communication hole only at such a position that allows the treated water at the inside of the container to be drawn out by the running water flowing at the outside of the container,
   wherein, as the indirect flow-in/flow-out container structure, the container has either of a first structure, a second structure or a third structure,
   wherein, in the first structure, the container has a tubular shape with a first closed end and a second closed end at axially opposite ends and is adapted to be disposed along an axis of a water conduit of a water pipe so that the second closed end is located at a downstream side in the water conduit, and the communication hole is provided only at the second closed end of the container to allow the treated water at the inside of the container to be drawn out by the running water flowing around the communication hole,
   wherein, in the second structure, the container has a tubular shape with a first closed end and a second closed end at axially opposite ends and is disposed perpendicularly to an axis of a water conduit of a water pipe so that the second closed end faces perpendicularly to the axis of the water conduit, and the communication hole is provided only at the second closed end of the container to allow the treated water at the inside of the container to be drawn out by the running water flowing around the communication hole, and
   wherein, in the third structure, the container has a tubular shape with a first open end and a second open end at axially opposite ends and has the first open end fitted at a downstream end of a water conduit of a water pipe so that an axis of the container is coaxial with the axis of the water conduit, the inner unit has the first reactor and the second reactor formed respectively into a cylindrical shape and arranges the first reactor and the second reactor in a coaxial manner, the container houses therein the inner unit in an coaxial manner, and the communication hole is provided on an inner one of the first reactor and the second reactor at a position near the first open end so as to penetrate the inner one in a direction perpendicular to the axis of the container to allow the treated water at the inside of the container to be drawn out by the running water flowing around the communication hole.

2. A water battery device according to claim 1, wherein the container has a flow rate adjusting means for restricting a flow rate of the water communicating between the outside of the container and the inner unit.

3. A water battery device according to claim 1, wherein
   the first reactor is a non-noble metal body composed of at least one of a zinc, a magnesium, a zinc/magnesium alloy and a magnesium/zinc alloy, and
   the second reactor is a noble metal body composed of an corrosion resistance metal.

4. A water battery device according to claim 1, wherein the container has the first structure as the indirect flow-in/flow-out container structure.

5. A water battery device according to claim 4, wherein:
   the container has a housing of a cylindrical shape with opposite open ends, an inlet portion fixed at one of the opposite open ends of the housing to form the first closed end, and an outlet portion fixed at another of the opposite open ends of the housing to form the second closed end,
   the inlet portion has a cylindrical portion and a flange formed on the cylindrical portion, the outlet portion has a cylindrical portion and a flange formed on the cylindrical portion, the cylindrical portion of the inlet portion and the cylindrical portion of the outlet portion respectively have communication holes, and the flanges of the inlet portion and the outlet portion are adapted to be engaged with an inner periphery of the water pipe, respectively, when the container is disposed at the inside of the water pipe, thereby allowing the running water passing through the communication hole of the inlet portion to flow to an outer periphery of the housing and passing through the communication hole of the outlet portion to flow toward the communicating hole of the container.

6. A water battery device according to claim 1, wherein the container has the second structure as the indirect flow-in/flow-out container structure.

7. A water battery device according to claim 1, wherein the container has the third structure as the indirect flow-in/flow-out container structure.

* * * * *